(12) United States Patent
Yasui et al.

(10) Patent No.: US 7,487,031 B2
(45) Date of Patent: Feb. 3, 2009

(54) CONTROL APPARATUS, CONTROL METHOD, AND ENGINE CONTROL UNIT

(75) Inventors: Yuji Yasui, Saitama-ken (JP); Ikue Kawasumi, Saitama-ken (JP); Kosuke Higashitani, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/907,384

(22) Filed: Oct. 11, 2007

(65) Prior Publication Data

US 2008/0091332 A1    Apr. 17, 2008

(30) Foreign Application Priority Data

Oct. 11, 2006    (JP)    ............... 2006-277319

(51) Int. Cl.
*B60T 7/12* (2006.01)
*F02D 13/04* (2006.01)

(52) U.S. Cl. ............... 701/103; 123/321; 123/347

(58) Field of Classification Search ............ 701/103, 701/110, 114, 115; 123/319, 321, 322, 345, 123/346, 347, 348, 90.1, 90.15, 90.16
See application file for complete search history.

(56) References Cited

U.S. PATENT DOCUMENTS

| | | | | |
|---|---|---|---|---|
| 5,990,738 | A * | 11/1999 | Wright et al. | ............... 330/149 |
| 6,591,183 | B2 * | 7/2003 | Ishikawa et al. | ............ 701/103 |
| 7,340,336 | B2 * | 3/2008 | Yasui et al. | .................. 701/67 |
| 2003/0041823 | A1 * | 3/2003 | Takemura et al. | ........ 123/90.16 |
| 2007/0208486 | A1 * | 9/2007 | Yasui et al. | ................ 701/101 |
| 2008/0133066 | A1 * | 6/2008 | Takenaka | ..................... 701/1 |
| 2008/0172165 | A1 * | 7/2008 | Tagami et al. | .............. 701/102 |

* cited by examiner

*Primary Examiner*—John T Kwon
(74) *Attorney, Agent, or Firm*—Squire, Sanders & Dempsey L.L.P.

(57) ABSTRACT

A control apparatus which is capable of compensating for a control error properly and quickly even under a condition where the control error is temporarily increased e.g. by degradation of reliability of the detection results of reference parameters other than controlled variables, thereby making it possible to ensure a high accuracy of control. An air-fuel ratio controller of the control apparatus calculates an air-fuel ratio error estimated value and an error weight, calculates a modified error, calculates a basic lift correction value such that the modified error becomes equal to 0, calculates a lift correction value, calculates corrected valve lift by adding the lift correction value to valve lift, calculates a first estimated intake air amount for feedforward control of an air-fuel ratio according to the corrected valve lift, calculates an air-fuel ratio correction coefficient for feedback control of the air-fuel ratio, and calculates a fuel injection amount according to these.

27 Claims, 35 Drawing Sheets

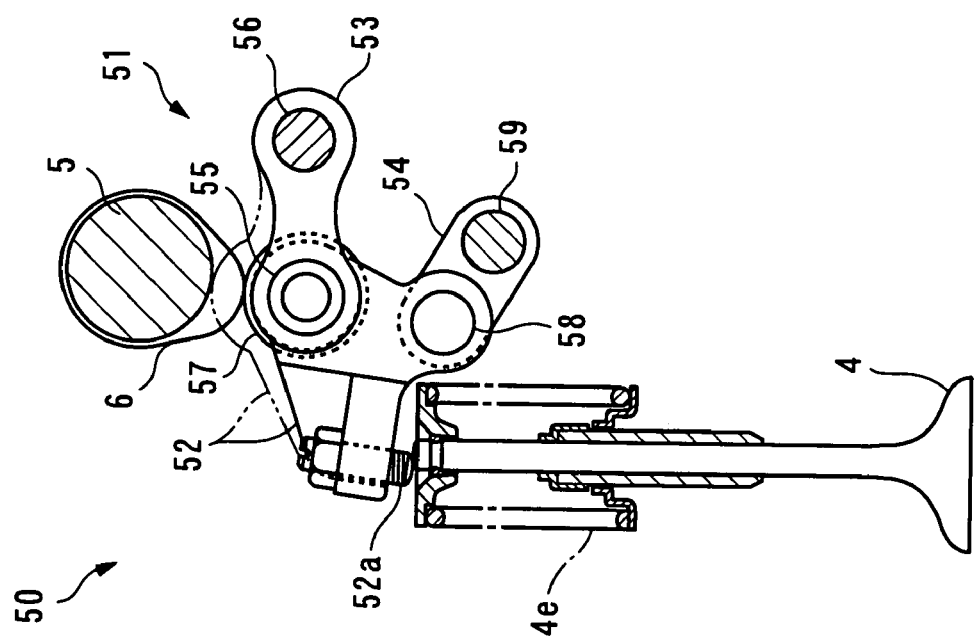
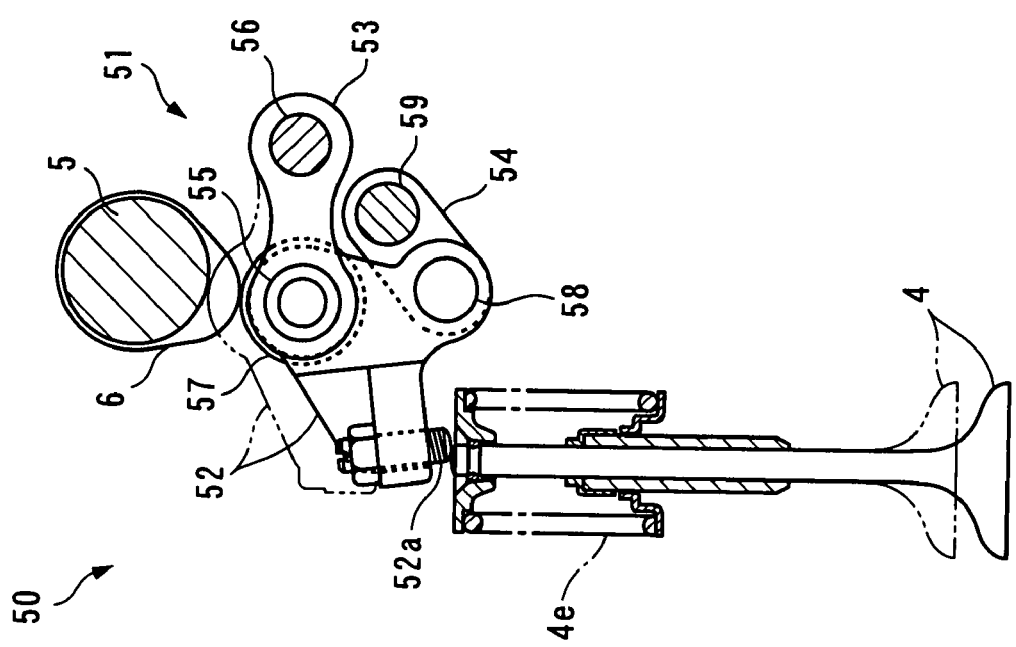

| Gcyl \ AP | AP1 | ......... | APj |
|---|---|---|---|
| Gcyl1 | KCMD11 | ......... | KCMD1j |
| ⋮ | ⋮ | ⋱ | ⋮ |
| Gcyli | KCMDi1 | ......... | KCMDij |

CONTROL APPARATUS, CONTROL METHOD, AND ENGINE CONTROL UNIT

BACKGROUND OF THE INVENTION

1. Field of the Invention

The present invention relates to a control apparatus that calculates a control input based on a value calculated by a feedback control method and a value calculated by a feedforward control method, to thereby control a controlled variable using the control input, a control method, and an engine control unit.

2. Description of the Related Art

Conventionally, as a control apparatus of this kind, the present assignee has already proposed a control apparatus disclosed in Japanese Laid-Open Patent Publication (Kokai) No. 2005-315161. This control apparatus controls the air-fuel ratio of a mixture in an internal combustion engine as a controlled variable, based on a fuel amount as a control input, and is comprised of an air flow sensor that detects the flow rate of air flowing through an intake passage of the engine, a pivot angle sensor that detects a valve lift, a cam angle sensor that detects the phase of a camshaft for actuating an intake valve to open and close the same, relative to a crankshaft (hereinafter referred to as "the cam phase"), and a crank angle sensor. Further, the engine includes the intake passage having a large diameter, as well as a variable valve lift mechanism and a variable cam phase mechanism as variable intake mechanisms. In the engine, the valve lift and the cam phase are changed as desired by the variable valve lift mechanism and the variable cam phase mechanism, respectively, whereby the amount of intake air is changed as desired.

In the above control apparatus, as an intake air amount, a first estimated intake air amount is calculated in a low-load region based on the valve lift and the cam phase, and in a high-load region, a second estimated intake air amount is calculated based on the flow rate of air. In a load region between the low-load region and the high-load region, a weighted average value of the first and second estimated intake air amounts is calculated. This is because in the low-load region where the reliability of the second estimated intake air amount is lower than that of the first estimated intake air amount due to the large diameter of the intake system of the engine, the first estimated intake air amount higher in reliability is employed, whereas in the high-load region in which occurs a state opposite to the above state in the low-load region, the second estimated intake air amount higher in reliability is employed. Further, a basic fuel amount is calculated as a value for use in feedforward control of the air-fuel ratio based on the thus calculated intake air amount, and an air-fuel ratio correction coefficient is calculated with a predetermined feedback control algorithm such that the air-fuel ratio is caused to converged to a target air-fuel ratio. A final fuel amount is calculated based on a value obtained by multiplying a basic fuel amount by the air-fuel ratio correction coefficient. Then, this amount of fuel is injected into cylinders via fuel injection valves, whereby the air-fuel ratio is accurately controlled such that it becomes equal to the target air-fuel ratio.

According to the above-described control apparatus, when detection signals from the pivot angle sensor, the cam angle sensor, and the crank angle sensor drift due to changes in temperature, for example, or when the static characteristics of a variable valve lift mechanism and a variable cam phase mechanism (i.e. the relationship between the valve lift and the cam phase with respect to the control input) are changed by wear of components of the two variable mechanisms, attachment of stain, and play produced by aging, the reliability of the results of detection by the sensors lowers, which can result in a temporary increase in the control error of the air-fuel ratio. More specifically, when the first estimated intake air amount ceases to represent an actual intake air amount, and deviates from the actual intake air amount, there is a fear that the fuel amount cannot be properly calculated as a control input in the low load region where the first estimated intake air amount is used as the control input. In such a case, the difference between the air-fuel ratio as the controlled variable and the target air-fuel ratio, that is, the control error increases. Although the control error can be compensated for by the air-fuel ratio correction coefficient in a steady state since the air-fuel ratio correction coefficient is calculated with the predetermined feedback control algorithm, it takes time before the control error is compensated for by the air-fuel ratio correction coefficient. Therefore, e.g. when the control error temporarily increases, the accuracy of control is temporarily degraded, which results in unstable combustion and degraded combustion efficiency. The problem described above is liable to be more conspicuous in a transient operating state of the engine.

SUMMARY OF THE INVENTION

It is an object of the present invention to provide a control apparatus, a control method, and an engine control unit which are capable of compensating for a control error properly and quickly even under a condition where the control error is temporarily increased e.g. by the degraded reliability of the results of detection of reference parameters other than controlled variables, thereby making it possible to ensure high-level accuracy of control.

To attain the above object, in a first aspect of the present invention, there is provided a control apparatus for controlling a controlled variable of a controlled object by a control input, comprising controlled variable-detecting means for detecting the controlled variable, reference parameter-detecting means for detecting a reference parameter of the controlled object other than the controlled variable of the controlled object, target value-setting means for setting a target value serving as a target to which the controlled variable is controlled, and control input-calculating means for calculating a first input value for feedforward control of the controlled variable, according to the reference parameter, using a correlation model representative of a correlation between the reference parameter and the first input value, calculating a second input value for performing feedback control of the controlled variable such that the controlled variable is caused to converge to the target value, with a predetermined feedback control algorithm, and calculating the control input based on the first input value and the second input value, wherein the control input-calculating means comprises error parameter-calculating means for calculating an error parameter indicative of a control error to be compensated for by the first input value, based on the controlled variable and the target value, influence degree parameter-calculating means for calculating an influence degree parameter indicative of a degree of influence of the reference parameter on the error parameter by using an influence degree model representative of a correlation between the influence degree parameter and the reference parameter, corrected error parameter-calculating means for calculating a corrected error parameter by correcting the error parameter by the influence degree parameter, model-modifying means for modifying the correlation model according to the corrected error parameter, and first input value-calculating means for calculating the first input value using the modified correlation model.

In the case of this control apparatus which calculates the first input value for feedforward control of the controlled variable according to the reference parameter, using the correlation model representative of the correlation between the reference parameter and the first input value, a control error occurs not only due to a disturbance but also due to incapability of the correlation model for properly representing an actual correlation between the reference parameter and the first input value, e.g. due to the degraded reliability of the detection results of the reference parameter, in other words, due to deviation of the correlation model from the actual correlation therebetween, and an error parameter is calculated so as to represent the control error. In this case, as described above, it takes time to compensate for the control error represented by the error parameter if the compensation is to be carried out using the second input value parameter calculated with a feedback control algorithm.

In contrast, with the configuration of this control apparatus, the influence degree parameter indicative of the degree of influence of the reference parameter on the error parameter is calculated using the influence degree model representative of the correlation between the influence degree parameter and the reference parameter, and the corrected error parameter is calculated by correcting the error parameter by the influence degree parameter, so that, the corrected error parameter is calculated such that it reflects the degree of the influence of the reference parameter on the error parameter. Further, the correlation model representative of the correlation between the reference parameter and the first input value is modified based on the corrected error parameter, and the first input value is calculated using the modified correlation model. Therefore, not only when the control error is temporarily increased by a disturbance but also when the error parameter, i.e. the control error is temporarily increased e.g. due to the degradation of reliability of the detection results of the first reference parameter, the control error can be properly compensated for just enough by the first input value.

If the first input value is calculated using the correlation model modified according to the error parameter without using the influence degree parameter in this aspect of the present invention, when the calculated value of the error parameter is generated mainly by the above-described deviation of the correlation model, that is, when the degree of the influence of the reference parameter on the error parameter is large, the error parameter, i.e. the control error can be properly compensated for by the first input value calculated as above. However, when the degree of the influence of the reference parameter on the error parameter is small, i.e. when the error parameter is generated mainly by a disturbance other than the deviation of the correlation model and the like, it is impossible to properly compensate for the control error by the first input value, resulting in overcompensation or undercompensation for the control error. However, to overcome this problem, by using the above-described influence degree parameter, the control error can be properly compensated for just enough by the first input value. In addition, by using an N (N is a natural number not smaller than 2) dimensional map which is generally used in the feedforward control method for representing the correlation between the reference parameter and the first input value, and a calculating equation representing the correlation therebetween, as the correlation model, the control error indicated by the error parameter can be compensated for more quickly than in a case where the same is compensated for by the second input value. This makes it possible to suppress the control error from increasing.

As described above, even under the condition where the control error is temporarily increased due to the degraded reliability of the detection results of the reference parameter, it is possible to compensate for the control error properly and quickly, thereby making it possible to ensure high-level accuracy of control (It should be noted that throughout the specification, the term "correlation model" is not limited to a response surface model or a mathematical model but includes all models which represent the correlation between the reference parameter and the first input value, such as the N (N is a natural number not smaller than 2) dimensional map and a predetermined calculation algorithm. Similarly, the throughout the specification, the term "influence degree model" is not limited to a response surface model or a mathematical model but includes all models which represent the correlation between the influence degree parameter and the reference parameter, such as the N dimensional map and a predetermined calculation algorithm. Further, the term "detection of a parameter" is not limited to direct detection of the parameter by a sensor, but includes calculation or estimation thereof. In addition thereto, the term "calculation of a parameter" is not limited to calculation or estimation of the same, but includes direct detection thereof by a sensor).

Preferably, the predetermined feedback control algorithm is an algorithm to which is applied a predetermined first response-specifying control algorithm that specifies a convergence rate of a difference between the controlled variable and the target value to 0, and the model-modifying means calculates a modification value with an algorithm to which is applied a predetermined second response-specifying control algorithm that specifies a convergence rate of the corrected error parameter to 0, and modifies the correlation model by the modification value, wherein in the predetermined second response-specifying control algorithm, the convergence rate of the corrected error parameter to 0 is set such that it becomes lower than the convergence rate of the difference to 0 in the predetermined first response-specifying control algorithm.

With the configuration of the preferred embodiment, the second input value is calculated with the algorithm to which is applied the predetermined first response-specifying control algorithm that specifies the convergence rate of the difference between the controlled variable and the target value to 0, and the modification value for modifying the correlation model is calculated with the algorithm to which is applied the predetermined second response-specifying control algorithm that specifies the convergence rate of the corrected error parameter to 0. When the two response-specifying control algorithms are employed, as described above, if the convergence rates of parameters used therein to 0 are set to the same value, there is a fear that the two response-specifying control algorithms interfere with each other, causing an oscillating behavior or an unstable state of the control system. In contrast, according to this control apparatus, the convergence rate of the corrected error parameter to 0 in the predetermined second response-specifying control algorithm is set such that it becomes lower than the convergence rate of the difference to 0 in the predetermined first response-specifying control algorithm, whereby the two response-specifying control algorithms are prevented from interfering with each other. This makes it possible to prevent the control system from exhibiting an oscillating behavior due to the interference between the two response-specifying control algorithms, thereby making it possible to ensure the stability of the control system.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

With the configuration of the preferred embodiment, the air-fuel ratio of the mixture is controlled by the amount of fuel to be supplied to the engine, and the amount of fuel to be supplied to the engine is calculated based on the first input value and the second input value. A correlation model representative of the correlation between the operating condition parameter and the first input value is modified according to the corrected error parameter, and the first input value is calculated using the modified correlation model. As a result, even when the correlation model ceases to properly represent the actual correlation between the operating condition parameter and the first input value, due to the degraded reliability of the detection results of the operating condition parameter, other than a disturbance, and the control error of the air-fuel ratio is liable to temporarily increase, it is possible to compensate for the increased control error just enough properly and quickly by the first input value calculated using the modified correlation model, which makes it possible to prevent the control error from increasing. As a result, it is possible to secure a high-level control accuracy of the air-fuel ratio control even in a transient state of the engine.

Preferably, the controlled object is a vehicle using the engine as a drive source thereof, the controlled variable being a wheel speed of the vehicle, the control input being an output of the engine, the reference parameter being one of a limit value of the output of the engine and a rotational speed of the engine.

With the configuration of the preferred embodiment, the wheel speed of the vehicle is controlled by the output of the engine, and the output of the engine is calculated based on the first and second input values. The correlation model representative of the correlation between the first input value and the limit value of the output of the engine or the rotational speed of the engine is modified according to the corrected error parameter, and the first input value is calculated using the modified correlation model. Thus, even when the correlation model becomes incapable of properly representing the actual correlation between the first input value and the limit value of the output of the engine or the rotational speed of the engine, due to unpredictable changes in conditions other than a disturbance, such as aged degradation of the output characteristics of the engine, variations between individual engines, changes in the degree of wear of tires, and changes in the frictional resistance of road surfaces, and hence the control error is liable to temporarily increase, it is possible to properly and quickly compensate for the control error just enough, by the first input value calculated using the modified correlation model, thereby making it possible to suppress the increase in the control error. As a result, it is possible to ensure higher-level control accuracy of the wheel speed than by a gain schedule correction (or modification) method. In short, a higher-level traction control can be realized.

To attain the above object, in a second aspect of the present invention, there is a control apparatus for controlling a controlled variable of a controlled object by a control input, comprising controlled variable-detecting means for detecting the controlled variable, first reference parameter-detecting means for detecting a first reference parameter of the controlled object other than the controlled variable of the controlled object, second reference parameter-detecting means for detecting a second reference parameter of the controlled object other than the controlled variable and the first reference parameter of the controlled object, target value-setting means for setting a target value serving as a target to which the controlled variable is controlled, and control input-calculating means for calculating a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value, wherein the control input-calculating means comprises error parameter-calculating means for calculating an error parameter indicative of a control error to be compensated for by the first input value, based on the controlled variable and the target value; modification value-calculating means for calculating a modification value for modifying the correlation model according to the error parameter, first influence degree parameter-calculating means for calculating a first influence degree parameter indicative of a degree of influence of the first reference parameter on the error parameter, using a first influence degree model representative of a correlation between the first influence degree parameter and the first reference parameter, corrected modification value-calculating means for calculating a corrected modification value by correcting the modification value by the first influence degree parameter, model-modifying means for modifying the correlation model according to the corrected modification value, and first input value-calculating means for calculating the first input value using the modified correlation model.

In the case of this control apparatus which calculates the first input value for feedforward control of the controlled variable according to the reference parameter, using the correlation model representative of the correlation between the first reference parameter, the second reference parameter and the first input value, a control error occurs not only due to a disturbance but also due to incapability of the correlation model for properly representing an actual correlation between the first reference parameter, the second reference parameter, and the first input value, e.g. due to the degraded reliability of the detection results of the first reference parameter, in other words, due to deviation of the correlation model from the actual correlation therebetween, and an error parameter is calculated so as to represent the control error. In this case, as described above, it takes time to compensate for the control error represented by the error parameter if the compensation is to be carried out using the second input value parameter.

In contrast, with the configuration of this control apparatus, the modification value for modifying the correlation model is calculated according to the error parameter, and the first influence degree parameter indicative of the degree of influence of the first reference parameter on the error parameter is calculated using the first influence degree model representative of the correlation between the first influence degree parameter and the first reference parameter. The corrected modification value is calculated by correcting the modification value by the first influence degree parameter. Thus, the corrected modification value is calculated such that it reflects the degree of influence of the first reference parameter on the error parameter. Further, the correlation model is modified using the corrected modification value thus calculated, and the first input value is calculated using the modified correlation model. Therefore, even when the control error indicated by the error parameter is temporarily increased due to the degraded reliability of the detection results of the first reference parameter, it is possible to properly compensate for the control error just enough by the first input value calculated as above.

If the first input value is calculated using the correlation model modified by the modification value without using the first influence degree parameter in this aspect of the present invention, when the calculated value of the error parameter is generated mainly by the above-described deviation of the correlation model, that is, when the degree of the influence of the first reference parameter on the error parameter is large, the control error indicated by the error parameter can be properly compensated for by the first input value calculated as above. However, when the degree of the influence of the first reference parameter on the error parameter is small, i.e. when the error parameter is generated mainly by a disturbance other than the deviation of the correlation model and the like, it is impossible to properly compensate for the control error by the first input value, resulting in overcompensation or undercompensation for the control error. Therefore, by using the above-described first influence degree parameter, the control error can be properly compensated for just enough by the first input value.

In addition, by using an M (M is a natural number not smaller than 3) dimensional map which is generally used in the feedforward control method for representing the correlation between the first reference parameter, the second reference parameter, and the first input value, and a calculating equation representing the correlation therebetween, for the correlation model, the control error can be compensated for more quickly than in a case where the error parameter is compensated for by the second input value. As described above, even under a condition where the control error is temporarily increased e.g. due to the degraded reliability of the detection results of the first reference parameter, it is possible to compensate for the control error properly and quickly, thereby making it possible to ensure high-level accuracy of control (It should be noted that throughout the specification, the term "first influence degree model" is not limited to a response surface model or a mathematical model but includes all models which represent the correlation between the first influence degree parameter and the reference parameter, such as the N dimensional map and a predetermined calculation algorithm).

Preferably, the control apparatus further comprises second influence degree parameter-calculating means for calculating a second influence degree parameter indicative of a degree of influence of the second reference parameter on the error parameter, using a second influence degree model representative of a correlation between the second influence degree parameter and the second reference parameter, and corrected error parameter-calculating means for calculating a corrected error parameter by correcting the error parameter by the second influence degree parameter; wherein the modification value-calculating means calculates the modification value according to the corrected error parameter.

With the configuration of the preferred embodiment, the second influence degree parameter indicative of the degree of influence of the second reference parameter on the error parameter is calculated using the second influence degree model representative of the correlation between the second influence degree parameter and the second reference parameter. The corrected error parameter is calculated by correcting the error parameter by the second influence degree parameter, and the modification value is calculated according to the corrected error parameter. Therefore, the modification value is calculated such that it reflects the degree of influence of the second reference parameter on the error parameter. Further, the correlation model is modified using the corrected modification value obtained by correcting the modification value, and the first input value is calculated using the modified correlation model, so that even under a condition where the control error indicated by the error parameter is temporarily increased by the thus calculated first input value, the control error can be properly compensated for just enough. In addition, by using the M (M is a natural number not smaller than 3) dimensional map which is generally used in the feedforward control method for representing the correlation between the first reference parameter, the second reference parameter, and the first input value, and a calculating equation representing the correlation therebetween, for the correlation model, the control error indicated by the error parameter can be compensated for more quickly than in a case where the error parameter is compensated for by the second input value. As described above, even under a condition where the control error is temporarily increased not by a disturbance but e.g. by the degraded reliability of the detection results of the second reference parameter, it is possible to compensate for the control error properly and quickly, thereby making it possible to ensure a higher-level accuracy of control (It should be noted that throughout the specification, "second influence degree model" is not limited to a response surface model or a mathematical model but includes all models which represent the correlation between the reference parameter and the first input value, such as the N dimensional map and a predetermined calculation algorithm.

More preferably, the predetermined feedback control algorithm is an algorithm to which is applied a predetermined first response-specifying control algorithm for specifying a convergence rate of a difference between the controlled variable and the target value to 0, and the modification value-calculating means calculates the modification value with an algorithm to which is applied a predetermined second response-specifying control algorithm that specifies a convergence rate of the corrected error parameter to 0, wherein in the predetermined second response-specifying control algorithm, the convergence rate of the corrected error parameter to 0 is set such that it becomes lower than the convergence rate of the difference to 0 in the predetermined first response-specifying control algorithm.

With the configurations of these preferred embodiments, it is possible to obtain the same advantageous effects as provided by the corresponding preferred embodiment of the first aspect of the present invention.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

With the configuration of the preferred embodiment, the air-fuel ratio of the mixture is controlled by the amount of fuel to be supplied to the engine, and the amount of fuel to be supplied to the engine is calculated based on the first input value and the second input value. A correlation model representative of the correlation between the first reference parameter, the operating condition parameter, and the first input value is modified according to the corrected error parameter, and the first input value is calculated using the modified correlation model. As a result, even when the correlation model ceases to properly represent the actual correlation between the first reference parameter, the operating condition parameter, and the first input value, due to the degraded reliability of the detection results of the operating condition parameter and the like, and the control error of the air-fuel ratio is liable to temporarily increase, it is possible to compensate for the increased control error just enough properly and quickly by the first input value calculated using the modified correlation model, which makes it possible to prevent the control error from increasing. As a result, it is possible to secure a high-level control accuracy of the air-fuel ratio control even in a transient state of the engine.

Preferably, the controlled object is a vehicle using the engine as a drive source thereof, the controlled variable being a wheel speed of the vehicle, the control input being an output of the engine, the second reference parameter being one of a limit value of the output of the engine and a rotational speed of the engine.

With the configuration of the preferred embodiment, the wheel speed of the vehicle is controlled by the output of the engine, and the output of the engine is calculated based on the first and second input values. The correlation model representative of the correlation between the first reference parameter, the limit value of the output of the engine or the rotational speed of the engine, and the first input value is modified according to the corrected error parameter, and the first input value is calculated using the modified correlation model. Thus, even when the correlation model becomes incapable of properly representing the actual correlation between the first reference parameter, the limit value of the output of the engine or the rotational speed of the engine, and the first input value due to unpredictable changes in conditions other than a disturbance, such as aged degradation of the output characteristics of the engine, variations between individual engines, changes in the degree of wear of tires, and changes in the frictional resistance of road surfaces, and hence the control error is liable to temporarily increase, it is possible to properly and quickly compensate for the control error just enough, by the first input value calculated using the modified correlation model, thereby making it possible to suppress the increase in the control error. As a result, it is possible to ensure higher-level control accuracy of the wheel speed than by a gain schedule correction (or modification) method. In short, a higher-level traction control can be realized.

To attain the object, in a third aspect of the present invention, there is provided a method of controlling a controlled variable of a controlled object by a control input, comprising a controlled variable-detecting step of detecting the controlled variable, a reference parameter-detecting step of detecting a reference parameter of the controlled object other than the controlled variable of the controlled object, a target value-setting step of setting a target value serving as a target to which the controlled variable is controlled, and a control input-calculating step of calculating a first input value for feedforward control of the controlled variable, according to the reference parameter, using a correlation model representative of a correlation between the reference parameter and the first input value, calculating a second input value for performing feedback control of the controlled variable such that the controlled variable is caused to converge to the target value, with a predetermined feedback control algorithm, and calculating the control input based on the first input value and the second input value, wherein the control input-calculating step comprises an error parameter-calculating step of calculating an error parameter indicative of a control error to be compensated for by the first input value, based on the controlled variable and the target value, an influence degree parameter-calculating step of calculating an influence degree parameter indicative of a degree of influence of the reference parameter on the error parameter by using an influence degree model representative of a correlation between the influence degree parameter and the reference parameter, a corrected error parameter-calculating step of calculating a corrected error parameter by correcting the error parameter by the influence degree parameter, a model-modifying step of modifying the correlation model according to the corrected error parameter, and a first input value-calculating step of calculating the first input value using the modified correlation model.

With the configuration of the third aspect of the present invention, it is possible to obtain the same advantageous effects as provided by the first aspect of the present invention.

Preferably, the predetermined feedback control algorithm is an algorithm to which is applied a predetermined first response-specifying control algorithm that specifies a convergence rate of a difference between the controlled variable and the target value to 0, the model-modifying step including calculating a modification value with an algorithm to which is applied a predetermined second response-specifying control algorithm that specifies a convergence rate of the corrected error parameter to 0, and modifying the correlation model by the modification value, and in the predetermined second response-specifying control algorithm, the convergence rate of the corrected error parameter to 0 is set such that it becomes lower than the convergence rate of the difference to 0 in the predetermined first response-specifying control algorithm.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

Preferably, the controlled object is a vehicle using the engine as a drive source thereof, the controlled variable being a wheel speed of the vehicle, the control input being an output of the engine, the reference parameter being one of a limit value of the output of the engine and a rotational speed of the engine.

With the configurations of these preferred embodiments, it is possible to obtain the same advantageous effects as provided by the preferred embodiments of the first aspect of the present invention.

To attain the object, in a fourth aspect of the present invention, there is provided a method of controlling a controlled variable of a controlled object by a control input, comprising a controlled variable-detecting step of detecting the controlled variable, a first reference parameter-detecting step of detecting a first reference parameter of the controlled object other than the controlled variable of the controlled object, a second reference parameter-detecting step of detecting a second reference parameter of the controlled object other than the controlled variable and the first reference parameter of the controlled object, a target value-setting step of setting a target value serving as a target to which the controlled variable is controlled, and a control input-calculating step of calculating a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value, wherein the control input-calculating step comprises an error parameter-calculating step of calculating an error parameter indicative of a control error to be compensated for by the first input value, based on the controlled variable and the target value, a modification value-calculating step of calculating a modification value for modifying the correlation model according to the error parameter, a first influence degree parameter-calculating step of calculating a first influence degree parameter indicative of a degree of influence of the first reference parameter on the error parameter, using a first influence degree model representative of a correlation between the first influence degree parameter and the first reference parameter, a corrected modification value-calculating step of calculating a corrected modification value by correcting the modification value by the first influence degree parameter, a model-modifying step of modifying the correlation model according to the corrected modification value, and a first input value-calculating step of calculating the first input value using the modified correlation model.

With the configuration of the fourth aspect of the present invention, it is possible to obtain the same advantageous effects as provided by the second aspect of the present invention.

Preferably, the method further comprises a second influence degree parameter-calculating step of calculating a second influence degree parameter indicative of a degree of influence of the second reference parameter on the error parameter, using a second influence degree model representative of a correlation between the second influence degree parameter and the second reference parameter, and a corrected error parameter-calculating step of calculating a corrected error parameter by correcting the error parameter by the second influence degree parameter, wherein the modification value-calculating step includes calculating the modification value according to the corrected error parameter.

More preferably, the predetermined feedback control algorithm is an algorithm to which is applied a predetermined first response-specifying control algorithm for specifying a convergence rate of a difference between the controlled variable and the target value to 0, the modification value-calculating step including calculating the modification value with an algorithm to which is applied a predetermined second response-specifying control algorithm that specifies a convergence rate of the corrected error parameter to 0, and in the predetermined second response-specifying control algorithm, the convergence rate of the corrected error parameter to 0 is set such that it becomes lower than the convergence rate of the difference to 0 in the predetermined first response-specifying control algorithm.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

Preferably, the controlled object is a vehicle using the engine as a drive source thereof, the controlled variable being a wheel speed of the vehicle, the control input being an output of the engine, the second reference parameter being one of a limit value of the output of the engine and a rotational speed of the engine.

With the configurations of these preferred embodiments, it is possible to obtain the same advantageous effects as provided by the preferred embodiments of the second aspect of the present invention.

To attain the object, in a fifth aspect of the present invention, there is provided an engine control unit including a control program for causing a computer to execute a method of controlling a controlled variable of a controlled object by a control input, wherein the control program causes the computer to detect the controlled variable; detect a reference parameter of the controlled object other than the controlled variable of the controlled object; set a target value serving as a target to which the controlled variable is controlled; and calculate a first input value for feedforward control of the controlled variable, according to the reference parameter, using a correlation model representative of a correlation between the reference parameter and the first input value, calculate a second input value for performing feedback control of the controlled variable such that the controlled variable is caused to converge to the target value, with a predetermined feedback control algorithm, and calculate the control input based on the first input value and the second input value, wherein when causing the computer to calculate the control input, the control program causes the computer to calculate an error parameter indicative of a control error to be compensated for by the first input value, based on the controlled variable and the target value; calculate an influence degree parameter indicative of a degree of influence of the reference parameter on the error parameter by using an influence degree model representative of a correlation between the influence degree parameter and the reference parameter; calculate a corrected error parameter by correcting the error parameter by the influence degree parameter; modify the correlation model according to the corrected error parameter; and calculate the first input value using the modified correlation model.

With the configuration of the fifth aspect of the present invention, it is possible to obtain the same advantageous effects as provided by the first aspect of the present invention.

Preferably, the predetermined feedback control algorithm is an algorithm to which is applied a predetermined first response-specifying control algorithm that specifies a convergence rate of a difference between the controlled variable and the target value to 0, the control program causing, when causing the computer to modify the correlation model, the computer to calculate a modification value with an algorithm to which is applied a predetermined second response-specifying control algorithm that specifies a convergence rate of the corrected error parameter to 0, and modify the correlation model by the modification value, and in the predetermined second response-specifying control algorithm, the convergence rate of the corrected error parameter to 0 is set such that it becomes lower than the convergence rate of the difference to 0 in the predetermined first response-specifying control algorithm.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

Preferably, the controlled object is a vehicle using the engine as a drive source thereof, the controlled variable being a wheel speed of the vehicle, the control input being an output of the engine, the reference parameter being one of a limit value of the output of the engine and a rotational speed of the engine.

With the configurations of these preferred embodiments, it is possible to obtain the same advantageous effects as provided by the preferred embodiments of the first aspect of the present invention.

To attain the object, in a sixth aspect of the present invention, there is provided an engine control unit including a control program for causing a computer to execute a method of controlling a controlled variable of a controlled object by a control input, wherein the control program causes the computer to detect the controlled variable; detect a first reference parameter of the controlled object other than the controlled variable of the controlled object; detect a second reference parameter of the controlled object other than the controlled variable and the first reference parameter of the controlled object; set a target value serving as a target to which the controlled variable is controlled; and calculate a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value, wherein when causing the computer to calculate the control input, the control program causes the computer to calculate an error parameter indicative of a control error to be compensated for by the first input value, based on the controlled variable and the target value; calculate a modification value for modifying the correlation model according to the error parameter; calculate a first influence degree parameter indicative of a degree of influence of the first reference parameter on the error parameter, using a first influence degree model representative of a correlation between the first influence degree parameter and the first reference parameter; calculate a corrected modification value by correcting the modification value by the first influence degree parameter; modify the correlation model according to the corrected modification value; and calculate the first input value using the modified correlation model.

With the configuration of the sixth aspect of the present invention, it is possible to obtain the same advantageous effects as provided by the second aspect of the present invention.

Preferably, the control program further causes the computer to calculate a second influence degree parameter indicative of a degree of influence of the second reference parameter on the error parameter, using a second influence degree model representative of a correlation between the second influence degree parameter and the second reference parameter; and calculate a corrected error parameter by correcting the error parameter by the second influence degree parameter, and when causing the computer to calculate the modification value, the control program causes the computer to calculate the modification value according to the corrected error parameter.

More preferably, the predetermined feedback control algorithm is an algorithm to which is applied a predetermined first response-specifying control algorithm for specifying a convergence rate of a difference between the controlled variable and the target value to 0, the control program causing, when causing the computer to calculate the modification value, the computer to calculate the modification value with an algorithm to which is applied a predetermined second response-specifying control algorithm that specifies a convergence rate of the corrected error parameter to 0, and in the predetermined second response-specifying control algorithm, the convergence rate of the corrected error parameter to 0 is set such that it becomes lower than the convergence rate of the difference to 0 in the predetermined first response-specifying control algorithm.

Preferably, the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

Preferably, the controlled object is a vehicle using the engine as a drive source thereof, the controlled variable being a wheel speed of the vehicle, the control input being an output of the engine, the second reference parameter being one of a limit value of the output of the engine and a rotational speed of the engine.

With the configurations of these preferred embodiments, it is possible to obtain the same advantageous effects as provided by the preferred embodiments of the second aspect of the present invention.

The above and other objects, features, and advantages of the present invention will become more apparent from the following detailed description taken in conjunction with the accompanying drawings.

BRIEF DESCRIPTION OF THE DRAWINGS

FIG. 6A is a diagram showing an intake valve placed in an open state when a lower link of the variable valve lift mechanism is in a maximum lift position;

FIG. 6B is a diagram showing the intake valve placed in a stopped state when the lower link of the variable valve lift mechanism is in the zero lift position;

DETAILED DESCRIPTION OF PREFERRED EMBODIMENTS

Figure 2:
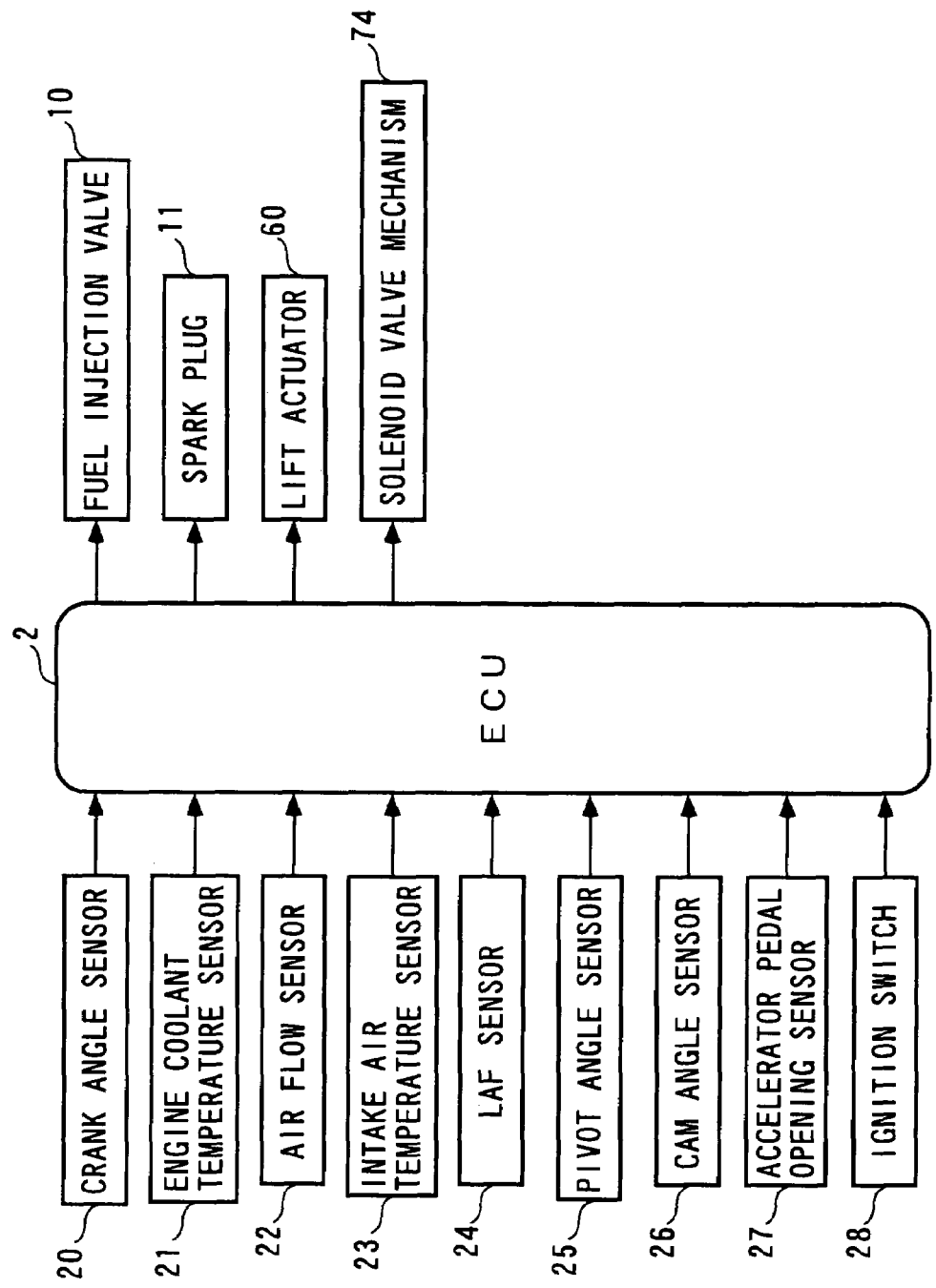
FIG. 2 is a schematic block diagram of the control apparatus.

Hereafter, a control apparatus according to a first embodiment of the present invention will be described with reference to the drawings. As shown in FIG. 2, the control apparatus 1 includes an ECU 2. As described hereinafter, the ECU 2 carries out control processes, such as an air-fuel ratio control process, depending on operating conditions of an internal combustion engine, which is a controlled object.

Figure 1:
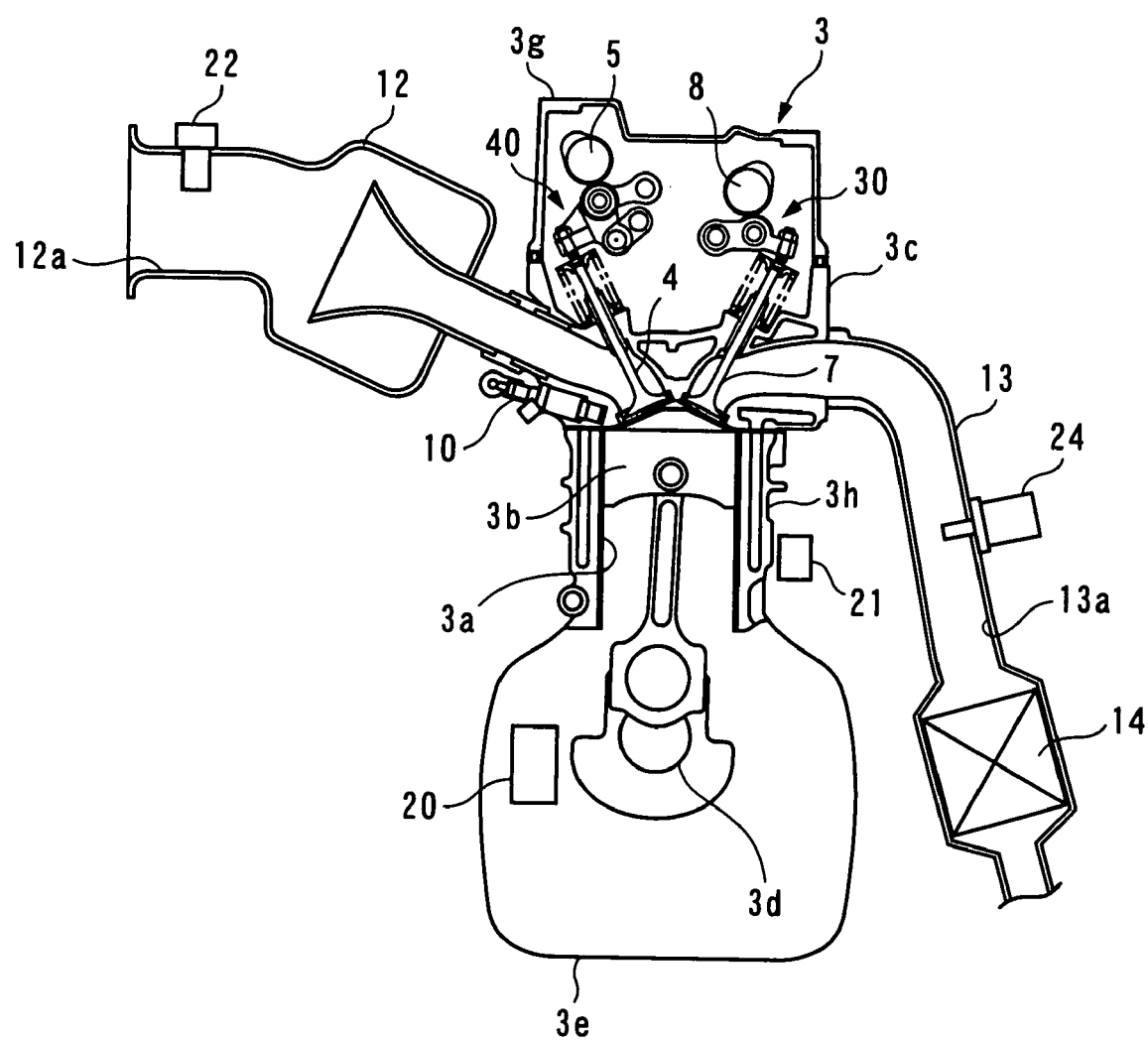
FIG. 1 is a schematic diagram of an internal combustion engine to which is applied a control apparatus according to a first embodiment of the present invention.
Figure 3:
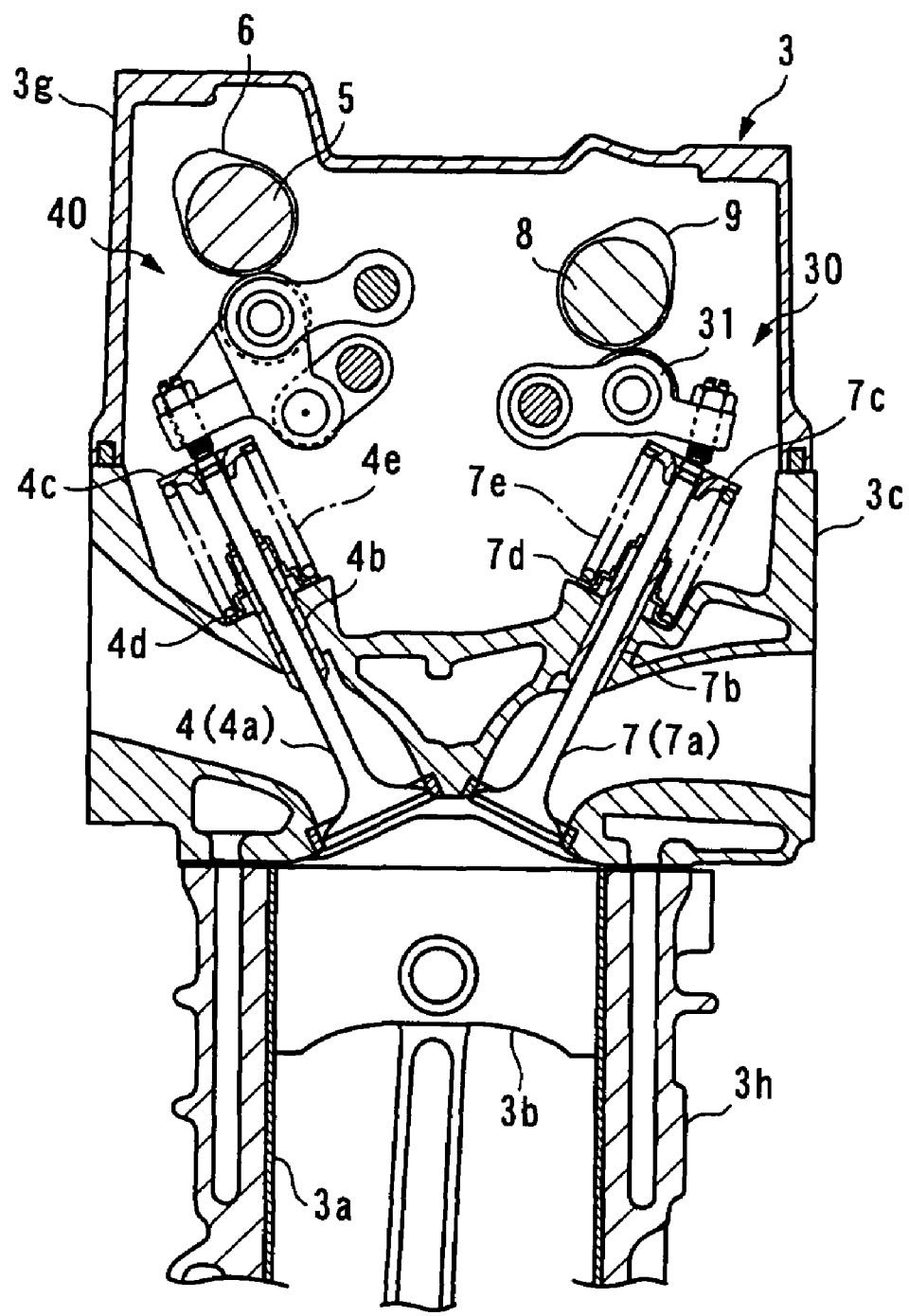
FIG. 3 is a schematic cross-sectional view of a variable intake valve-actuating mechanism and an exhaust valve-actuating mechanism of the engine.

Referring to FIGS. 1 and 3, an internal combustion engine (hereinafter simply referred to as "the engine") 3 is an in-line four-cylinder gasoline engine having four pairs of cylinders 3a and pistons 3b (only one pair of which is shown), and installed on a vehicle with an automatic transmission, not shown. The engine 3 includes an intake valve 4 and an exhaust valve 7 provided for each cylinder 3a, for opening and closing an intake port and an exhaust port thereof, respectively, an intake camshaft 5 and intake cams 6 for actuating the intake valves 4, a variable intake valve-actuating mechanism 40 that actuates the intake valves 4 to open and close the same, an exhaust camshaft 8 and exhaust cams 9 for actuating the exhaust valves 7, an exhaust valve-actuating mechanism 30 that actuates the exhaust valves 7 to open and close the same, fuel injection valves 10, spark plugs 11 (see FIG. 2), and so forth.

Figure 4:
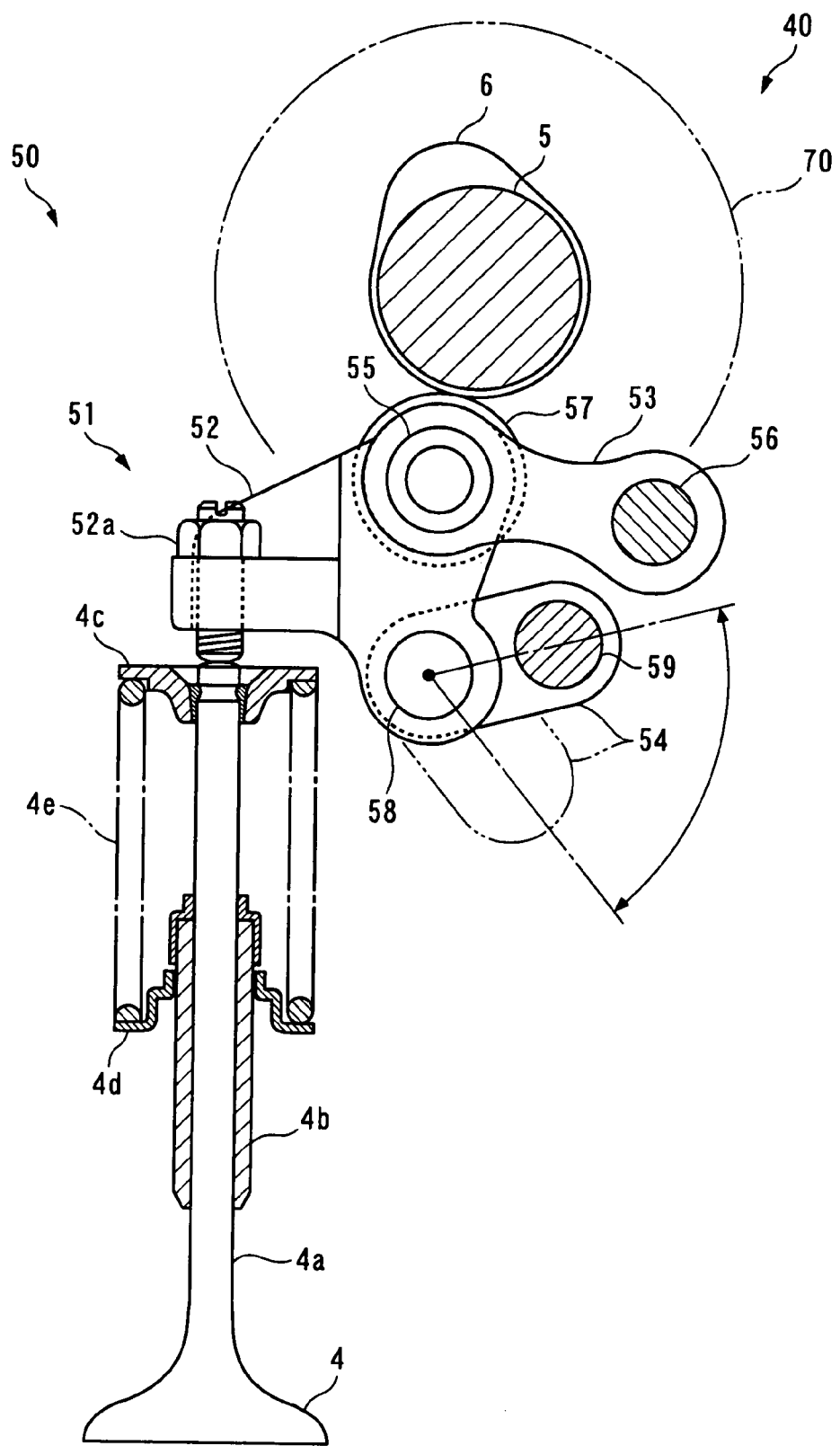
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and the stem 4a is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially and rotatably fitted on one end thereof. The intake sprocket is connected to a crankshaft 3d via a timing chain, not shown, and connected to the intake camshaft via a variable cam phase mechanism 70, described hereinafter. With the above arrangement, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift"). represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and the stem 7a is urged by the valve spring 7e in the valve-closing direction.

Further, the exhaust camshaft 8 has an exhaust sprocket (not shown) integrally formed therewith, and is connected to the crankshaft 3d by the exhaust sprocket and the timing chain, not shown, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a tilted state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection amount is controlled.

The spark plug 11 as well is provided for each cylinder 3a, and mounted through the cylinder head 3c. The spark plug 11 is electrically connected to the ECU 2, and a state of spark discharge is controlled by the ECU 2 such that a mixture in the combustion chamber is burned in timing corresponding to ignition timing.

On the other hand, the engine 3 is provided with a crank angle sensor 20 and an engine coolant temperature sensor 21. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d.

Each pulse of the CRK signal is generated whenever the crankshaft 3d rotates through a predetermined angle (e.g. 10). The ECU 2 calculates the rotational speed NE of the engine 3 (hereinafter referred to as "the engine speed NE") based on the CRK signal. The TDC signal indicates that the piston 3b has come to a predetermined crank angle position immediately before the TDC position at the start of the intake stroke, on a cylinder-by-cylinder basis, and each pulse thereof is generated whenever the crankshaft 3d rotates through a predetermined crank angle. It should be noted that in the present embodiment, the crank angle sensor 20 corresponds to first reference parameter-detecting means, and the engine speed NE corresponds to a first reference parameter.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3.

Further, the engine 3 has an intake pipe 12 from which a throttle valve mechanism is omitted, and an intake passage 12a having a large diameter is formed through the intake pipe 12, whereby the engine 3 is configured such that flow resistance is smaller than in an ordinary engine. The intake pipe 12 is provided with an air flow sensor 22 and an intake air temperature sensor 23 (see FIG. 2).

The air flow sensor 22 is implemented by a hot-wire air flow meter, and detects the flow rate Gin of air (hereinafter referred to as "the air flow rate Gin") flowing through the intake passage 12a to deliver a signal indicative of the sensed air flow rate Gin to the ECU 2. It should be noted that the air flow rate Gin is indicated in units of g/sec. Further, the intake air temperature sensor 23 detects the temperature TA of intake air (hereinafter referred to as "the intake air temperature TA") flowing through the intake passage 12a, and delivers a signal indicative of the sensed intake air temperature TA to the ECU 2.

Further, a LAF sensor 24 and a catalytic device 14 are provided in the exhaust pipe 13 at respective locations in the mentioned order from the upstream side. The LAF sensor 24 is comprised of a zirconia layer and platinum electrodes, and linearly detects the concentration of oxygen in exhaust gases flowing through an exhaust passage 13a of the exhaust pipe 13, in a broad air-fuel ratio range from a rich region richer than a stoichiometric air-fuel ratio to a very lean region, and delivers a signal indicative of the sensed oxygen concentration to the ECU 2.

The ECU 2 calculates an actual air-fuel ratio KACT indicative of the air-fuel ratio in exhaust gases, based on the value of the signal from the LAF sensor 24. In this case, the actual air-fuel ratio KACT is calculated as an equivalent ratio. It should be noted that in the present embodiment, the LAF sensor 24 corresponds to controlled variable-detecting means, and the actual air-fuel ratio KACT corresponds to a controlled variable.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 actuates the intake valves 4 to open and close the same, in accordance with rotation of the intake camshaft 5, and continuously changes the valve lift Liftin between a predetermined maximum value Liftinmax and 0. The variable valve lift mechanism 50 is comprised of rocker arm mechanisms 51 of a four joint link type, provided for the respective cylinders 3a, and a lift actuator 60 (see FIGS. 5A and 5B) simultaneously actuating these rocker arm mechanisms 51. It should be noted that in the present embodiment, the variable valve lift mechanism 50 corresponds to a variable intake mechanism.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5A:
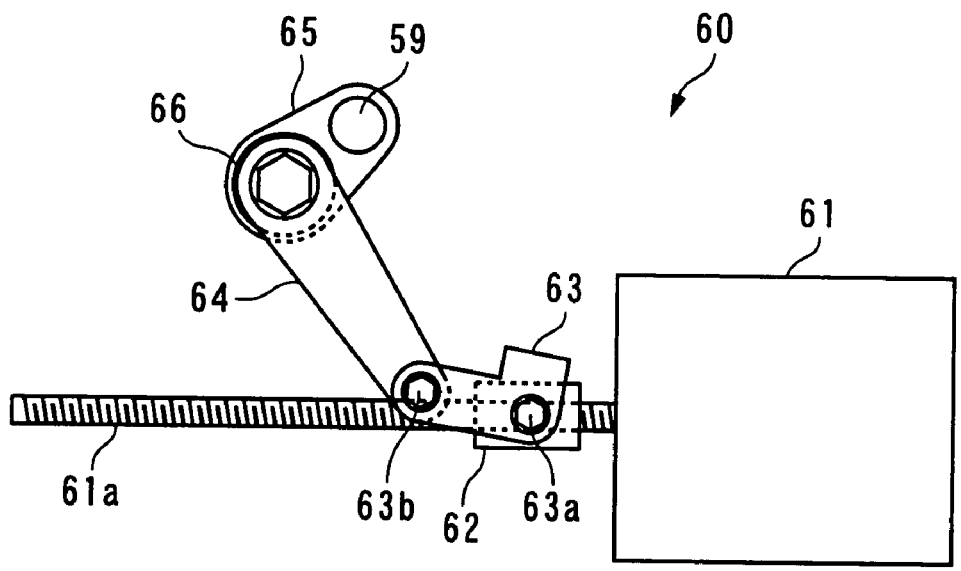
FIG. 5A is a diagram showing a lift actuator in a state in which a short arm thereof is in a maximum lift position.
Figure 5B:
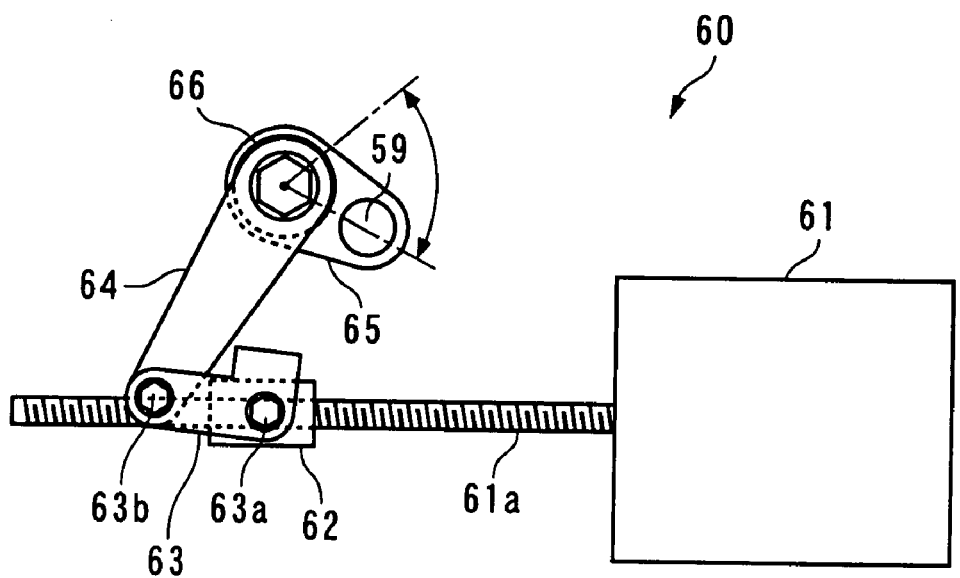
FIG. 5B is a diagram showing the lift actuator in a state in which the short arm thereof is in a zero position.

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotary shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 rotatably extends through the other end of the short arm 65, whereby the short arm 65 is connected to the lower link 54 by the connection shaft 59.

Next, a description will be given of the operation of the variable valve lift mechanism 50 configured as above. In the variable valve lift mechanism 50, when a lift control input U_Liftin, described hereinafter, is input from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

During the above process, under the control of the ECU 2, the range of pivotal motion of the short arm 65 is restricted between the maximum lift position shown in FIG. 5A and the zero lift position shown in FIG. 5B, whereby the range of pivotal motion of the lower link 54 is also restricted between the maximum lift position indicated by the solid line in FIG. 4 and the zero lift position indicated by the two-dot chain line in FIG. 4.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the zero lift position, the distance between the center of the upper pin 55 and the center of the lower pin 58 becomes shorter than the distance between the center of the rocker arm shaft 56 and the center of the connection shaft 59, whereby as shown in FIG. 6B, the adjusting bolt 52a is placed in a state substantially immovable when the intake cam 6 rotates.

Figure 7:
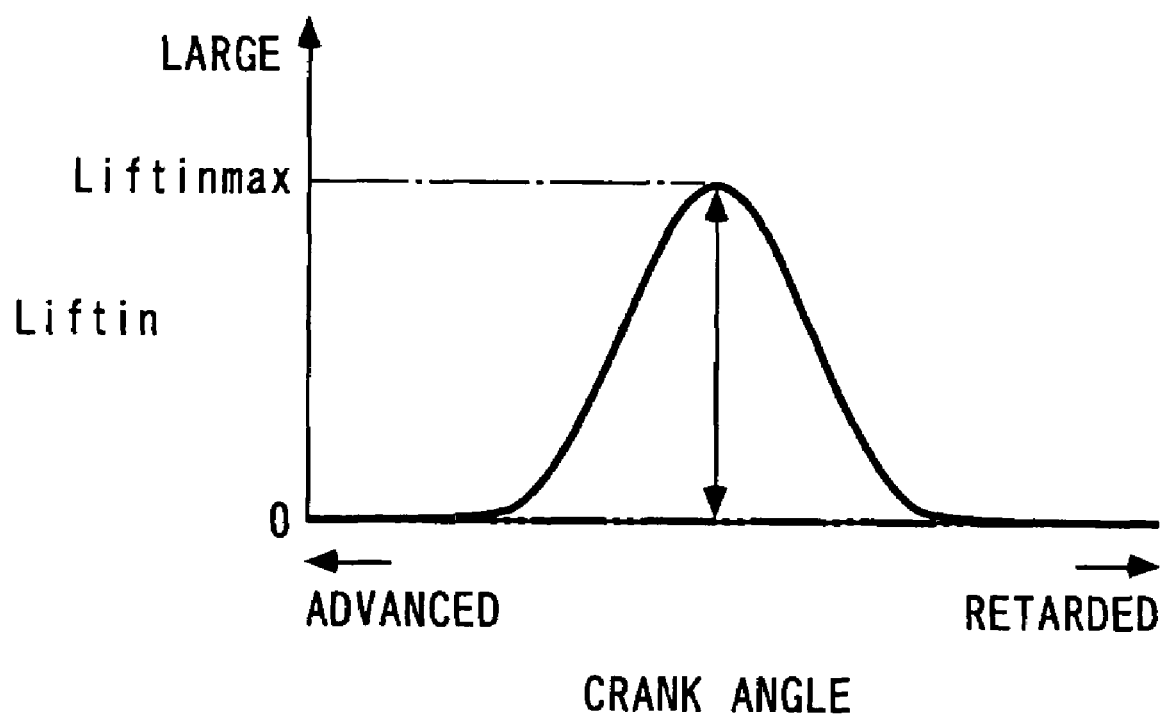
FIG. 7 is a diagram showing a valve lift curve (solid line) of the intake valve obtained when the lower link of the variable valve lift mechanism is in the maximum lift position, and a valve lift curve (two-dot chain line) of the intake valve obtained when the lower link of the variable valve lift mechanism is in the zero lift position.

For the above reason, during rotation of the intake cam 6, when the lower link 54 is in the maximum lift position, the intake valve 4 is opened according to a valve lift curve indicated by a solid line in FIG. 7, and the valve lift Liftin takes its maximum value Liftinmax. On the other hand, when the lower link 54 is in the zero lift position, as indicated by a two-dot chain line in FIG. 7, the intake valve 4 is held in the closed state, and the valve lift Liftin is held at 0.

Therefore, in the variable valve lift mechanism 50, the lower link 54 is pivotally moved by the lift actuator 60 between the maximum lift position and the zero lift position, whereby it is possible to continuously change the valve lift Liftin between the maximum value Liftinmax and 0.

It should be noted that the variable valve lift mechanism 50 includes a lock mechanism, not shown, and the lock mechanism locks the operation of the variable valve lift mechanism 50 when the lift control input U_Liftin is set to a failure-time value U_Liftin_fs, as described hereinafter, or when the lift control input U_Liftin is not input from the ECU 2 to the lift actuator 60 e.g. due to a disconnection. That is, the variable valve lift mechanism 50 is inhibited from changing the valve lift Liftin, whereby the valve lift Liftin is held at a predetermined locked value. It should be noted that when a cam phase Cain is held at a locked value, described hereinafter, the predetermined locked value is set to such a value as will make it possible to ensure a predetermined failure-time value Gcyl_fs of the intake air amount, described hereinafter. The predetermined failure-time value Gcyl_fs is set to a value which is capable of suitably carrying out idling or starting of the engine 3 during stoppage of the vehicle, and capable of maintaining a low-speed traveling state of the vehicle during travel of the vehicle.

The engine 3 is provided with a pivot angle sensor 25 (see FIG. 2). The pivot angle sensor 25 detects a pivot angle of the pivot shaft 66, i.e. the short arm 65, and delivers a signal indicative of the detected pivot angle of the short arm 65 to the ECU 2. The ECU 2 calculates the valve lift Liftin based on the detection signal from the pivot angle sensor 25. It should be noted that in the present embodiment, the pivot angle sensor 25 corresponds to reference parameter-detecting means and second reference parameter-detecting means, and the valve lift Liftin corresponds to a reference parameter, a second reference parameter, and an operating state parameter.

Figure 8:
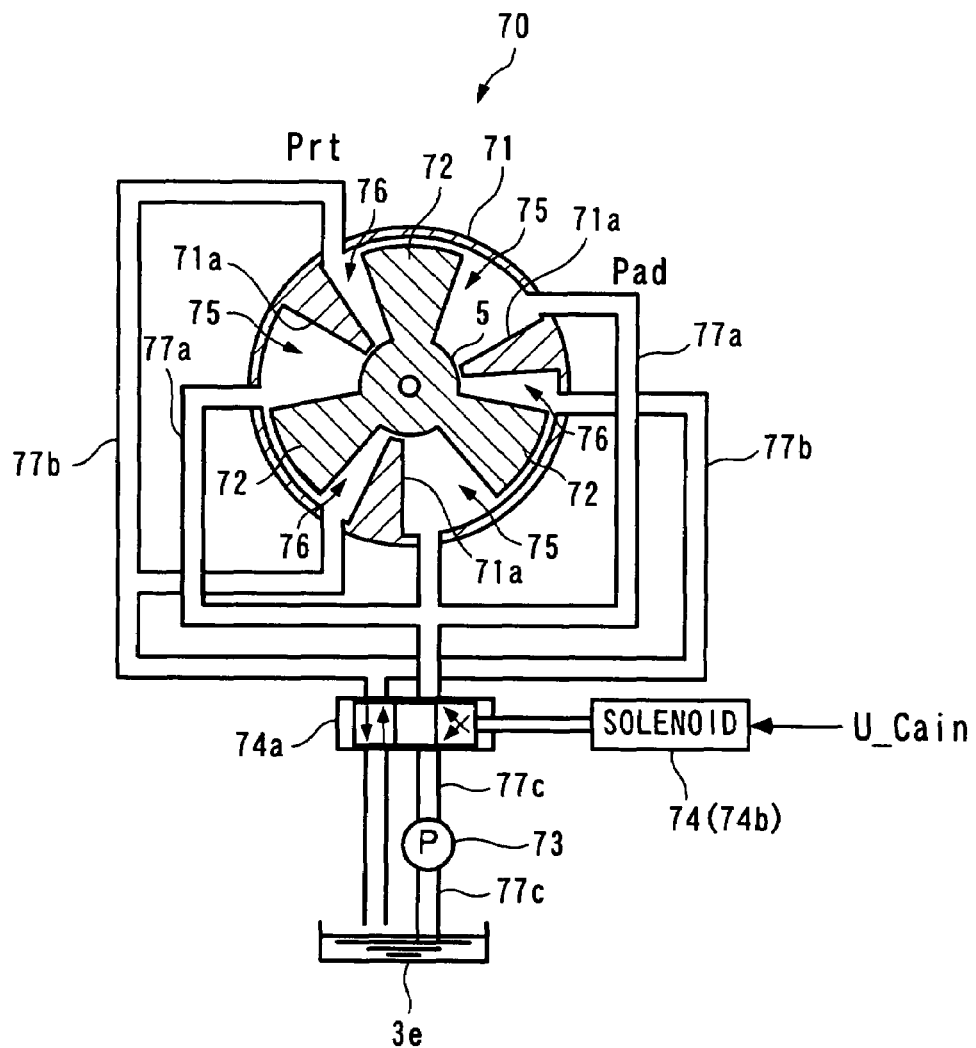
FIG. 8 is a schematic diagram of a variable cam phase mechanism.

Next, a description will be given of the aforementioned variable cam phase mechanism 70. The variable cam phase mechanism 70 is provided for continuously advancing or retarding the relative phase Cain of the intake camshaft 5 with respect to the crankshaft 3d (hereinafter referred to as "the cam phase Cain"), and mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5d, and divided by three partition walls 71a formed at equal intervals. The vane 72 is coaxially mounted on the end of the intake camshaft 5 where the intake sprocket is mounted, such that the blades of the vane 72 radially extends outward from the intake camshaft 5, and are rotatably housed in the housing 71. Further, the housing 71 has three advance chambers 75 and three retard chambers 76 each formed between one of the partition walls 71a and one of the three blades of the vane 72.

The oil pressure pump 73 is a mechanically-driven type which is connected to the crankshaft 3d. As the crankshaft 3d rotates, the oil pressure pump 73 draws lubricating oil stored in an oil pan 3e of the engine 3 via a lower part of an oil passage 77c, for pressurization, and supplies the pressurized oil to the solenoid valve mechanism 74 via the remaining part of the oil passage 77c.

The solenoid valve mechanism 74 is formed by combining a spool valve mechanism 74a and a solenoid 74b, and is connected to the advance chambers 75 and the retard chambers 76 via an advance oil passage 77a and a retard oil passage 77b such that oil pressure supplied from the oil pressure pump 73 is delivered to the advance chambers 75 and the retard chambers 76 as advance oil pressure Pad and retard oil pressure Prt, respectively. The solenoid 74b of the solenoid valve mechanism 74 is electrically connected to the ECU 2. When a phase control input U_Cain, described hereinafter, is input from the ECU 2, the solenoid 74b moves a spool valve element of the spool valve mechanism 74a within a predetermined range of motion according to the phase control input U_Cain to thereby change both the advance oil pressure Pad and the retard oil pressure Prt.

Figure 9:
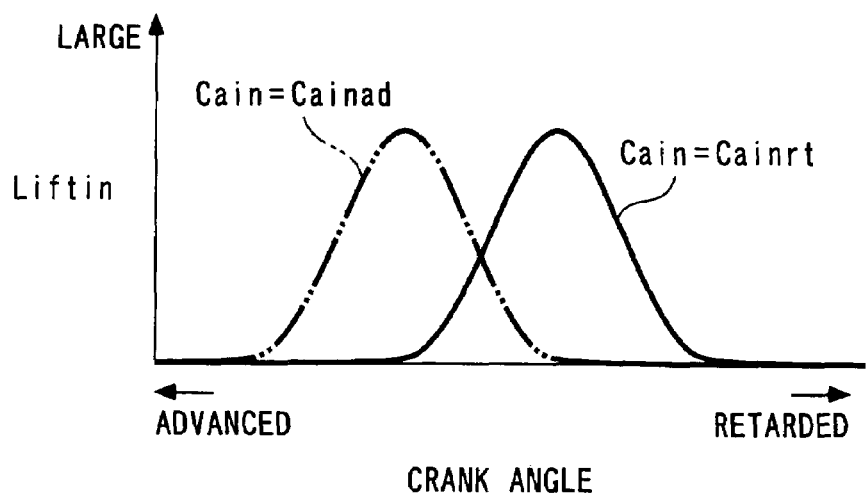
FIG. 9 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

In the variable cam phase mechanism 70 configured as above, during operation of the oil pressure pump 73, the solenoid valve mechanism 74 is operated according to the phase control input U_Cain, to supply the advance oil pressure Pad to the advance chambers 75 and the retard oil pressure Prt to the retard chambers 76, whereby the relative phase of the vane 72 with respect to the housing 71 is changed toward an advanced side or a retarded side. As a result, the cam phase Cain described above is continuously changed between a most retarded value Cainrt (value corresponding to a cam angle of e.g. 0°) and a most advanced value Cainad (value corresponding to a cam angle of e.g. 55°), whereby the valve timing of the intake valves 4 is continuously changed between most retarded timing indicated by a solid line in FIG. 9 and most advanced timing indicated by a two-dot chain line in FIG. 9.

It should be noted that the variable cam phase mechanism 70 includes a lock mechanism, not shown, which locks the operation of the variable cam phase mechanism 70, when oil pressure supplied from the oil pressure pump 73 is low, when the phase control input U_Cain is set to a failure-time value U_Cain_fs, described hereinafter, or when the phase control input U_Cain is not input to the solenoid valve mechanism 74 e.g. due to a disconnection. That is, the variable cam phase mechanism 70 is inhibited from changing the cam phase Cain, whereby the cam phase Cain is held at the predetermined locked value. The predetermined locked value is set to such a value as will make it possible to ensure the predetermined failure-time value Gcyl_fs of the intake air amount when the valve lift Liftin is held at the predetermined locked value, as described above.

As described above, in the variable intake valve-actuating mechanism 40 of the present embodiment, the variable valve lift mechanism 50 continuously changes the valve lift Liftin between the maximum value Liftinmax thereof and 0, and the variable cam phase mechanism 70 continuously changes the cam phase Cain, i.e. the valve timing of the intake valves 4 between the most retarded timing and the most advanced timing, described hereinbefore. Further, as described hereinafter, the ECU 2 controls the valve lift Liftin and the cam phase Cain via the variable valve lift mechanism 50 and the variable cam phase mechanism 70, whereby the intake air amount is controlled.

On the other hand, a cam angle sensor 26 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above. It should be noted that in the present embodiment, the cam angle sensor 26 corresponds to the first reference parameter-detecting means, and the cam phase Cain corresponds to the first reference parameter.

Next, as shown in FIG. 2, connected to the ECU 2 are an accelerator pedal opening sensor 27, and an ignition switch (hereinafter referred to as "the IG·SW") 28. The accelerator pedal opening sensor 27 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG·SW 28 is turned on or off by operation of an ignition key, not shown, and delivers a signal indicative of the ON/OFF state thereof to the ECU 2.

The ECU 2 is implemented by a microcomputer comprised of a CPU, a RAM, a ROM and an I/O interface (none of which are specifically shown). The ECU 2 determines operating conditions of the engine 3, based on the signals from the aforementioned sensors 20 to 27 and the ON/OFF signal from the IG·SW 28, and executes the control processes. More specifically, the ECU 2 executes air-fuel ratio control and ignition timing control, according to the operating conditions of the engine 3, as described hereinafter. In addition, the ECU 2 calculates a corrected valve lift Liftin_mod, and controls the valve lift Liftin and the cam phase Cain via the variable valve lift mechanism 50 and the variable cam phase mechanism 70, to thereby control the intake air amount.

It should be noted that in the present embodiment, the ECU 2 corresponds to the controlled variable-detecting means, the reference parameter-detecting means, target value-setting means, control input-calculating means, error parameter-calculating means, influence degree parameter-calculating means, corrected error parameter-calculating means, model-modifying means, first input value-calculating means, the first reference parameter-detecting means, the second reference parameter-detecting means, modification value-calculating means, first influence degree parameter-calculating means, corrected modification value-calculating means, and second influence degree parameter-calculating means.

Figure 10:
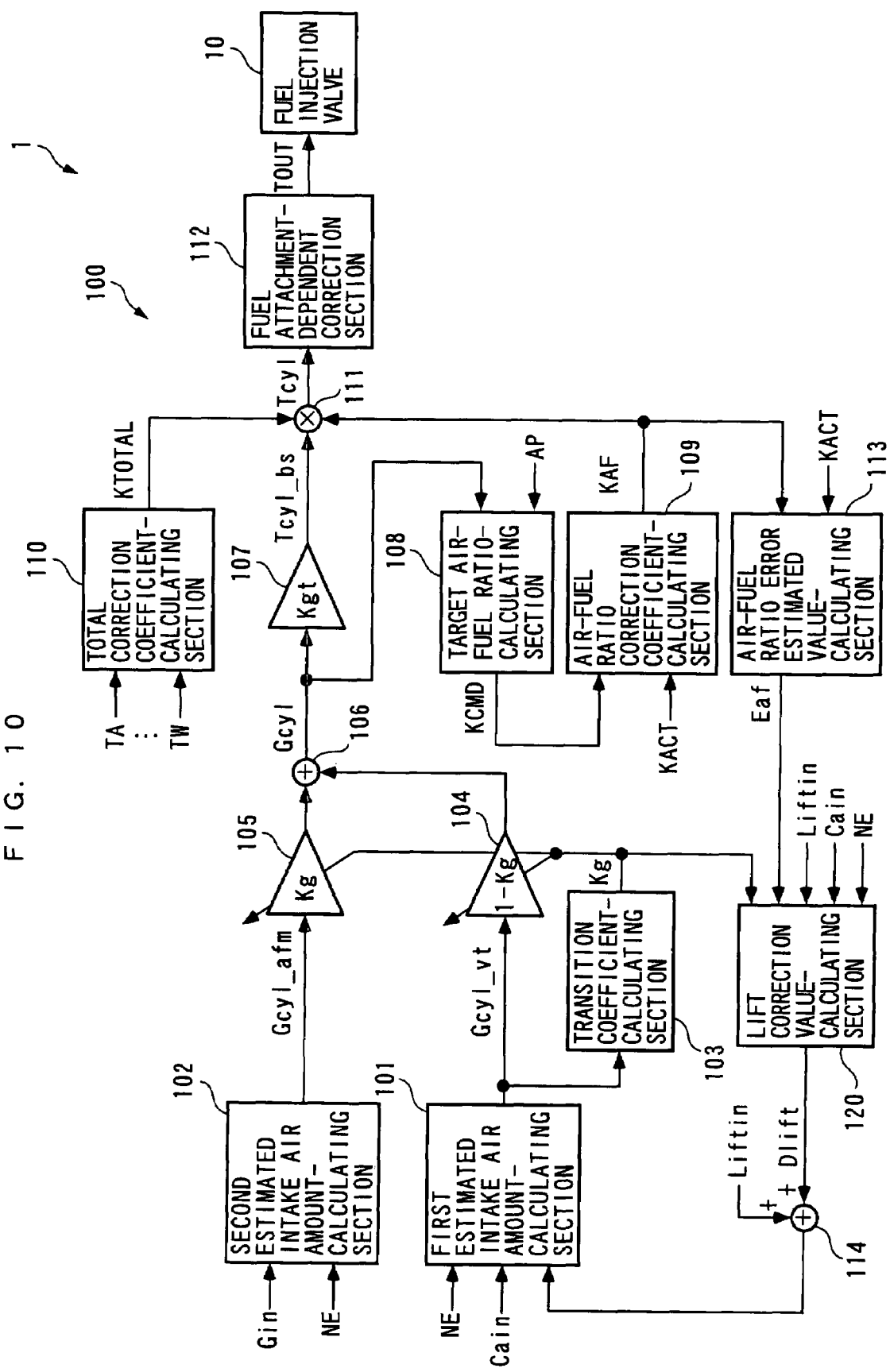
FIG. 10 is a schematic block diagram of an air-fuel ratio controller.

Next, a description will be given of the control apparatus 1 according to the present embodiment. The control apparatus 1, as shown in FIG. 10, includes an air-fuel ratio controller 100 which performs the air-fuel ratio control. As will be described hereinafter, the air-fuel ratio controller 100 is provided for calculating the fuel injection amount TOUT for each fuel injection valve 10, and implemented by the ECU 2. It should be noted that in the present embodiment, the air-fuel ratio controller 100 corresponds to the control input-calculating means, and the fuel injection amount TOUT to a control input and the amount of fuel to be supplied to the engine.

As shown in FIG. 10, the air-fuel ratio controller 100 includes first and second estimated intake air amount-calculating sections 101 and 102, a transition coefficient-calculating section 103, amplification elements 104 and 105, an addition element 106, an amplification element 107, a target air-fuel ratio-calculating section 108, an air-fuel ratio correction coefficient-calculating section 109, a total correction coefficient-calculating section 110, a multiplication element 111, a fuel attachment-dependent correction section 112, an air-fuel ratio error estimated value-calculating section 113, an addition element 114, and a lift correction value-calculating section 120.

First, as described hereinafter, the first estimated intake air amount-calculating section 101 calculates a first estimated intake air amount Gcyl_vt. More specifically, first, the first estimated intake air amount-calculating section 101 calculates a basic estimated intake air amount Gcyl_vt_base by searching a map shown in FIG. 11, according to the engine speed NE and the corrected valve lift Liftin_mod. The corrected valve lift Liftin_mod is a value obtained by correcting the valve lift Liftin using a lift correction value Dlift, described hereinafter. The reason for using the corrected valve lift Liftin_mod for calculating the first estimated intake air amount Gcyl_vt will be described hereinafter. It should be noted that the first estimated intake air amount-calculating section 101 uses a downsampled value as the corrected valve lift Liftin_mod. Further, in FIG. 11, NE 1 to NE3 represent predetermined values of the engine speed NE, which satisfy the relationship of NE1<NE2<NE3. This also applies to the following description.

In this map, when NE=NE1 or NE2 holds, in a region where the corrected valve lift Liftin_mod is small, the basic estimated intake air amount Gcyl_vt_base is set to a larger value as the corrected valve lift Liftin_mod is larger, whereas in a region where the corrected valve lift Liftin_mod is close to the maximum value Liftinmax, the basic estimated intake air amount Gcyl_vt_base is set to a smaller value as the corrected valve lift Liftin_mod is larger. This is because in a low-to-medium engine speed region, as the corrected valve lift Liftin_mod is larger in the region where the corrected valve lift Liftin_mod is close to the maximum value Liftinmax, the valve-opening time period of the intake valve 4 becomes longer, whereby charging efficiency is reduced by blow-back of intake air. Further, when NE=NE3 holds, the basic estimated intake air amount Gcyl_vt_base is set to a larger value as the corrected valve lift Liftin_mod is larger. This is because in a high engine speed region, the above-described blow-back of intake air is made difficult to occur even in a region where the corrected valve lift Liftin_mod is large, due to the inertia force of intake air, so that the charging efficiency becomes higher as the corrected valve lift Liftin_mod is larger.

Figure 12:
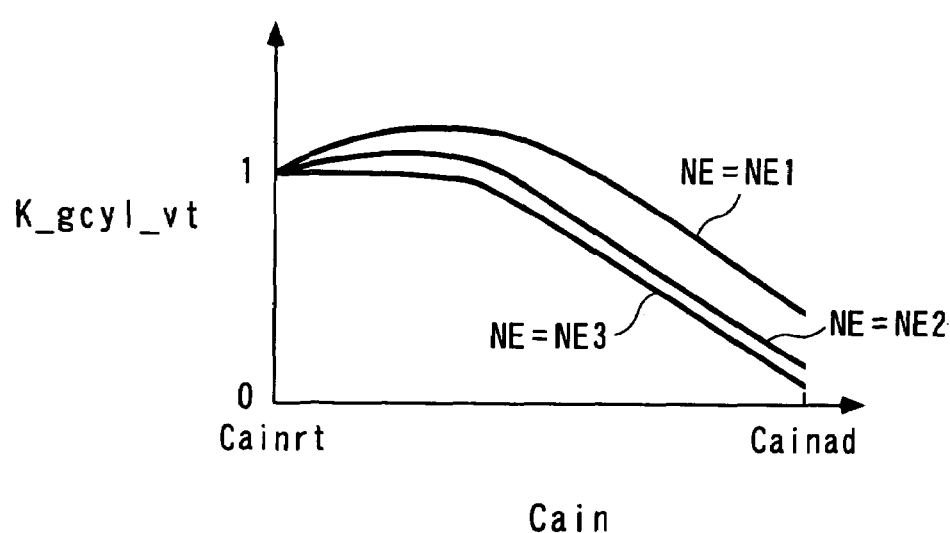
FIG. 12 is a diagram showing an example of a map for use in calculating a correction coefficient.

Further, a correction coefficient K_gcyl_vt is calculated by searching a map shown in FIG. 12, according to the engine speed NE and the cam phase Cain. In this map, when NE=NE1 or NE2 holds, in a region where the cam phase Cain is close to the most retarded value Cainrt, the correction coefficient K_gcyl_vt is set to a smaller value as the cam phase Cain is closer to the most retarded value Cainrt, and in the other regions, the correction coefficient K_gcyl_vt is set to a smaller value as the cam phase Cain takes a value closer to the most advanced value Cainad. This is because in the low-to-medium engine speed region, as the cam phase Cain is closer to the most retarded value Cainrt in the region where the cam phase Cain is close to the most retarded value Cainrt, the valve-closing timing of the intake valve 4 is retarded, whereby the charging efficiency is degraded by the blow-back of intake air, and in the other regions, as the cam phase Cain takes a value closer to the most advanced value Cainad, the valve overlap increases to increase the internal EGR amount, whereby the charging efficiency is degraded. Further, when NE=NE3 holds, in the region where the cam phase Cain is close to the most retarded value Cainrt, the correction coefficient K_gcyl_vt is set to a fixed value (a value of 1), and in the other regions, the correction coefficient K_gcyl_vt is set to a smaller value as the cam phase Cain takes a value closer to the most advanced value Cainad. This is because in the high engine speed region, the blow-back of intake air is made difficult to occur even in a region where the cam phase Cain is close to the most advanced value Cainad, due to the above-mentioned inertia force of intake air.

Then, the first estimated intake air amount Gcyl_vt is calculated using the basic estimated intake air amount Gcyl_vt_base and the correction coefficient K_gcyl_vt, calculated as above, by the following equation (1):

$$Gcyl\_vt(n) = K\_gcyl\_vt(n) \cdot Gcyl\_vt\_base(n) \quad (1)$$

In the above equation (1), discrete data with a symbol (n) indicates that it is data sampled or calculated at a control period ΔTn synchronous with generation of each TDC signal pulse. The symbol n indicates a position in the sequence of sampling or calculating cycles of respective discrete data. For example, the symbol n indicates that discrete data therewith is a value sampled in the current control timing, and a symbol n−1 indicates that discrete data therewith is a value sampled in the immediately preceding control timing. It should be noted that in the following description, the symbol (n) and the like provided for the discrete data are omitted as deemed appropriate.

Now, the method of calculating the first estimated intake air amount Gcyl_vt in the first estimated intake air amount-calculating section 101 is not limited to the above-described method, but any suitable method may be employed insofar as it calculates the first estimated intake air amount Gcyl_vt according to the engine speed NE, the corrected valve lift Liftin_mod, and the cam phase Cain. For example, the first estimated intake air amount Gcyl_vt may be calculated using a 4-dimensional map in which the relationship between the first estimated intake air amount Gcyl_vt, the engine speed NE, the corrected valve lift Liftin_mod, and the cam phase Cain is set in advance. Further, the first estimated intake air amount Gcyl_vt may be calculated using a neural network to which are input the engine speed NE, the corrected valve lift Liftin_mod, and the cam phase Cain, and from which is output the first estimated intake air amount Gcyl_vt.

It should be noted that in the present embodiment, the first estimated intake air amount-calculating section 101 corresponds to the first input value-calculating means, and the first estimated intake air amount Gcyl_vt corresponds to the first input value.

Further, the transition coefficient-calculating section 103 calculates a transition coefficient Kg as follows: First, an estimated flow rate Gin_vt (in units of g/sec) is calculated by the following equation (2), using the first estimated intake air amount Gcyl_vt calculated by the first estimated intake air amount-calculating sections 101, and the engine speed NE.

$$Gin\_vt(n) = \frac{2 \cdot Gcyl\_vt(n) \cdot NE(n)}{60} \quad (2)$$

Figures 13, 14:
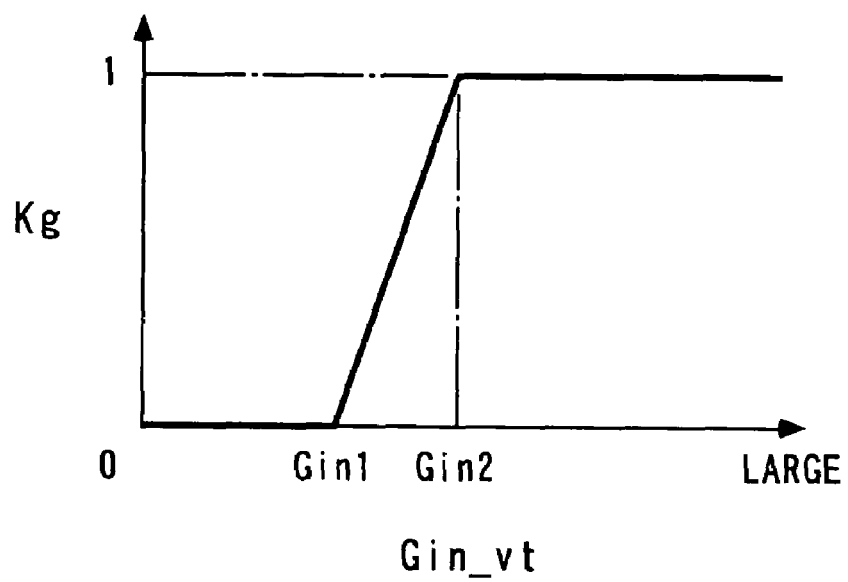
FIG. 13 is a diagram showing an example of a map for use in calculating a transition coefficient.
FIG. 14 is a diagram showing an example of a map for use in calculating a target air-fuel ratio.

Subsequently, the transition coefficient Kg is calculated by searching a table shown in FIG. 13 according to the estimated flow rate Gin_vt. In FIG. 13, Gin1 and Gin2 represent predetermined values which satisfy the relationship of Gin1<Gin2. Since the flow rate of air flowing through the intake passage 12a is small when the estimated flow rate Gin_vt is within the range of the Gin_vt≦Gin1, the predetermined value Gin1 is set to such a value as will cause the reliability of the first estimated intake air amount Gcyl_vt to exceed that of a second estimated intake air amount Gcyl_afm, referred to hereinafter, due to the resolution of the air flow sensor 22. Further, since the flow rate of air flowing through the intake passage 12a is large when the estimated flow rate Gin_vt is within the range of Gin2≦Gin_vt, the predetermined value Gin2 is set to such a value as will cause the reliability of the second estimated intake air amount Gcyl_afm to exceed that of the first estimated intake air amount Gcyl_vt. Furthermore, in this table, the transition coefficient Kg is set to 0 when the first estimated intake air amount Gcyl_vt is in the range of Gin_vt≦Gin1, and to 1 when the same is within the range of Gin2≦Gin_vt. When the estimated flow rate Gin_vt is within the range of Gin1<Gin_vt<Gin2, the transition coefficient Kg is set to a value which is between 0 and 1, and at the same time larger as the estimated flow rate Gin_vt is larger.

On the other hand, the second estimated intake air amount-calculating section 102 calculates the second estimated intake air amount Gcyl_afm (unit: g) based on the air flow rate Gin and the engine speed NE, by the following equation (3):

$$\text{Gcyl\_afm}(n) = \frac{Gin(n) \cdot 60}{2 \cdot NE(n)} \quad (3)$$

The amplification elements 104 and 105 amplify the first and second estimated intake air amounts Gcyl_vt and Gcyl_afm, calculated as above, to a (1-Kg)-fold and a Kg-fold, respectively. The addition element 106 calculates a calculated intake air amount Gcyl based on the values thus amplified, by a weighted average arithmetic operation expressed by the following equation (4):

$$Gcyl(n) = Kg \cdot Gcyl\_afm(n) + (1-Kg) \cdot Gcyl\_vt(n) \quad (4)$$

As is clear from the equation (4), when Kg=0, i.e. within the aforementioned range of Gin_vt≦Gin1, Gcyl=Gcyl_vt holds, and when Kg=1, i.e. within the aforementioned range of Gin2≦Gin_vt, Gcyl=Gcyl_afm holds. When 0<Kg<1, i.e. when the estimated flow rate Gin_vt is within the range of Gin1<Gin_vt<Gin2, the degrees of contributions of (the degrees of weighting) the first and second estimated intake air amounts Gcyl_vt and Gcyl_afm in the calculated intake air amount Gcyl are determined by the value of the transition coefficient Kg.

Furthermore, the amplification element 107 calculates a basic fuel injection amount Tcyl_bs based on the calculated intake air amount Gcyl, by the following equation (5). It should be noted that in the following equation (5), Kgt represents a conversion coefficient set in advance for each fuel injection valve 10.

$$Tcyl\_bs(n) = Kgt \cdot Gcyl(n) \quad (5)$$

Further, the target air-fuel ratio-calculating section 108 calculates a target air-fuel ratio KCMD by searching a map shown in FIG. 14 according to the calculated intake air amount Gcyl and the accelerator pedal opening AP. In this map, the value of the target air-fuel ratio KCMD is set as an equivalent ratio, and basically, it is set to a value corresponding to a stoichiometric air-fuel ratio (14.5) so as to maintain excellent emission-reducing performance of the catalytic converter. It should be noted that in the present embodiment, the target air-fuel ratio-calculating section 108 corresponds to the target value-setting means, and the target air-fuel ratio KCMD corresponds to a target value.

Furthermore, the air-fuel ratio correction coefficient-calculating section 109 calculates an air-fuel ratio correction coefficient KAF with a sliding mode control algorithm expressed by the following equations (6) to (10). It should be noted that in the above equations (6) to (10), discrete data with a symbol (m) indicates that it is data sampled or calculated every combustion cycle, i.e. whenever a total of four successive pulses of the TDC signal are generated. The symbol m indicates a position in the sequence of sampling cycles of respective discrete data.

$$KAF(m) = Urch'(m) + Uadp'(m) \quad (6)$$

$$Urch'(m) = -Krch' \cdot \sigma'(m) \quad (7)$$

$$Uadp'(m) = Uadp'(m-1) - Kadp' \cdot \sigma'(m) \quad (8)$$

$$\sigma'(m) = e(m) + S' \cdot e(m-1) \quad (9)$$

$$e(m) = KACT(m) - KCMD(m) \quad (10)$$

As shown in the equation (6), the air-fuel ratio correction coefficient KAF is calculated as the sum of a reaching law input Urch' and an adaptive law input Uadp' and the reaching law input Urch' is calculated using the equation (7). In the equation (7), Krch' represents a predetermined reaching law gain, and σ' represents a switching function defined by the equation (9). In the equation (9), S' represents a switching function-setting parameter set to a value which satisfies the relationship of −1<S'<0 and the symbol e represents a follow-up error defined by the equation (10). In this case, the convergence rate of the follow-up error "e" to 0 is designated by a value set to the switching function-setting parameter S'.

Furthermore, the adaptive law input Uadp' is calculated by the equation (8). In the equation (8), Kadp' represents a predetermined adaptive law gain. It should be noted that the initial value of the adaptive law input Uadp' is set to 1.

As described above, the air-fuel ratio correction coefficient-calculating section 109 calculates the air-fuel ratio correction coefficient KAF as a value for causing the actual air-fuel ratio KACT to converge to the target air-fuel ratio KCMD, with the sliding mode control algorithm expressed by the following equations (6) to (10). It should be noted that in the present embodiment, the air-fuel ratio correction coefficient KAF corresponds to a second input value.

On the other hand, the total correction coefficient-calculating section 110 calculates various correction coefficients by searching respective associated maps, not shown, according to parameters, such as the engine coolant temperature TW and the intake air temperature TA, indicative of the operating conditions of the engine, and calculates a total correction coefficient KTOTAL by multiplying the thus calculated correction coefficients by each other.

Further, the multiplication element 111 calculates a demanded fuel injection amount Tcyl by the following equation (11):

$$Tcyl(n) = Tcyl\_bs(n) \cdot KAF(n) \cdot KTOTAL(n) \quad (11)$$

Furthermore, the fuel attachment-dependent correction section 112 calculates the fuel injection amount TOUT by performing a predetermined fuel attachment-dependent correction process on the demanded fuel injection amount Tcyl calculated as above. Then, the fuel injection valve 10 is controlled such that the fuel injection timing and the valve-opening time period thereof are determined based on the fuel injection amount TOUT.

Next, a description will be given of the air-fuel ratio error estimated value-calculating section 113. As described hereinafter, the air-fuel ratio error estimated value-calculating section 113 calculates an air-fuel ratio error estimated value Eaf. First, the air-fuel ratio error estimated value-calculating section 113 calculates an actual air-fuel ratio estimated value KACT_hat based on the air-fuel ratio correction coefficient KAF and the actual air-fuel ratio KACT, by the following equation (12), and then calculates the air-fuel ratio error estimated value Eaf by the following equation (13).

$$KACT\_hat(k) = \frac{KACT(k)}{KAF(k-d)} \quad (12)$$

$$Eaf(k) = KACT\_hat(k) - KCMD(k-d) \quad (13)$$

In the above equations (12) and (13), discrete data with a symbol (k) indicates that it is data sampled or calculated at a predetermined control period ΔTk (5 msec, in the present embodiment). The symbol k indicates a position in the sequence of sampling or calculating cycles of respective discrete data. It should be noted that in the following description, the symbol (k) provided for the discrete data is omitted as deemed appropriate. Further, in the above equations (12) and (13), a symbol "d" represents a dead time it takes for combustion gases to reach the LAF sensor 24 from the combustion chamber.

As shown in the equation (12), the actual air-fuel ratio estimated value KACT_hat is calculated by dividing an actual air-fuel ratio KACT(k) obtained in the current control timing by an air-fuel ratio correction coefficient KAF(k−d) calculated in control timing the dead time d earlier, and hence as a value which is not adversely affected by the air-fuel ratio correction coefficient KAF(k−d). More specifically, the actual air-fuel ratio estimated value KACT_hat is calculated as a value of the actual air-fuel ratio in the current control timing, estimated assuming that air-fuel ratio feedback control was not executed in the control timing the dead time d earlier.

Therefore, the air-fuel ratio error estimated value Eaf is calculated as the difference between the actual air-fuel ratio estimated value KACT_hat(k) calculated as above and a target air-fuel ratio KCMD(k−d) calculated in control timing the dead time d earlier, and hence the air-fuel ratio error estimated value Eaf corresponds to an error of air-fuel ratio control in the current control timing, estimated assuming that the air-fuel ratio feedback control was not executed in the control timing the dead time d earlier. It should be noted that in the present embodiment, the air-fuel ratio error estimated value-calculating section 113 corresponds to the error parameter-calculating means, and the air-fuel ratio error estimated value Eaf corresponds to an error parameter.

Next, a description will be given of the aforementioned lift correction value-calculating section 120. The lift correction value-calculating section 120 calculates a lift correction value Dlift by a method, described hereinafter. As described hereinbefore, in the control apparatus 1, the basic estimated intake air amount Gcyl_vt_base is calculated using the corrected valve lift Liftin_mod obtained by correcting the valve lift Liftin by the lift correction value Dlift, and the FIG. 11 map. Hereinafter, the reason for using the corrected valve lift Liftin_mod will be described.

Figure 11:
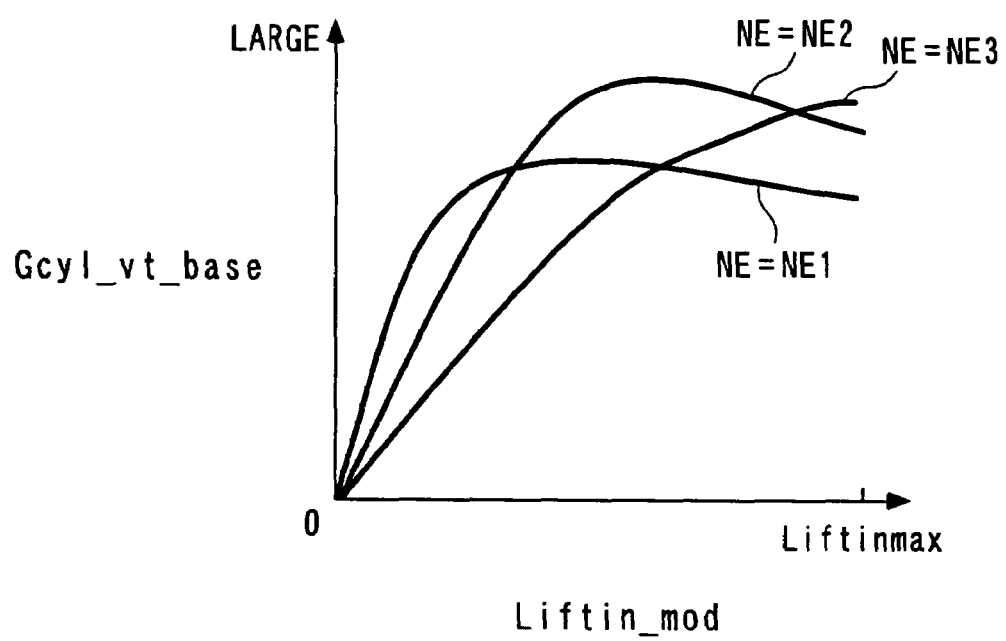
FIG. 11 is a diagram showing an example of a map for use in calculating a basic estimated intake air amount.

When the intake air amount is controlled via the variable valve lift mechanism 50 as in the control apparatus 1 of the present embodiment, the relationship between the valve lift Liftin and the basic estimated intake air amount Gcyl_vt_base deviates from the actual relationship therebetween, whereby when the basic estimated intake air amount Gcyl_vt_base is calculated using the valve lift Liftin (e.g. when the valve lift Liftin is represented by the horizontal axis in FIG. 11, referred to hereinabove), there is a possibility that the calculated value of the basic estimated intake air amount Gcyl_vt_base is different from the actual value thereof.

More specifically, when the mounted state of the pivot angle sensor 25 is changed e.g. by impact, or the characteristic of the pivot angle sensor 25 changes with a change in the temperature thereof, the calculated value of the valve lift Liftin sometimes deviates from the actual value thereof, and in such a case, there occurs an error in the calculation of the aforementioned basic estimated intake air amount Gcyl_vt_base. Further, also when the dynamic characteristics of the variable valve lift mechanism 50 (i.e. the relationship of the valve lift Liftin to the lift control input U_Liftin) are changed by wear of components of the variable valve lift mechanism 50, attachment of stain, and play produced by aging, there occurs an error in the calculation of the basic estimated intake air amount Gcyl_vt_base. In the following description, a state where the relationship between the valve lift Liftin and the basic estimated intake air amount Gcyl_vt_base has deviated from the actual relationship therebetween is referred to as "the lift error".

Figure 15:
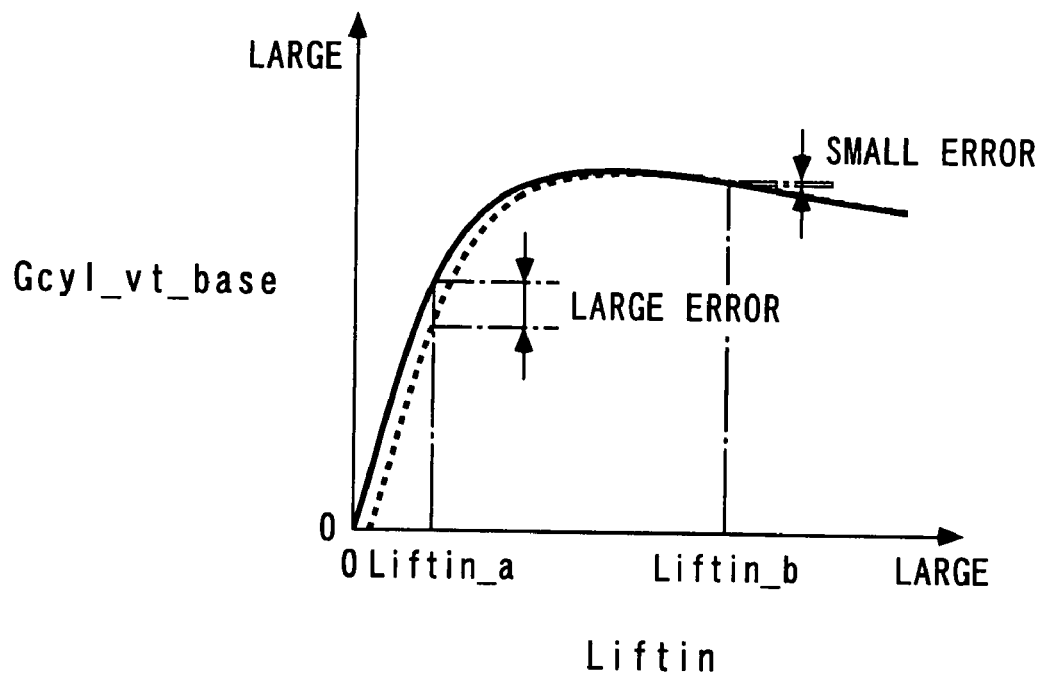
FIG. 15 is a diagram showing a state in which a lift error is caused by an offset of a calculated value of the valve lift with respect to the actual value thereof.
Figure 16:
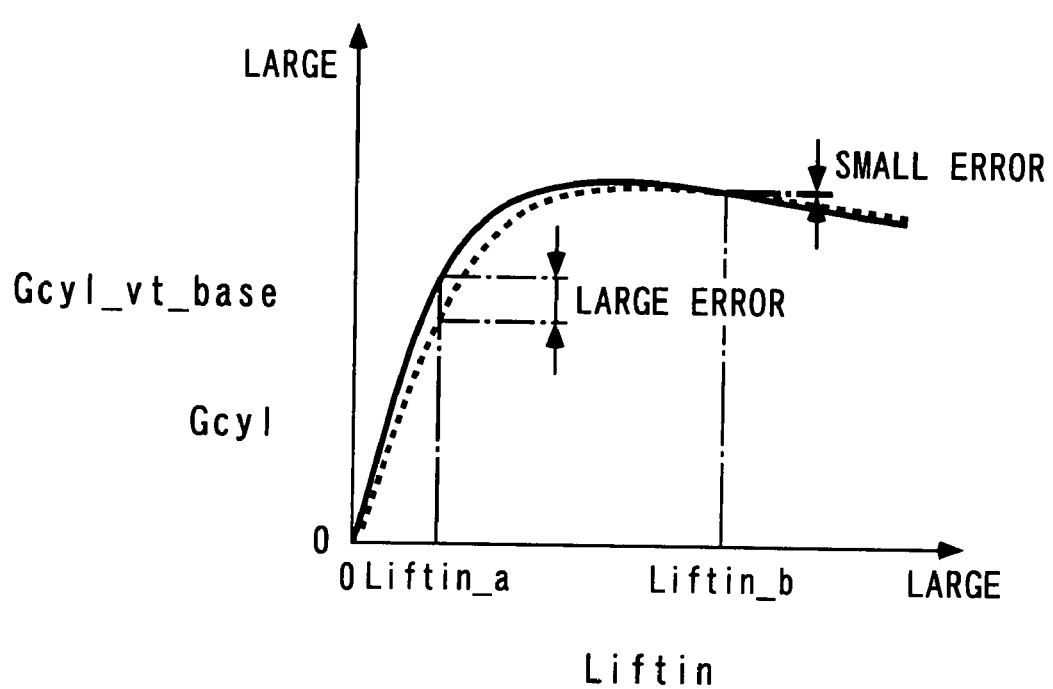
FIG. 16 is a diagram showing a state in which a lift error is caused by a change in dynamic characteristics of the variable valve lift mechanism.

It is considered that when the engine speed NE is a low engine speed region, the state where the above lift error occurs includes those shown in FIGS. 15 and 16. FIG. 15 shows a state in which the above-described lift error has occurred due to the offset (zero-point deviation) of the calculated value of the valve lift Liftin with respect to the actual value thereof. Further, FIG. 16 shows a state in which the lift error has occurred due to the aforementioned change in the dynamic characteristics of the variable valve lift mechanism 50, although there is no error between the calculated value of the valve lift Liftin and the actual value thereof. In FIGS. 15 and 16, curves indicated by solid lines indicate states in which the lift error occurs in the relationship between the valve lift Liftin and the basic estimated intake air amount Gcyl_vt_base, and curves indicated by broken lines show states in which the lift error occurs.

As is clear from FIGS. 15 and 16, the lift error becomes larger when the valve lift Liftin is equal to a predetermined value Liftin_a in a small lift region than when the valve lift Liftin is equal to a predetermined value Liftin_b in a large lift region. More specifically, it is understood that the lift error becomes larger in the small lift region than in the large lift region both when the lift error occurs due to the above-described offset of the valve lift Liftin and when it occurs due to the dynamic characteristics of the variable valve lift mechanism 50.

Figure 17:
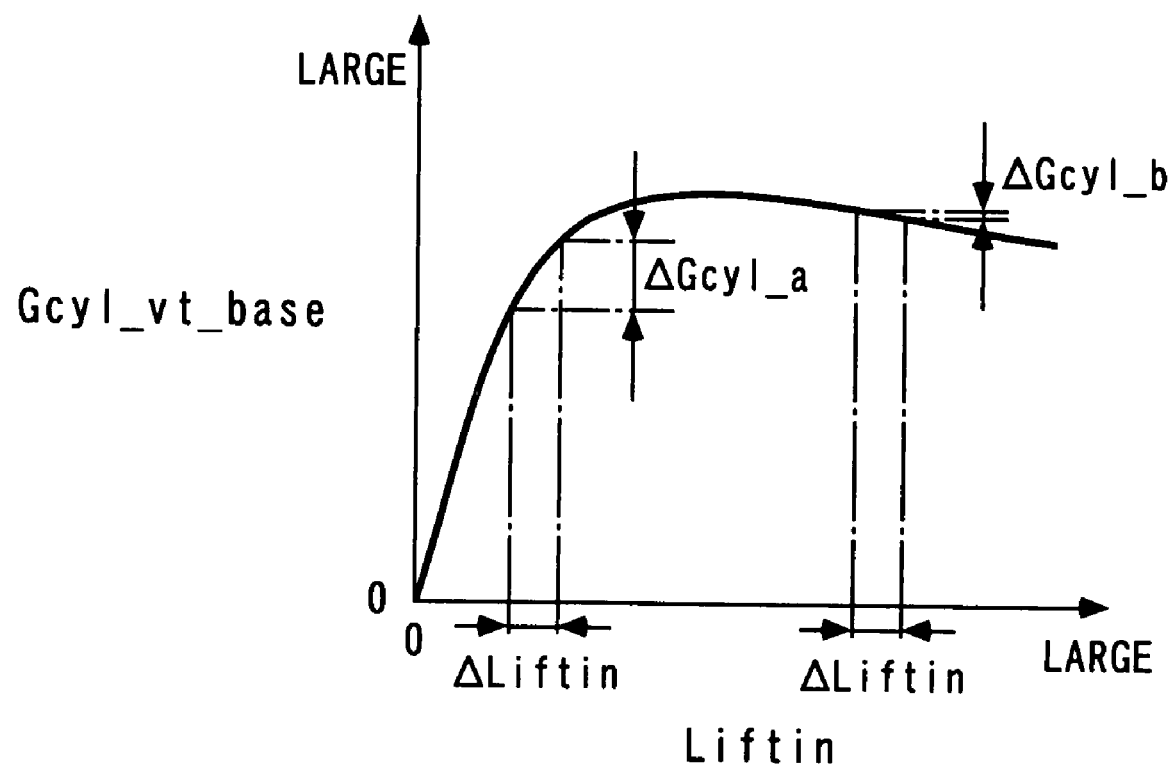
FIG. 17 is a diagram showing the relationship between an amount of change in the basic estimated intake air amount and an amount of change in the valve lift.

Further, as is clear from FIG. 17, when a change amount ΔGcyl of the basic estimated intake air amount Gcyl_vt_base with respect to a change amount ΔLiftin of the valve lift Liftin is considered, a value ΔGcyl_a thereof in the small lift region is larger than a value ΔGcyl_b thereof in the large lift region, so that a ratio ΔGcyl/ΔLiftin between the two change amounts satisfies the relationship of (ΔGcyl_a/ΔLiftin)≫(ΔGcyl_b/ΔLiftin).

Now, assuming that the air-fuel ratio error estimated value Eaf is generated due to the lift error, the degree of influence of the lift error on the air-fuel ratio error estimated value Eaf, that is, the sensitivity of the air-fuel ratio error estimated value Eaf to the lift error can be considered to increase or decrease in the same manner as the magnitude of the above-described ratio ΔGcyl/ΔLiftin. In other words, when the air-fuel ratio error estimated value Eaf is generated, it can be considered that the probability of the air-fuel ratio error estimated value Eaf being caused by the lift error is higher as the ratio ΔGcyl/ΔLiftin is larger. Furthermore, the value of the ratio ΔGcyl/ΔLiftin changes not only according to the valve lift Liftin and the engine speed NE (see FIG. 11, referred to hereinabove) but also according to the cam phase Cain, and hence the sensitivity of the air-fuel ratio error estimated value Eaf to the lift error also changes according to the three values of Liftin, Ne, and Cain.

For the above reason, the lift correction value-calculating section 120 calculates the lift correction value Dlift for correcting the valve lift Liftin by a method, described hereinafter, as a value which reflects the above-described sensitivity of the air-fuel ratio error estimated value Eaf to the lift error.

Figure 18:
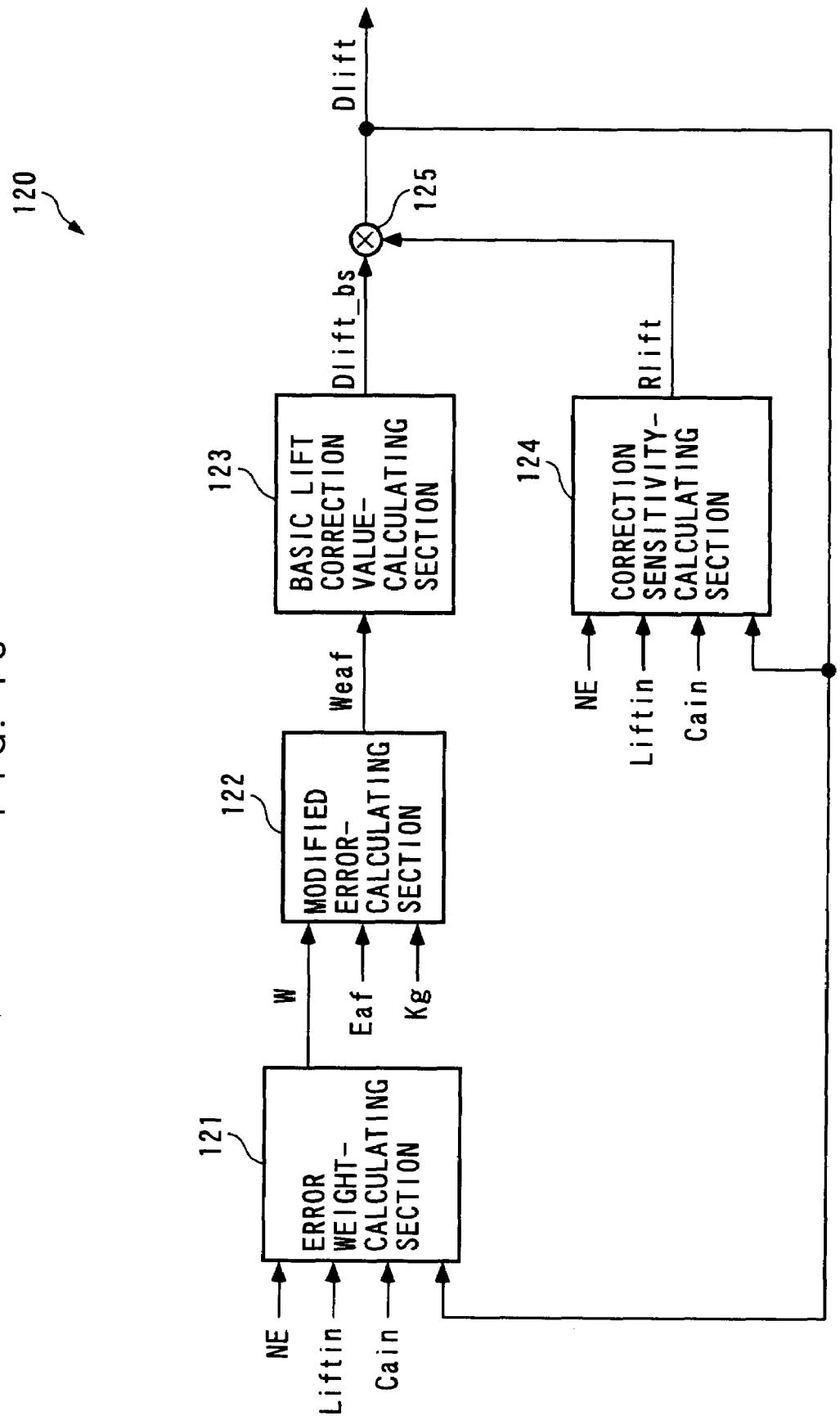
FIG. 18 is a schematic block diagram of a lift correction value-calculating section.

As shown in FIG. 18, the lift correction value-calculating section 120 is comprised of an error weight-calculating section 121, a modified error-calculating section 122, a basic lift correction value-calculating section 123, a correction sensitivity-calculating section 124, a multiplication element 125, and an addition element 126. It should be noted that in the present embodiment, the lift correction value-calculating section 120 corresponds to the model-modifying means and the corrected modification value-calculating means, and the lift correction value Dlift corresponds to a corrected modification value.

First, the error weight-calculating section 121 calculates an error weight W, as described hereinafter. It should be noted that in the present embodiment, the error weight-calculating section 121 corresponds to the influence degree parameter-calculating means and the second influence degree parameter-calculating means, and the error weight W corresponds to an influence degree parameter and a second influence degree parameter.

First, the error weight-calculating section 121 calculates a second corrected valve lift Liftin_mod_p by the following equation (14):

$$\text{Liftin\_mod\_}p(k)=\text{Liftin}(k)+\text{Dlift}(k-1) \tag{14}$$

As shown in the equation (14), the second corrected valve lift Liftin_mod_p is calculated as the sum of the current value Liftin(k) of the valve lift and the immediately preceding value Dlift(k−1) of the lift correction value. This is because the current value Dlift(k) of the lift correction value has not been calculated yet when the second corrected valve lift Liftin_mod_p is calculated.

Figure 19:
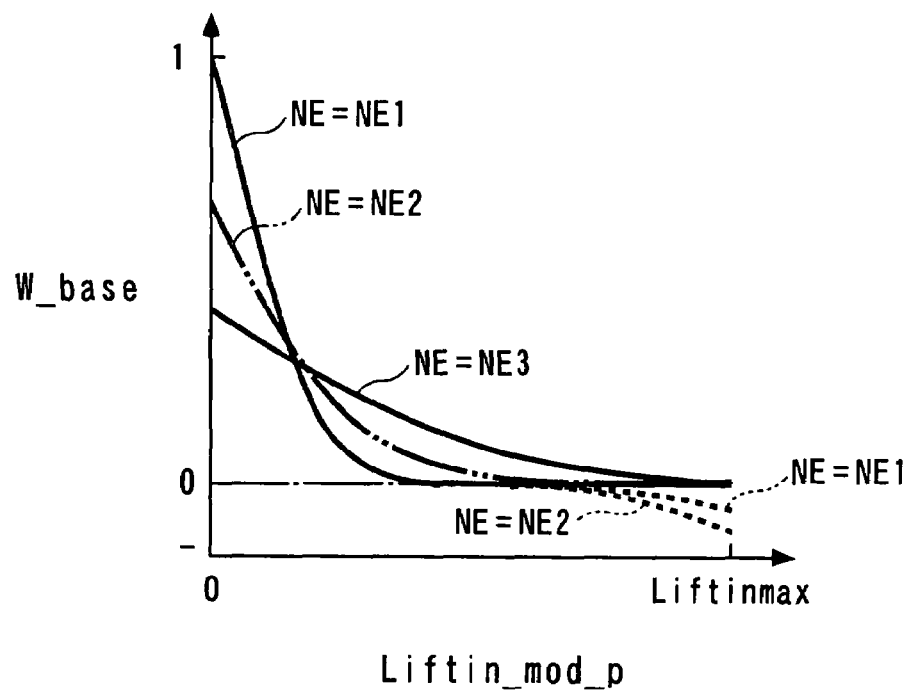
FIG. 19 is a diagram showing an example of a map for use in calculating a basic error weight.

Then, the error weight-calculating section 121 calculates a basic error weight W_base by searching a map shown in FIG. 19 according to the second corrected valve lift Liftin_mod_p and the engine speed NE. The basic error weight W_base takes a value obtained by normalizing the aforementioned ratio ΔGcyl/ΔLiftin with reference to the absolute value |ΔGcyl_x/ΔLiftin_x| of a ratio ΔGcyl_x/ΔLiftin_x obtained at a predetermined minute lift and a predetermined low engine speed, that is, a value which satisfies the equation, W_base=(ΔGcyl/ΔLiftin)÷(|ΔGcyl_x/ΔLiftin_x|). As shown by broken lines in FIG. 21, on condition that ΔGcyl/ΔLiftin<0 holds, the basic error weight W_base is set to 0 for the reason described hereinafter.

In this map, the basic error weight W_base is set to a larger value as the second corrected valve lift Liftin_mod_p is smaller. This is because the aforementioned sensitivity of the air-fuel ratio error estimated value Eaf to the lift error, i.e. the ratio ΔGcyl/ΔLiftin takes a larger value as the second corrected valve lift Liftin_mod_p is smaller. Further, in the small lift region, the basic error weight W_base is set to a smaller value as the engine speed NE is higher, whereas in the other lift regions, the basic error weight W_base is set to a larger value as the engine speed NE is higher. The reason for this is the same as given in the description of the FIG. 11 map (changes in the charging efficiency and the blow-back of intake air). It should be noted that in the present embodiment, the map shown in FIG. 19 corresponds to an influence degree model and a second influence degree model.

Figure 20:
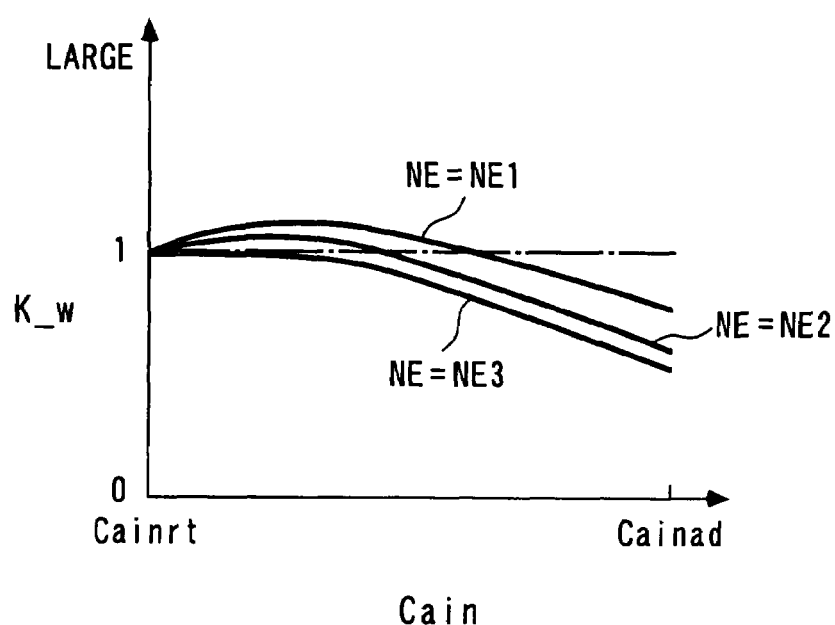
FIG. 20 is a diagram showing an example of a map for use in calculating an error weight correction coefficient.

Further, the error weight-calculating section 121 calculates an error weight correction coefficient K_w by searching a map shown in FIG. 20 according to the cam phase Cain and the engine speed NE. The error weight correction coefficient K_w takes a value obtained by normalizing the aforementioned ratio ΔGcyl/ΔLiftin with reference to the absolute value ΔGcyl_rt/ΔLiftin_rt of a ratio ΔGcyl_rt/ΔLiftin_rt obtained when the cam phase Cain is equal to the most retarded value, at each of the predetermined values NE1 to NE3 of the engine speed NE, that is, a value which satisfies the equation, W_base=(ΔGcyl/ΔLiftin)÷(|ΔGcyl_rt/ΔLiftin_rt|).

In this map, the error weight correction coefficient K_w is set to have the same tendency as that of the FIG. 12 correction coefficient K_gcyl_vt described above, with respect to the engine speed NE and the cam phase Cain. The reason for this is the same as given in the description of the FIG. 12 map (changes in the charging efficiency and the blow-back of intake air).

Then, finally, the error weight W is calculated by the following equation (15).

$$W(k)=W\_\text{base}(k)\cdot K\_w(k) \tag{15}$$

Thus, the error weight W is calculated by multiplying the basic error weight W_base by the error weight correction coefficient K_w, and hence the error weight W is calculated as a value which represents the sensitivity of the air-fuel ratio error estimated value Eaf to the lift error. More specifically, the error weight W is calculated as a larger value as the sensitivity of the air-fuel ratio error estimated value Eaf to the lift error, i.e. the ratio ΔGcyl/ΔLiftin is larger, in other words, as the probability of the air-fuel ratio error estimated value Eaf being caused by the lift error is higher. Further, the two values W_base and K_w are calculated by searching the two maps shown in FIGS. 19 and 20 according to the three parameters Liftin_mod_p, NE, and Cain, and the second corrected valve lift Liftin_mod_p is a value obtained by adding the immediately preceding value Dlift(k−1) of the lift correction value to the valve lift, so that it can be considered that the above two maps form a response surface model which represents the correlation between the three values Liftin, NE, and Cain, and the error weight W.

Thus, the error weight W is calculated according to the three values Liftin, NE, and Cain since the sensitivity of the air-fuel ratio error estimated value Eaf to the lift error is changed not only by the value of the valve lift Liftin but also by the values of the engine speed NE and the cam phase Cain. As a result, the error weight W is calculated as a value which represents the degree of influence of the three values Liftin, NE, and Cain on the air-fuel ratio error estimated value Eaf.

It should be noted that the FIG. 19 map for use in calculating the basic error weight W_base may be replaced by a map in which the basic error weight W_base is set according to the valve lift Liftin and the engine speed NE, that is, a map in which the second corrected valve lift Liftin_mod_p represented by the horizontal axis in FIG. 19 is replaced by the valve lift Liftin.

The modified error-calculating section 122 calculates a modified error Weaf by the following equation (16). It should be noted that the modified error-calculating section 122 corresponds to the corrected error parameter-calculating means, and the modified error Weaf corresponds to a corrected error parameter.

$$\text{Weaf}(k)=W(k)\cdot(1-Kg(k-d))\cdot\text{Eaf}(k) \tag{16}$$

In the above equation (16), a transition coefficient Kg(k−d) the dead time d earlier is used for the following reason: As is clear from reference to the aforementioned equation (4), when the transition coefficient Kg changes, the degrees of contributions of the first estimated intake air amount Gcyl_vt and the second estimated intake air amount Gcyl_afm in the calculated intake air amount Gcyl also change to change the sensitivity of the air-fuel ratio error estimated value Eaf to the lift error. In this case, the air-fuel ratio error estimated value Eaf calculated in the current control timing is caused by a calculated intake air amount Gcyl(k−d) calculated in control timing the dead time d earlier and the fuel injection amount TOUT calculated based on the calculated intake air amount Gcyl(k−d), so that it is assumed that the change in the sensitivity of the air-fuel ratio error estimated value Eaf to the lift error in the current control timing is caused by a change in the transition coefficient Kg(k−d) the dead time d earlier. Therefore, to compensate for the change in the sensitivity of the air-fuel ratio error estimated value Eaf to the lift error, the transition coefficient Kg(k−d) the dead time d earlier is employed for calculation of the transition coefficient weight Wkg.

Further, the basic lift correction value-calculating section 123 calculates a basic lift correction value Dlift_bs with a control algorism to which is applied a sliding mode control algorithm expressed by the following equations (17) to (24). That is, the basic lift correction value Dlift_bs is calculated as a value for causing the modified error Weaf to converge to 0.

$$\sigma(k) = Weaf(k) + S \cdot Weaf(k-1) \quad (17)$$

$$Urch(k) = -Krch \cdot \sigma(k) \quad (18)$$

$$Unl(k) = -Knl \cdot sgn(\sigma(k)) \quad (19)$$

$$Uadp(k) = -Kadp \cdot \delta(k) \quad (20)$$

$$\delta(k) = \lambda \cdot \delta(k-1) + \sigma(k) \quad (21)$$

When $Dlift\_bs\_L < Dlift\_bs(k-1) < Dlift\_bs\_H \; \lambda = 1$ (22)

When $Dlift\_bs(k-1) \leq Dlift\_bs\_L \; or \; Dlift\_bs\_H \leq Dlift\_bs(k-1) \; \lambda = \lambda lmt$ (23)

$$Dlift\_bs(k) = Urch(k) + Unl(k) + Uadp(k) \quad (24)$$

In the above equation (17), σ represents a switching function, and S represents a switching function-setting parameter set to a value which satisfies the relationship of −1<S<0. In this case, the convergence rate of the modified error Weaf to 0 is designated by a value set to the switching function-setting parameter S. Further, in the equation (18), Urch represents a reaching law input, and Krch a predetermined reaching law gain. Furthermore, in the equation (19), Unl represents a non-linear input, and Knl a predetermined non-linear input gain. Further, in the equation (19), sgn(a (k)) represents a sign function, and the value thereof is set such that sgn(σ(k))=1 holds when σ(k)≧0, and when σ(k)<0, sgn(σ(k))=−1 holds (it should be noted that the value thereof may be set such that sgn(σ(k))=0 holds when σ(k)=0).

In the equation (20), Uadp represents an adaptive law input, and Kadp represents a predetermined adaptive law gain. Further, in the equation (20), δ represents the integral value of a switching function calculated by the equation (21). In the equation (21), λ represents a forgetting coefficient, and as shown in the equations (22) and (23), the value thereof is set to 1 or a predetermined value λlmt, according to the results of comparison between the immediately preceding value Dlift_bs(k−1) of the basic lift correction value and predetermined upper and lower limit values Dlift_bs_H and Dlift_bs_L. The upper limit value Dlift_bs_H is set to a predetermined positive value, and the lower limit value Dlift_bs_L is set to a predetermined negative value, while the predetermined value λlmt is set to a value which satisfies the relationship of 0<λlmt<1.

Further, as shown in the equation (24), the basic lift correction value Dlift_bs is calculated as the sum of the reaching law input Urch, the non-linear input Unl, and the adaptive law input Uadp.

The forgetting coefficient λ is used in the algorithm for calculating the basic lift correction value Dlift_bs for the following reason: The air-fuel ratio correction coefficient KAF is calculated with the sliding mode control algorithm expressed by the equations (6) to (10), and the basic lift correction value Dlift_bs is calculated with the control algorithm to which is applied the sliding mode control algorithm expressed by the equations (17) to (24), such that the modified error Weaf calculated based on the air-fuel ratio correction coefficient KAF converges to 0. Therefore, unless the forgetting coefficient λ is used, the adaptive law inputs Uadp' and Uadp as integral terms in the above two control algorithms interfere with each other to exhibit an oscillating behavior, or the absolute values of the respective adaptive law inputs increase (i.e. the same state as in the parameter drift during the adaptive control), whereby the basic lift correction value Dlift_bs, i.e. the calculated value of the first estimated intake air amount Gcyl_vt temporarily becomes improper, which degrades controllability in a transient state.

In contrast, in the aforementioned equation (21), when the absolute value of the immediately preceding value Dlift_bs (k−1) of the basic lift correction value is large, to avoid an increase in the integral value δ of the switching function of the adaptive law input Uadp, the immediately preceding value δ (k−1) of the integral value of the switching function is multiplied by the forgetting coefficient λ which is set to a value within a range of 0<λ<1. In this case, when the aforementioned equation (21) is expanded by a recurrence formula thereof, the integral value δ (k−h) of the switching function calculated in control timing h (h is a natural number not smaller than 2) times earlier is multiplied by $\lambda^h$ (≈0), so that even when the calculation process proceeds, it is possible to avoid an increase in the integral value δ of the switching function, that is, an increase in the adaptive law input Uadp. As a result, it is possible to prevent the first estimated intake air amount Gcyl_vt from oscillating or temporarily taking an improper value, thereby making it possible to improve controllability in a transient state.

Further, if the forgetting coefficient λ is always set to a value within the range of 0<λ<1, when the modified error Weaf takes a value close to 0, the basic lift correction value Dlift_bs come to converge to a value close to 0 due to a forgetting effect provided by the forgetting coefficient λ, so that when a control error occurs again in such a state, it takes time to eliminate the control error. Therefore, to avoid the inconvenience and eliminate the control error quickly, it is necessary to hold the basic lift correction value Dlift_bs at a value capable of compensating for the modified error Weaf even when the value of the modified error Weaf is relatively small. Therefore, in the present embodiment, when the immediately preceding value Dlift_bs(k−1) of the basic lift correction value is within the above-described range, the forgetting coefficient λ is set to 1 so as to cancel the forgetting effect provided by the forgetting coefficient λ. It should be noted that when the forgetting effect by the forgetting coefficient λ is always unnecessary, the forgetting coefficient λ may be set to 1 in the equation (21) irrespective of the magnitude of the immediately preceding value Dlift_bs(k−1).

Further, the basic lift correction value Dlift_bs is calculated by the aforementioned equations (17) to (24) such that the modified error Weaf is caused to converge to 0, and hence e.g. when the above-described basic error weight W_base takes both a positive value and a negative value, if the basic error weight W_base changes between the positive value and the negative value, the sign of the modified error Weaf is inverted along with the change in the basic error weight W_base to invert the signs of the respective control inputs Urch, Unl, and Uadp, whereby the basic lift correction value Dlift_bs is calculated as an improper value, which can make the control unstable. Therefore, to ensure the stability of the control, in the above-described FIG. 19, the basic error weight W_base is set to 0 under a condition where it takes a negative value.

It should be noted that when the signs of gains of the respective control inputs Urch, Unl, and Uadp are controlled to be inverted along with the change in the sign of the basic error weight W_base, even when the basic error weight W_base takes both a positive value and a negative value, it is possible to ensure the stability of control, similarly to the present embodiment. Therefore, in such a case, the values of curves, shown by broken lines in FIG. 19, may be used on which the basic error weight W_base takes negative values. It should be noted that in the present embodiment, the basic lift correction value-calculating section 123 corresponds to the modification value-calculating means, and the basic lift correction value Dlift_bs corresponds to a modification value.

On the other hand, the above-described correction sensitivity-calculating section 124 calculates a correction sensitivity Rlift by the following method: First, the correction sensitivity-calculating section 126 calculates a second corrected valve lift Liftin_mod_p by the aforementioned equation (14).

Figure 21:
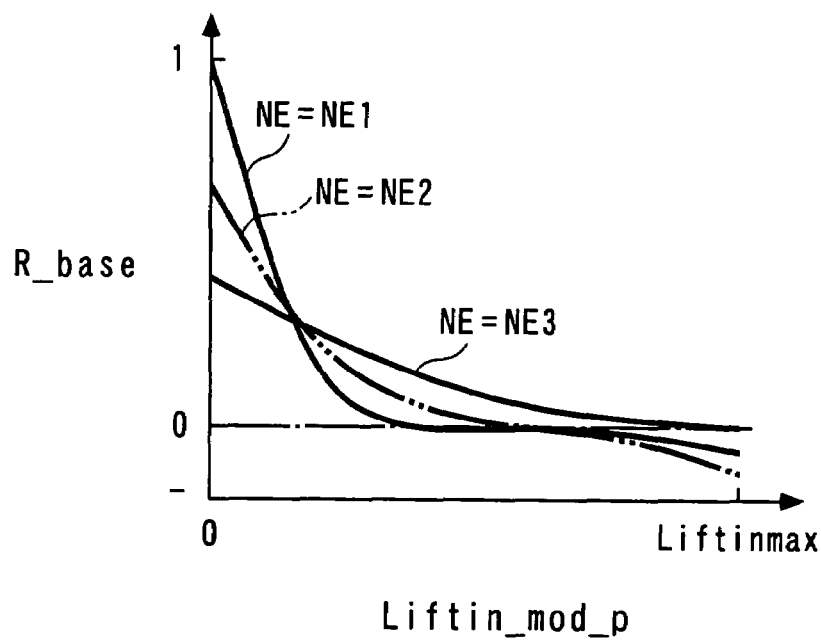
FIG. 21 is a diagram showing an example of a map for use in calculating a basic sensitivity.

Then, the correction sensitivity-calculating section 126 calculates a basic sensitivity R_base by searching a map shown in FIG. 21 according to the second corrected valve lift Liftin_mod_p and the engine speed NE. Similarly to the above-described basic error weight W_base, the basic sensitivity R_base takes a value obtained by normalizing the ratio ΔGcyl/ΔLiftin with reference to the absolute value |ΔGcyl_x/ΔLiftin_x| of the ratio ΔGcyl_x/ΔLiftin_x obtained at a predetermined minute lift and a predetermined low engine speed.

In this map, the basic sensitivity R_base is set to a larger value as the second corrected valve lift Liftin_mod_p is smaller. The reason for this is the same as given in the description of the FIG. 19 map. Further, in this map, differently from the basic error weight W_base, the basic sensitivity R_base is configured to assume both a positive value and a negative value. This is because as described hereinafter, the lift correction value Dlift is calculated by multiplying the basic lift correction value Dlift_bs by the correction sensitivity Rlift, and the corrected valve lift Liftin_mod is calculated by adding the lift correction value Dlift to the valve lift Liftin, so that even when the correction sensitivity Rlift takes both a positive value and a negative value, it is possible to enhance the responsiveness of the air-fuel ratio control without spoiling the stability of control.

Figure 22:
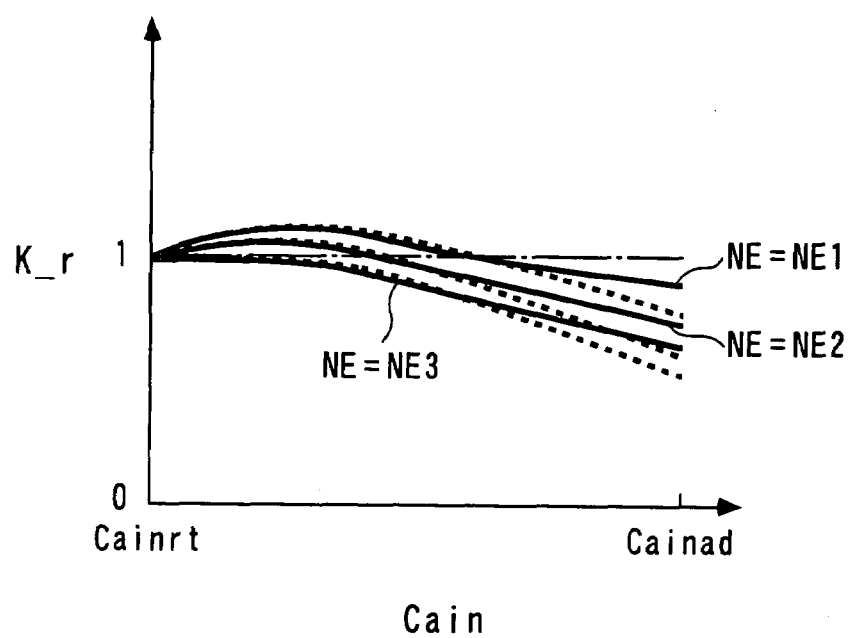
FIG. 22 is a diagram showing an example of a map for use in calculating a sensitivity correction coefficient.
Figure 24:
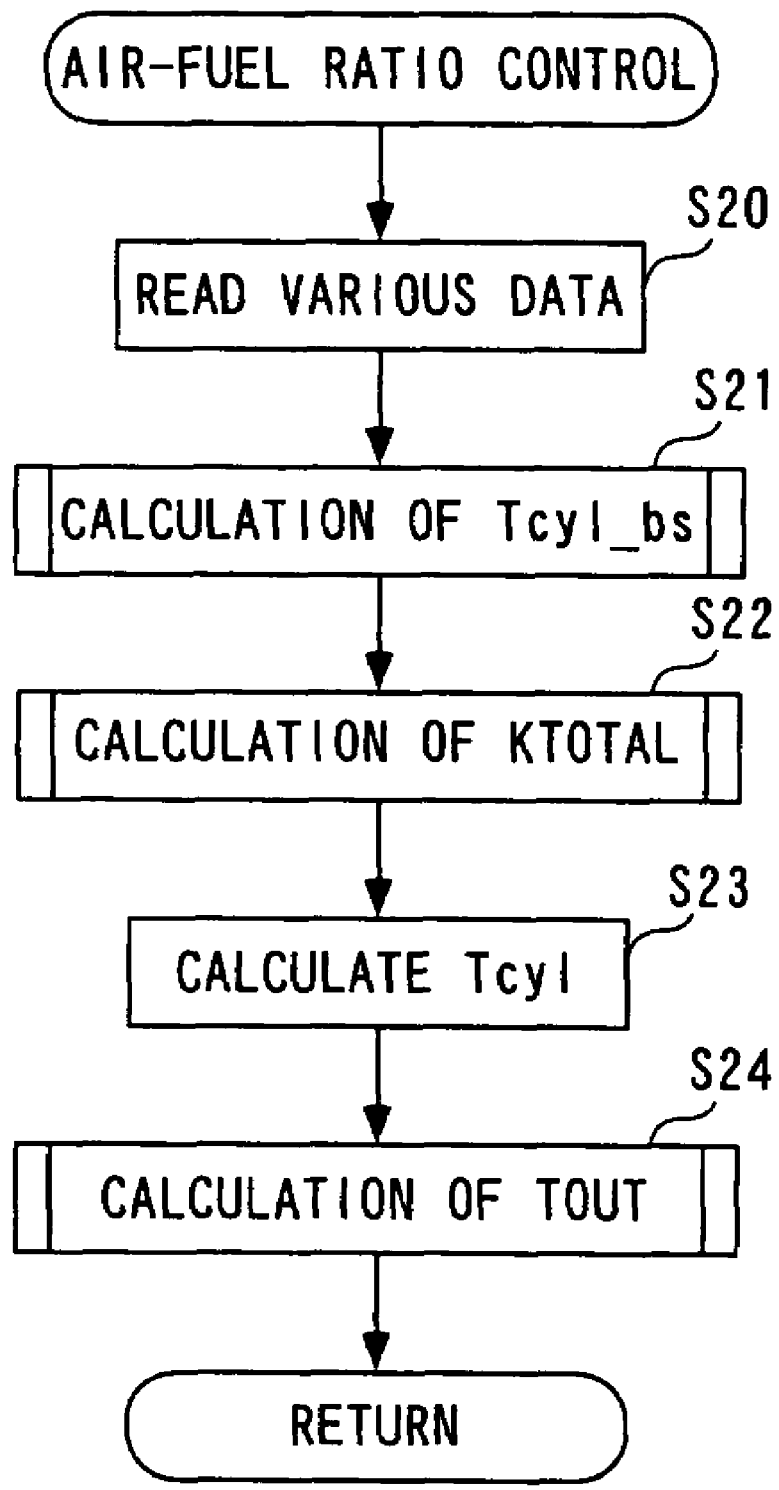
FIG. 24 is a flowchart of an air-fuel ratio control process.

Further, the correction sensitivity-calculating section 124 calculates a sensitivity correction coefficient K_r by searching a map shown in FIG. 22 according to the cam phase Cain and the engine speed NE. In FIG. 24, curves indicated by solid lines represent the values of the sensitivity correction coefficient K_r, and curves indicated by broken lines represent the values of the error weight correction coefficient K_w, for comparison. As is clear from the comparison between the curves, in this map, the sensitivity correction coefficient K_r is configured to have approximately the same tendency as that of the error weight correction coefficient K_w. The reason for this is the same as given in the description of the FIG. 20 map. In addition, the value of the sensitivity correction coefficient K_r on an advanced side thereof is set to a value closer to 1 than that of the error weight correction coefficient K_w. This is because when the cam phase Cain is controlled to be advanced, the fuel injection amount TOUT is calculated as a smaller value according to a decrease in the intake air amount, so that when the fuel injection amount TOUT is erroneously calculated as a value smaller than an appropriate value, the stability of combustion can be degraded by leaning of the air-fuel mixture. To avoid this problem, the map is configured as described above.

Then, finally, the correction sensitivity Rlift is calculated by the following equation (25).

$$R\text{lift}(k) = R\_\text{base}(k) \cdot K\_r(k) \quad (25)$$

As described above, since the correction sensitivity Rlift is calculated by the same method as employed for the calculation of the error weight W, the correction sensitivity Rlift is calculated not only as a value indicative of the sensitivity of the air-fuel ratio error estimated value Eaf to the lift error, that is, the degree of influence of the valve lift Liftin on the air-fuel ratio error estimated value Eaf but also as a value indicative of the degree of influence of the engine speed NE and the cam phase Cain on the air-fuel ratio error estimated value Eaf. Then, the lift correction value Dlift is calculated by multiplying the basic lift correction value Dlift_bs by the correction sensitivity Rlift calculated as above. The lift correction value Dlift is calculated by multiplying the basic lift correction value Dlift_bs by the correction sensitivity Rlift, as described above, since there is a fear that a change in the air-fuel ratio error estimated value Eaf is overcompensated for by the lift correction value Dlift if the lift correction value Dlift is calculated such that Dlift_bs=Dlift holds, without using the correction sensitivity Rlift under a condition where the sensitivity of the air-fuel ratio error estimated value Eaf to the lift error is low. To avoid this problem, the lift correction value Dlift is calculated as above.

It should be noted that as a map for use in calculating the basic sensitivity R_base, the correction sensitivity-calculating section 124 may use, in place of the FIG. 21 map, a map in which the basic sensitivity R_base is set according to the valve lift Liftin and the engine speed NE, that is, a map in which the second corrected valve lift Liftin_mod_p represented by the horizontal axis in FIG. 21 is replaced by the valve lift Liftin. It should be noted that in the present embodiment, the correction sensitivity-calculating section 124 corresponds to the first influence degree parameter-calculating means, the correction sensitivity Rlift corresponds to the first influence degree parameter, and the maps shown in FIGS. 21 and 22 correspond to the first influence degree models.

Subsequently, the multiplication element 125 calculates the lift correction value Dlift by the following equation (26).

$$D\text{lift}(k) = R\text{lift}(k) \cdot D\text{lift}\_bs(k) \quad (26)$$

The lift correction value-calculating section 120 calculates the lift correction value Dlift by the above-described method Then, the aforementioned addition element 114 calculates the corrected valve lift Liftin_mod by the following equation (27):

$$\text{Liftin}\_\text{mod}(k) = \text{Liftin}(k) + D\text{lift}(k) \quad (27)$$

As described above, the lift correction value Dlift is calculated by multiplying the basic lift correction value Dlift_bs by the correction sensitivity Rlift. In this case, since the basic lift correction value Dlift_bs is a value for causing the modified error Weaf to converge to 0, correction of the valve lift Liftin using the lift correction value Dlift corresponds to correcting or modifying the valve lift Liftin such that the lift error is eliminated. Therefore, calculating the basic estimated intake air amount Gcyl_vt_base by searching the aforementioned FIG. 11 map according to the corrected valve lift Liftin_mod thus calculated corresponds to calculating the first estimated intake air amount Gcyl_vt as the first input value by using a map modified such that the lift error is eliminated.

It should be noted that in the present embodiment, the FIG. 11 map corresponds to a correlation model, and the calculation of the first estimated intake air amount Gcyl_vt by searching the FIG. 11 map according to the corrected valve lift Liftin_mod obtained by correcting the valve lift Liftin by the lift correction value Dlift corresponds to calculating the first input value using a modified correlation model.

Figure 23:
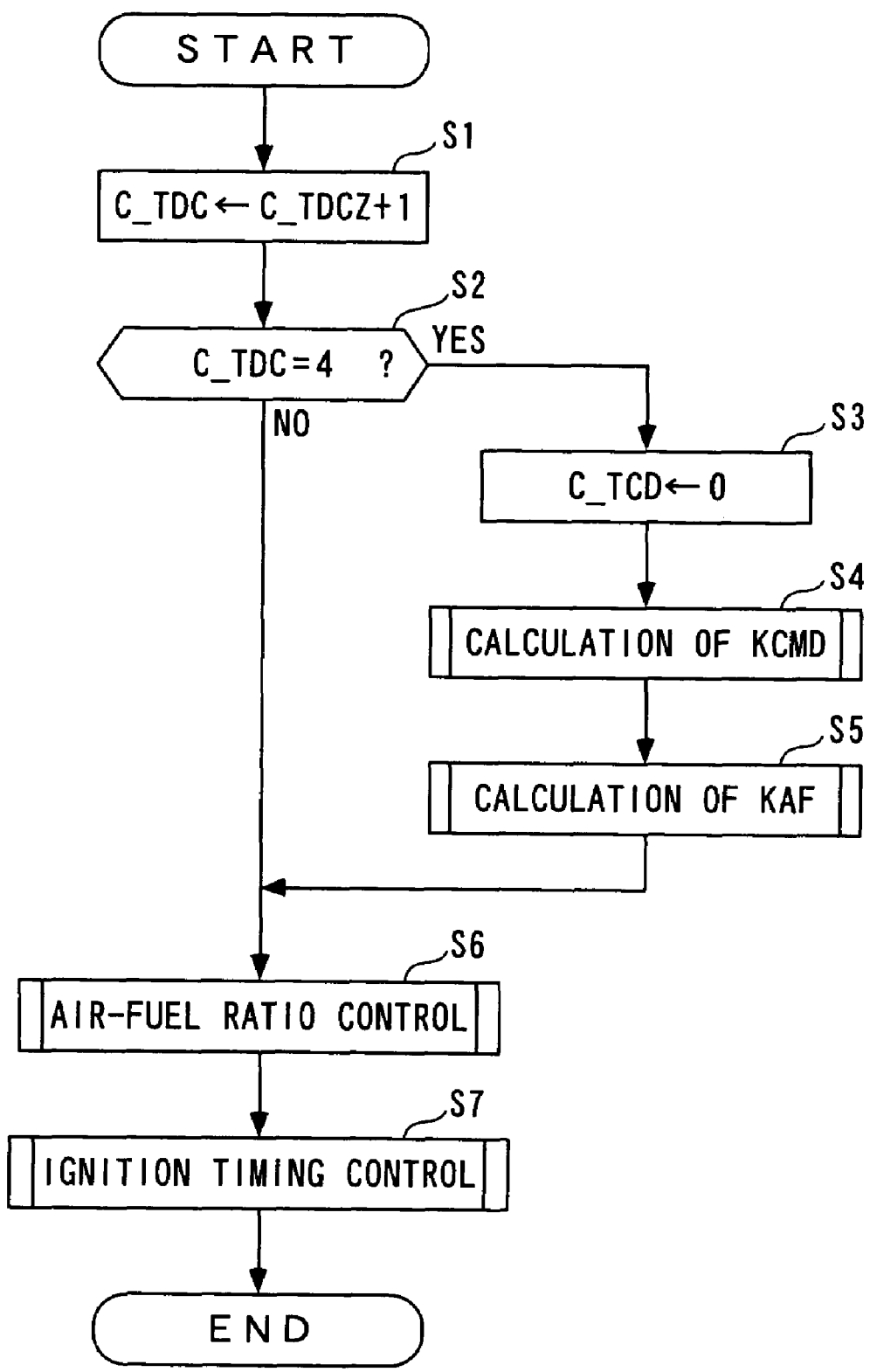
FIG. 23 is a flowchart of a control process executed at a control period.

Next, a control process carried out by the ECU 2 at the above-described control period ΔTn will be described with reference to FIG. 23. It should be noted that various calculated values referred to in the following description are assumed to be stored in the RAM of the ECU 2.

In this process, first, in a step 1 (shown as S1 in abbreviated form in FIG. 23; the following steps are also shown in abbreviated form), the counter value C_TDC of a TDC counter is set to the sum (C_TDCZ+1) of the immediately preceding value C_TDCZ of the counter value C_TDC and 1. This means that the counter value C_TDC of the TDC counter is incremented by 1.

Then, the process proceeds to a step 2, wherein it is determined whether or not C_TDC=4 holds. If the answer to this question is negative (NO), i.e. if C_TDC≠4 holds, the process proceeds to a step 6, described hereinafter. On the other hand, if the answer to this question is affirmative (YES), the process proceeds to a step 3, wherein the counter value C_TDC of the TDC counter is reset to 0.

In a step 4 following the step 3, the target air-fuel ratio KCMD is calculated. More specifically, as described above, the target air-fuel ratio KCMD is calculated by searching the map shown in FIG. 14 according to the calculated intake air amount Gcyl and the accelerator pedal opening AP.

Then, in a step 5, the air-fuel ratio correction coefficient KAF is calculated. More specifically, the air-fuel ratio correction coefficient KAF is calculated with the control algorithm expressed by the aforementioned equations (6) to (10) if conditions for executing air-fuel ratio feedback control are satisfied. On the other hand, if the conditions for executing air-fuel ratio feedback control are not satisfied, the air-fuel ratio correction coefficient KAF is set to 1.

In the step 6 following the step 2 or 5, an air-fuel ratio control process is executed. The air-fuel ratio control process is provided for calculating the fuel injection amount TOUT for each fuel injection valve 10, and detailed description thereof will be given hereinafter.

Subsequently, in a step 7, an ignition timing control process is performed. In this process, the ignition timing Iglog is calculated by the same method as employed in the ignition timing control process disclosed in Japanese Laid-Open Patent Publication (Kokai) No. 2005-315161 referred to hereinabove, though detailed description thereof is omitted here. After that, the present process is terminated.

As described above, in the FIG. 23 control process, the steps 3 to 5 are carried out whenever C_TDC=4 holds, and hence they are carried out whenever the total of four successive pulses of the TDC signal are generated, i.e. every combustion cycle.

Next, the aforementioned air-fuel ratio control process will be described with reference to FIG. 24. As will be described hereinafter, the present process is for calculating the fuel injection amount TOUT for each fuel injection valve 10. More specifically, the present process is for calculating the fuel injection amounts TOUT for the fuel injection valves 10 for the respective cylinders in the order of a first cylinder→a third cylinder→a fourth cylinder→a second cylinder, as the counter value C_TDC of the TDC counter is incremented from 1 to 4.

First, in a step 20, the aforementioned corrected valve lift Liftin_mod, air-fuel ratio correction coefficient KAF, and various parameters are read in. In this case, the corrected valve lift Liftin_mod is calculated at the control period ΔTn, as described above, and hence the reading of the corrected valve lift Liftin_mod corresponds to the downsampling of the same. Further, since the air-fuel ratio correction coefficient KAF is calculated every combustion cycle, the reading of the air-fuel ratio correction coefficient KAF corresponds to the oversampling of the same.

Figure 25:
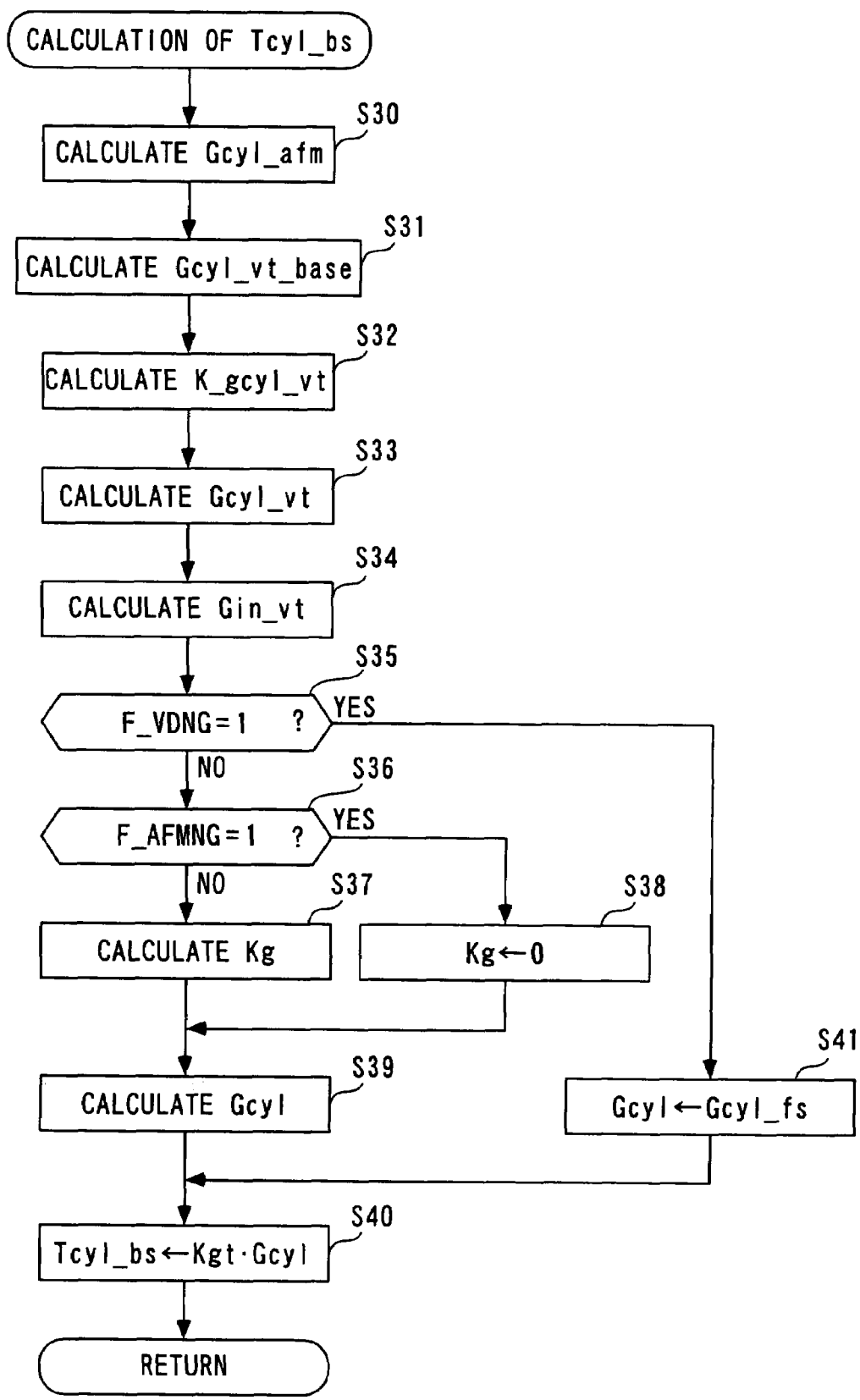
FIG. 25 is a flowchart of a process for calculating a basic fuel injection amount.

Then, in a step 21, the basic fuel injection amount Tcyl_bs is calculated. The process for calculating the basic fuel injection amount Tcyl_bs is performed as shown in FIG. 25. More specifically, first, in a step 30, the second estimated intake air amount Gcyl_afm is calculated by the aforementioned equation (3).

Then, in a step 31, as described heretofore, the basic estimated intake air amount Gcyl_vt_base is calculated by searching the FIG. 11 map according to the engine speed NE and the corrected valve lift Liftin_mod.

In a step 32 following the step 31, as described heretofore, the correction coefficient K_gcyl_vt is calculated by searching the FIG. 12 map according to the engine speed NE and the cam phase Cain.

After that, the process proceeds to a step 33, wherein the first estimated intake air amount Gcyl_vt is calculated by the aforementioned equation (1) based on the two values Gcyl_vt_base and K_gcyl_vt calculated in the steps 31 and 32.

Next, in a step 34, the estimated flow rate Gin_vt is calculated by the aforementioned equation (2), and thereafter the process proceeds to a step 35, wherein it is determined whether or not a variable mechanism failure flag F_VDNG is equal to 1.

The variable mechanism failure flag F_VDNG is set to 1 when it is determined in a failure determination process, not shown, that at least one of the variable valve lift mechanism 50 and the variable cam phase mechanism 70 is faulty, and to 0 when it is determined that the mechanisms 50 and 70 are both normal. It should be noted that in the following description, the variable valve lift mechanism 50 and the variable cam phase mechanism 70 are collectively referred to as "the two variable mechanisms".

If the answer to the question of the step 35 is negative (NO), i.e. if both of the two variable mechanisms are normal, the process proceeds to a step 36, wherein it is determined whether or not an air flow sensor failure flag F_AFMNG is equal to 1. The air flow sensor failure flag F_AFMNG is set to 1 when it is determined in a failure determination process, not shown, that the air flow sensor 22 is faulty, and to 0 when it is determined that the air flow sensor 22 is normal.

If the answer to the question of the step 36 is negative (NO), i.e. if the air flow sensor 22 is normal, the process proceeds to a step 37, wherein as described above, the transition coefficient Kg is calculated by searching the FIG. 13 map according to the estimated flow rate Gin_vt.

On the other hand, if the answer to the question of the step 36 is affirmative (YES), i.e. if the air flow sensor 22 is faulty, the process proceeds to a step 38, wherein the transition coefficient Kg is set to 0.

In a step 39 following the step 37 or 38, the calculated intake air amount Gcyl is calculated by the aforementioned equation (4). Then, in a step 40, the basic fuel injection amount Tcyl_bs is set to the product Kgt Gcyl of the conversion coefficient and the calculated intake air amount Gcyl, followed by terminating the present process.

On the other hand, if the answer to the question of the step 35 is affirmative (YES), i.e. if it is determined that at least one of the two variable mechanisms is faulty, the process proceeds to a step 41, wherein the calculated intake air amount Gcyl is set to the aforementioned predetermined failure-time value Gcyl_fs. Then, the aforementioned step 40 is executed, followed by terminating the present process.

Referring again to FIG. 24, in the step 21, the basic fuel injection amount Tcyl_bs is calculated, as described above, and then the process proceeds to a step 22, wherein the total correction coefficient KTOTAL is calculated. More specifically, as described above, the total correction coefficient KTOTAL is calculated by calculating various correction coefficients by searching respective associated maps according to operating parameters (e.g. the intake air temperature TA, the atmospheric pressure PA, the engine coolant temperature TW, the accelerator pedal opening AP, etc.), and then multiplying the thus calculated correction coefficients by each other.

Next, the process proceeds to a step 23, wherein the demanded fuel injection amount Tcyl is calculated by the aforementioned equation (11). Then, in a step 24, the fuel injection amount TOUT is calculated by carrying out a predetermined fuel attachment-dependent correction process on the demanded fuel injection amount Tcyl, as described above, followed by terminating the present process. Thus, each fuel injection valve 10 is controlled such that the fuel injection timing and the valve-opening time period thereof assume values determined based on the fuel injection amount TOUT. As a result, if the conditions for executing the air-fuel ratio feedback control are satisfied, the actual air-fuel ratio KACT is controlled such that it converges to the target air-fuel ratio KCMD.

Figure 26:
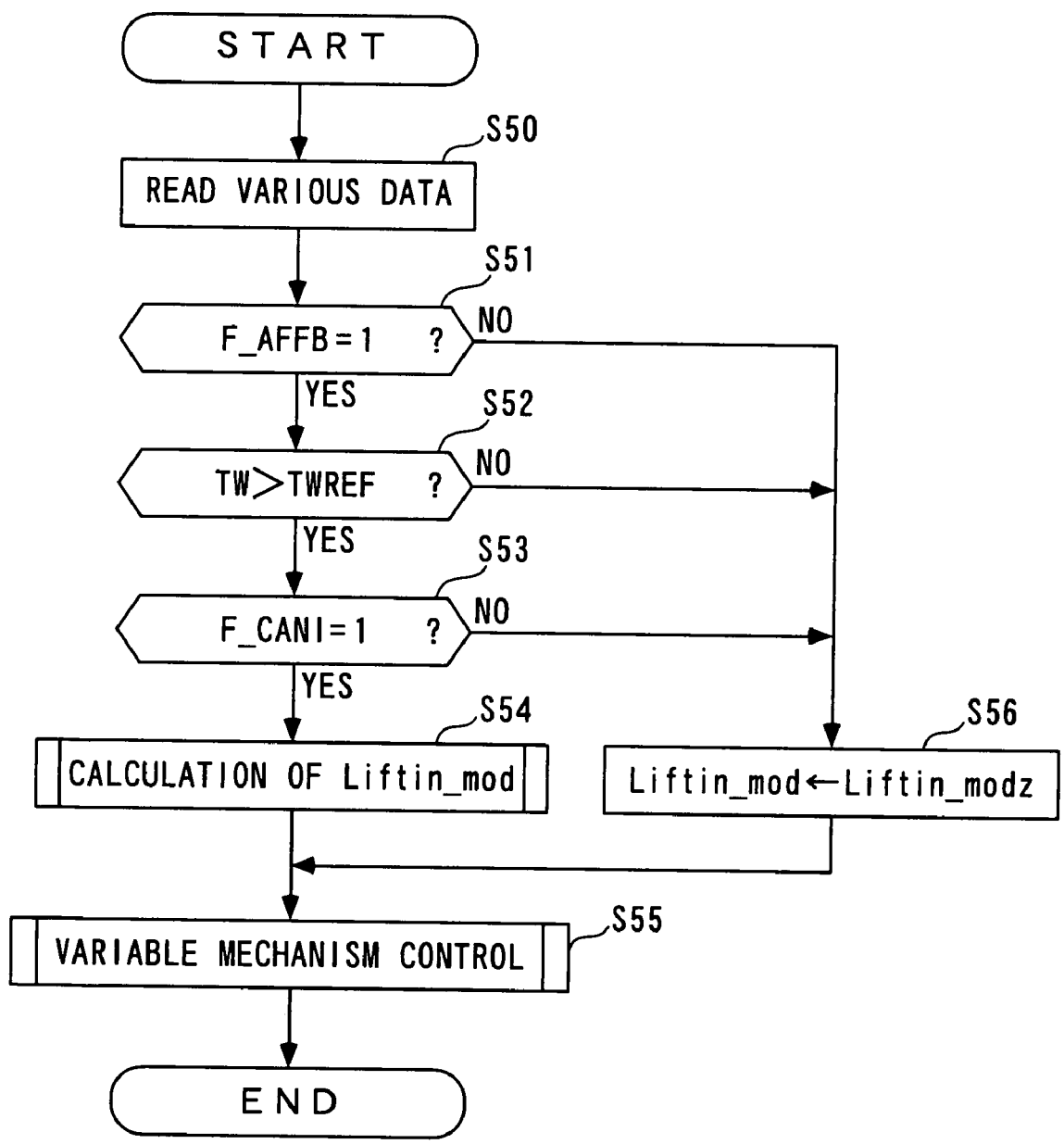
FIG. 26 is a flowchart of a control process executed at a control period.

Next, a control process executed by the ECU 2 at the control period ΔTk set by a timer will be described with reference to FIG. 26. In this process, first, in a step 50, data stored in the RAM, such as the first estimated intake air amount Gcyl_vt, the second estimated intake air amount Gcyl_afm, the actual air-fuel ratio KACT, and the air-fuel ratio correction coefficient KAF, are read in.

Then, the process proceeds to a step 51, wherein it is determined whether or not a feedback control execution flag F_AFFB is equal to 1. The feedback control execution flag F_AFFB is set to 1 during execution of the air-fuel ratio feedback control, and otherwise to 0.

If the answer to the question of the step 51 is affirmative (YES), i.e. if the air-fuel ratio feedback control is being executed, the process proceeds to a step 52, wherein it is determined whether or not the engine coolant temperature TW is higher than a predetermined reference value TWREF. The predetermined reference value TWREF is a value for determining whether or not the warmup operation of the engine 3 has been terminated.

If the answer to the question of the step 52 is affirmative (YES), i.e. if the warmup operation of the engine 3 has been terminated, the process proceeds to a step 53, wherein it is determined whether or not a purge completion flag F_CANI is equal to 1. The purge completion flag F_CANI is set to 1 when a purge operation for returning evaporated fuel adsorbed by a canister into a intake passage has been completed, and otherwise to 0.

If the answer to the question of the step 53 is affirmative (YES), i.e. if the purge operation has been completed, the process proceeds to a step 54, wherein a process for calculating the corrected valve lift Liftin_mod is carried out. The process for calculating the corrected valve lift Liftin_mod will be described in detail hereinafter.

On the other hand, if any of the answers to the questions of the steps 51 to 53 is negative (NO), it is judged that conditions for calculating the corrected valve lift Liftin_mod are not satisfied, and the process proceeds to a step 56, wherein the corrected valve lift Liftin_mod is set to the immediately preceding value Liftin_modz thereof. As described above, if the air-fuel ratio feedback control is not being executed, if the warmup operation of the engine 3 has not been terminated, or if the purge operation has not been completed, the air-fuel ratio control becomes unstable, and the calculation accuracy of the lift correction value Dlift is lowered, which can lower the calculation accuracy of the corrected valve lift Liftin_mod. To avoid this problem, the immediately preceding value of the corrected valve lift Liftin_mod is used without updating the corrected valve lift Liftin_mod.

In a step 55 following the step 54 or 56, a variable mechanism control process is performed, as described hereinafter, followed by terminating the present process.

Figure 27:
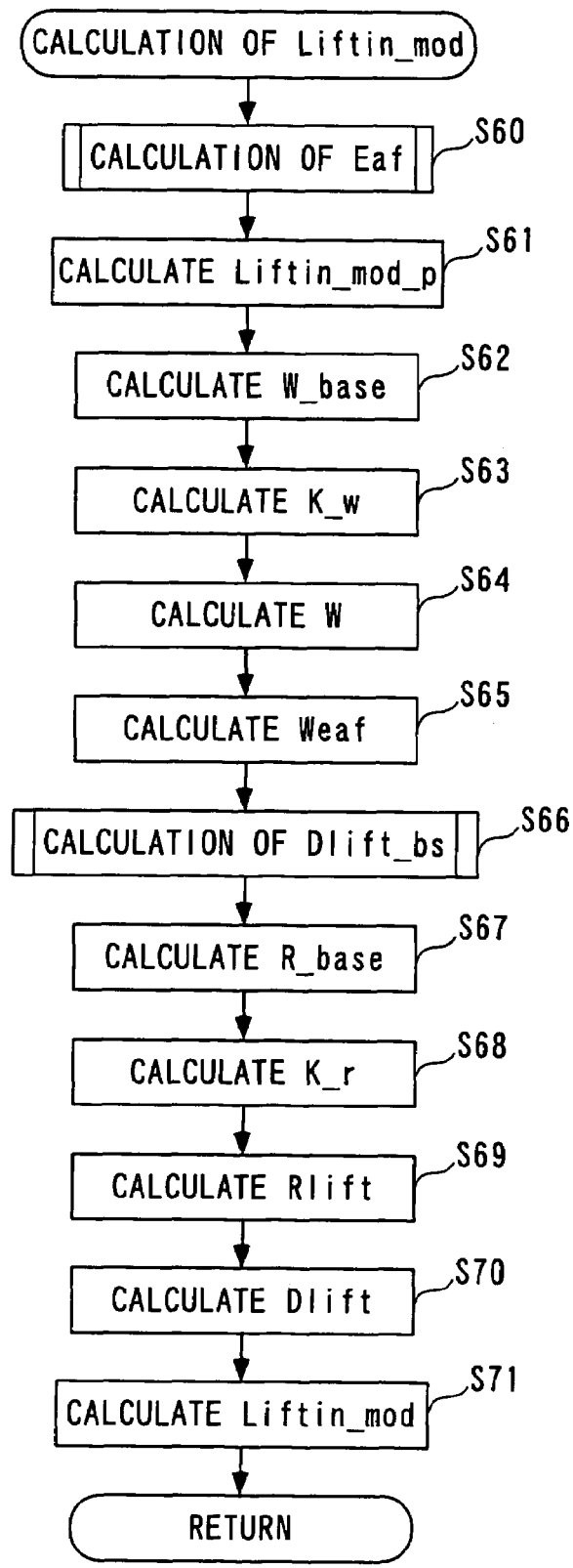
FIG. 27 is a flowchart of a process for calculating a corrected valve lift.

Next, the above-described process for calculating the corrected valve lift Liftin_mod will be described with reference to FIG. 27. First, in a step 60, the air-fuel ratio error estimated value Eaf is calculated by the aforementioned equations (12) and (13).

Then, the process proceeds to a step 61, wherein the second corrected valve lift Liftin_mod_p is calculated by the aforementioned equation (14). After that, in a step 62, the basic error weight W_base is calculated by searching the FIG. 19 map according to the second corrected valve lift Liftin_mod_p and the engine speed NE.

In a step 63 following the step 62, the error weight correction coefficient K_w is calculated by searching the aforementioned FIG. 20 map according to the cam phase Cain and the engine speed NE.

Next, in a step 64, the error weight W is calculated by the aforementioned equation (15), whereafter the process proceeds to a step 65, wherein the modified error Weaf is calculated by the aforementioned equation (16).

In a step 66 following the step 65, the basic lift correction value Dlift_bs is calculated by the aforementioned equations (17) to (24), and then the process proceeds to a step 67, wherein the basic sensitivity R_base is calculated by searching the aforementioned FIG. 21 map according to the second corrected valve lift Liftin_mod_p and the engine speed NE.

Then, the process proceeds to a step 68, wherein the sensitivity correction coefficient K_r is calculated by searching the aforementioned FIG. 22 map according to the cam phase Cain and the engine speed NE. After that, in a step 69, the correction sensitivity Rlift is calculated by the aforementioned equation (25).

In a step 70 following the step 69, the lift correction value Dlift is calculated by the aforementioned equation (26). Next, the process proceeds to a step 71, wherein the corrected valve lift Liftin_mod is calculated by the aforementioned equation (27), followed by terminating the present process.

Figure 28:
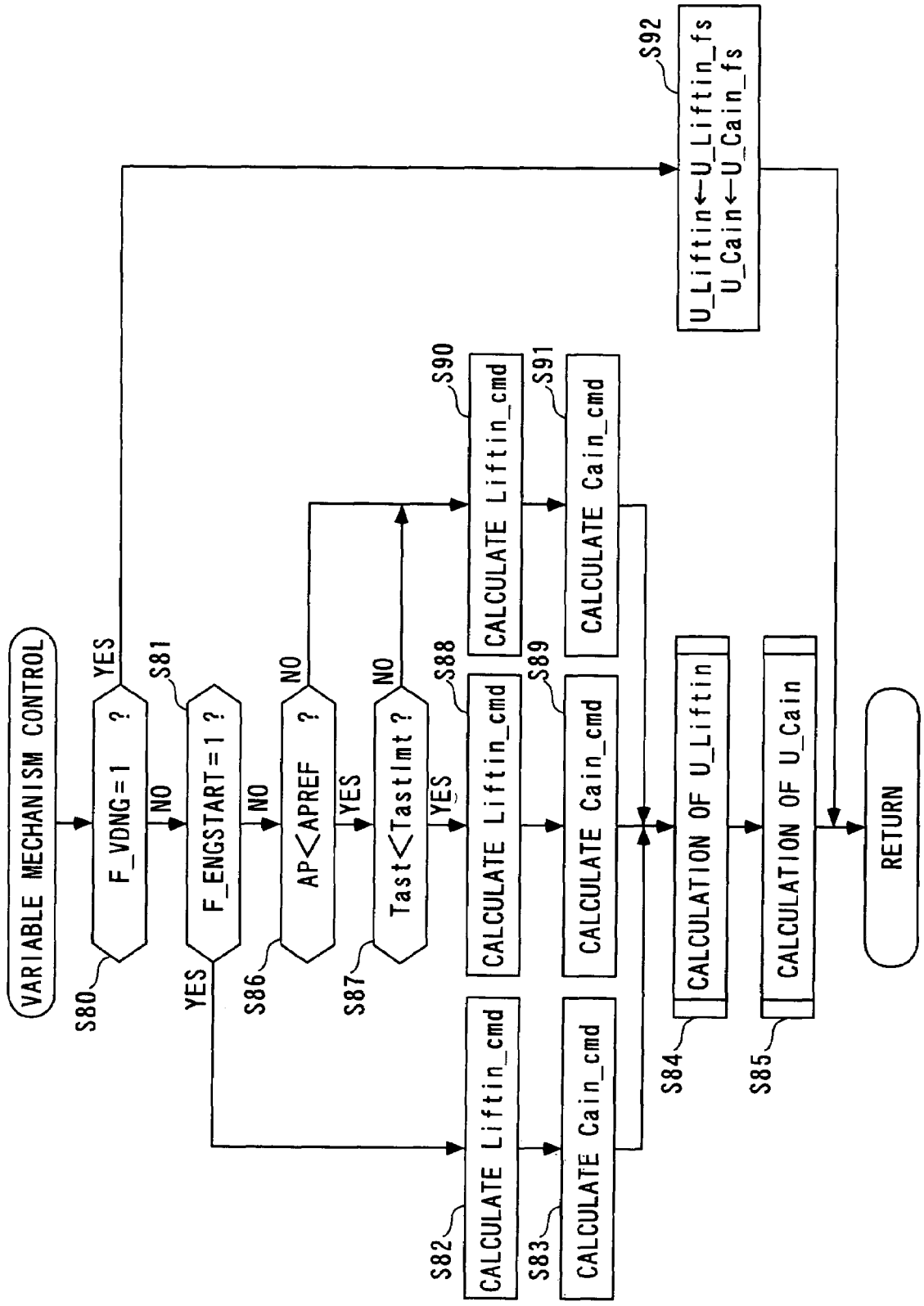
FIG. 28 is a flowchart of a variable mechanism control process.

Next, the aforementioned variable mechanism control process will be described with reference to FIG. 28. The present process is for calculating the two control inputs U_Liftin and U_Cain for controlling the two variable mechanisms, respectively.

In this process, first, it is determined in a step 80 whether or not the aforementioned variable mechanism failure flag F_VDNG is equal to 1. If the answer to this question is negative (NO), i.e. if the two variable mechanisms are both normal, the process proceeds to a step 81, wherein it is determined whether or not the engine start flag F_ENGSTART is equal to 1.

The above engine start flag F_ENGSTART is set by determining in a determination process, not shown, whether or not engine start control is being executed, i.e. the engine 3 is being cranked, based on the engine speed NE and the ON/OFF signal output from an IG·SW 29. More specifically, when the engine start control is being executed, the engine start flag F_ENGSTART is set to 1, and otherwise set to 0.

Figure 29:
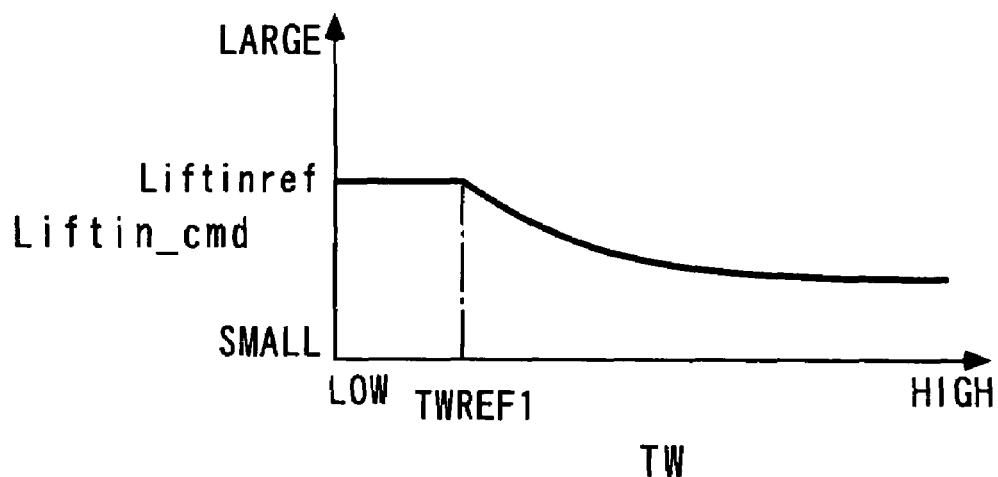
FIG. 29 is a diagram showing an example of a map for use in calculating a target valve lift during the start of the engine.

If the answer to the question of the step 81 is affirmative (YES), i.e. if the engine start control is being executed, the process proceeds to a step 82, wherein the target valve lift Liftin_cmd is calculated by searching a map shown in FIG. 29 according to the engine coolant temperature TW.

In this map, in the range where the engine coolant temperature TW is higher than a predetermined value TWREF1, the target valve lift Liftin_cmd is set to a larger value as the engine coolant temperature TW is lower, and in the range where TW≦TWREF1 holds, the target valve lift Liftin_cmd is set to a predetermined value Liftinref. This is to compensate for an increase in friction of the variable valve lift mechanism 50, which is caused when the engine coolant temperature TW is low.

Figure 30:
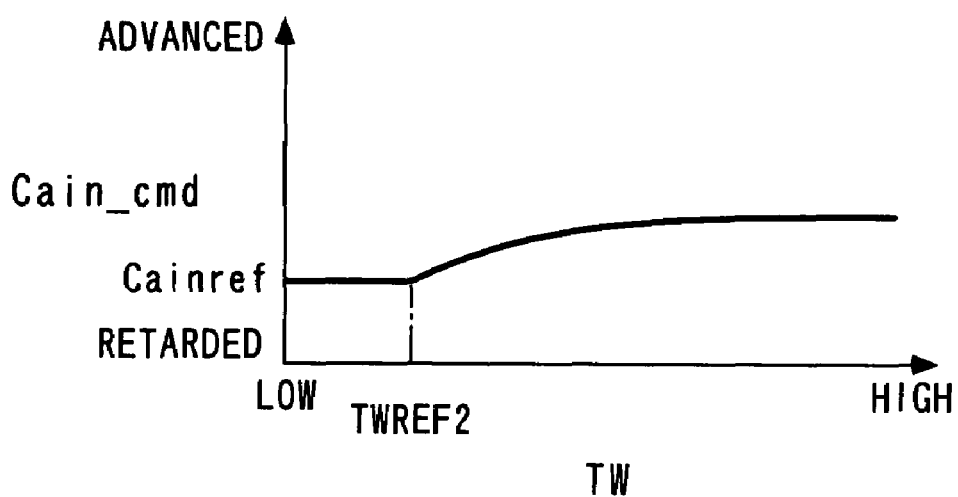
FIG. 30 is a diagram showing an example of a map for use in calculating a target cam phase during the start of the engine.

Then, in a step 83, the target cam phase Cain_cmd is calculated by searching a map shown in FIG. 30 according to the engine coolant temperature TW.

In this map, in the range where the engine coolant temperature TW is higher than a predetermined value TWREF2, the target cam phase Cain_cmd is set to a more retarded value as the engine coolant temperature TW is lower, and in the range where TW≦TWREF2 holds, the target cam phase Cain_cmd is set to a predetermined value Cainref. This is to ensure the combustion stability of the engine 3 by controlling the cam phase Cain to a more retarded value when the engine coolant temperature TW is low than when the engine coolant temperature TW is high, to thereby reduce the valve overlap, to increase the flow velocity of intake air.

Next, the process proceeds to a step 84, wherein the lift control input U_Liftin is calculated with a target value filter-type two-degree-of-freedom response-specifying control algorithm expressed by the following equations (28) to (31).

$$U\_Liftin(k) = -Krch\_lf \cdot \sigma\_lf(k) - Kadp\_lf \cdot \sum_{i=0}^{k} \sigma\_lf(i) \quad (28)$$

$$\sigma\_lf(k) = E\_lf(k) + pole\_lf \cdot E\_lf(k-1) \quad (29)$$

$$E\_lf(k) = Liftin\_mod(k) - Liftin\_cmd\_f(k) \quad (30)$$

$$Liftin\_cmd\_f(k) = \quad (31)$$
$$-pole\_f\_lf \cdot Liftin\_cmd\_f(k-1) + (l + pole\_f\_lf) \cdot Liftin\_cmd(k)$$

In the equation (28), Krch_lf and Kadp_lf represent a predetermined reaching law gain and a predetermined adaptive law gain, respectively. Furthermore, σ_lf represents a switching function defined by the equation (29). In the equation (29), pole_lf represents a switching function-setting parameter set to a value which satisfies the relationship of −1<pole_lf<0, and E_lf represents a follow-up error calculated by the equation (30). In the equation (30), Liftin_cmd_f represents a filtered value of the target valve lift, and is calculated with a first-order lag filter algorithm expressed by the equation (31). In the equation (31), pole_f_lf represents a target value filter-setting parameter set to a value which satisfies the relationship of −1<pole_f_lf<0.

Next, the process proceeds to a step 85, wherein the phase control input U_Cain is calculated with a target value filter-type two-degree-of-freedom response-specifying control algorithm expressed by the following equations (32) to (35).

$$U\_Cain(k) = -Krch\_ca \cdot \sigma\_ca(k) - Kadp\_ca \cdot \sum_{i=0}^{k} \sigma\_ca(i) \quad (32)$$

$$\sigma\_ca(k) = E\_ca(k) + pole\_ca \cdot E\_ca(k-1) \quad (33)$$

$$E\_ca(k) = Cain(k) - Cain\_cmd\_f(k) \quad (34)$$

$$Cain\_cmd\_f(k) = \quad (35)$$
$$-pole\_f\_ca \cdot Cain\_cmd\_f(k-1) + (1 + pole\_f\_ca) \cdot Cain\_cmd(k)$$

In the equation (32), Krch_ca and Kadp_ca represent a predetermined reaching law gain and a predetermined adaptive law gain, respectively. Furthermore, σ_ca represents a switching function defined by the equation (33). In the equation (33), pole_ca represents a switching function-setting parameter set to a value which satisfies the relationship of −1<pole_ca<0, and E_ca represents a follow-up error calculated by the equation (34). In the equation (34), Cain_cmd_f represents a filtered value of the target cam phase, and is calculated with a first-order lag filter algorithm expressed by the equation (35). In the equation (35), pole_f_ca represents a target value filter-setting parameter set to a value which satisfies the relationship of −1<pole_f_ca<0.

In the step 85, the phase control input U_Cain is calculated as above, followed by terminating the present process.

On the other hand, if the answer to the question of the step 81 is negative (NO), i.e. if the engine start control is not being executed, the process proceeds to a step 86, wherein it is determined whether or not the accelerator pedal opening AP is smaller than a predetermined value APREF. If the answer to this question is affirmative (YES), i.e. if the accelerator pedal is not stepped on, the process proceeds to a step 87, wherein it is determined whether or not the count Tast of an after-start timer is smaller than a predetermined value Tastlmt.

Figure 31:
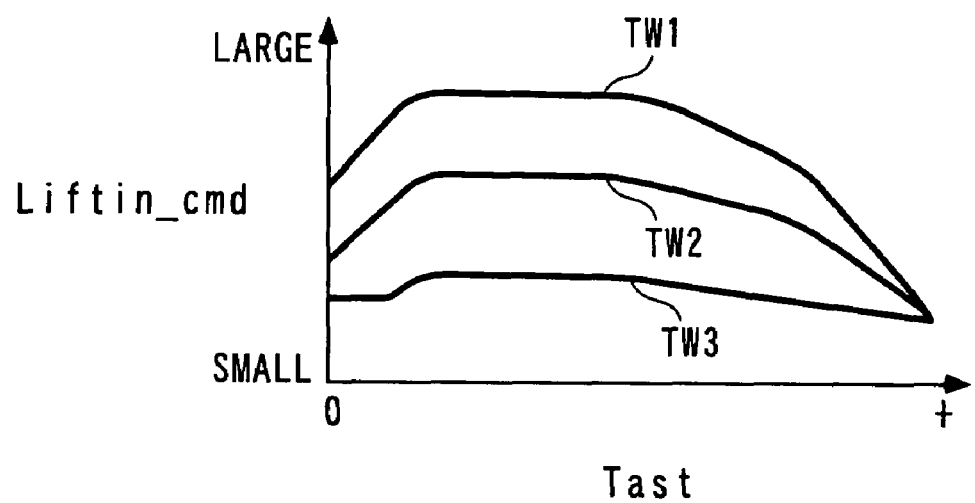
FIG. 31 is a diagram showing an example of a map for use in calculating the target valve lift during catalyst warmup control.

If the answer to this question is affirmative (YES), i.e. if Tast<Tastlmt holds, it is judged that the catalyst warmup control should be executed, and the process proceeds to a step 88, wherein the target valve lift Liftin_cmd is calculated by searching a map shown in FIG. 31 according to the count Tast of the after-start timer and the engine coolant temperature TW. In FIG. 31, TW1 to TW3 represent predetermined values of the engine coolant temperature TW, which satisfy the relationship of TW1<TW2<TW3. This also applies to the following description.

In this map, the target valve lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, the target valve lift Liftin_cmd is set to a larger value as the count Tast of the after-start timer becomes larger in the range where the count Tast is small, whereas in a region where the count Tast is large to a certain or more extent, the target valve lift Liftin_cmd is set to a smaller value as the count Tast becomes larger. This is because the warming up of the engine 3 proceeds along with the lapse of the execution time period of the catalyst warmup control, so that after friction lowers, unless the intake air amount is reduced, the ignition timing is excessively retarded so as to hold the engine speed NE at the target value, which makes unstable the combustion state of the engine. To avoid the combustion state from being unstable, the map is configured as described above.

Figure 32:
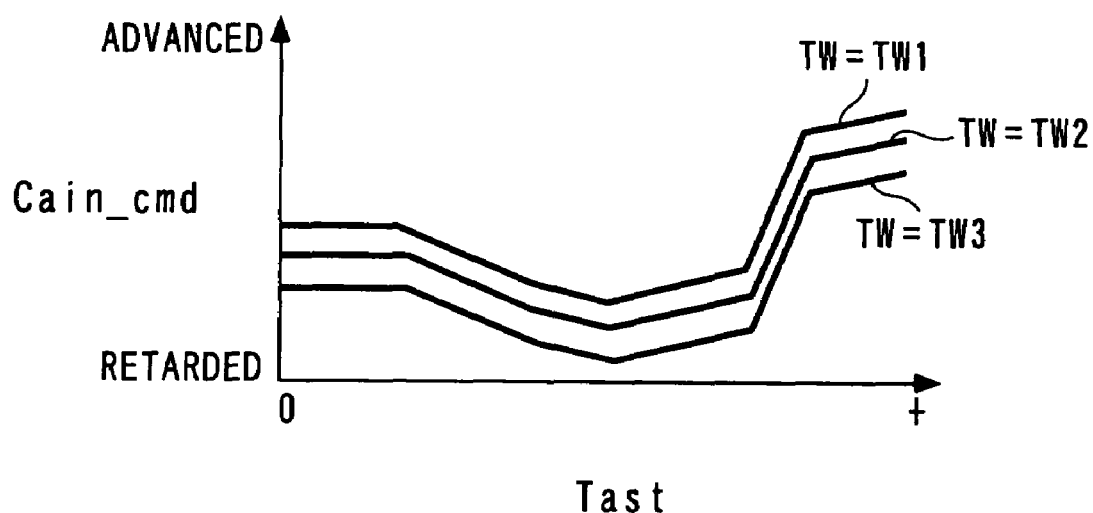
FIG. 32 is a diagram showing an example of a map for use in calculating the target cam phase during catalyst warmup control.

Then, in a step 89, the target cam phase Cain_cmd is calculated by searching a map shown in FIG. 32 according to the count Tast of the after-start timer and the engine coolant temperature TW.

In this map, the target cam phase Cain_cmd is set to a more advanced value as the engine coolant temperature TW is lower. This is because as the engine coolant temperature TW is lower, it takes a longer time period to activate the catalyst, as described above, and hence the pumping loss is reduced to increase the intake air amount to thereby shorten the time period required for activating the catalyst. Furthermore, in the above map, the target cam phase Cain_cmd is set to a more retarded value as the count Tast of the after-start timer becomes larger in the range where the count Tast of the after-start timer is small, whereas in a region where the count Tast is large to a certain or more extent, the target cam phase Cain_cmd is set to a more advanced value as the count Tast of the after-start timer is larger. The reason for this is the same as given in the description of the FIG. 31 map.

Then, the steps 84 and 85 are carried out, as described hereinabove, followed by terminating the present process.

Figure 33:
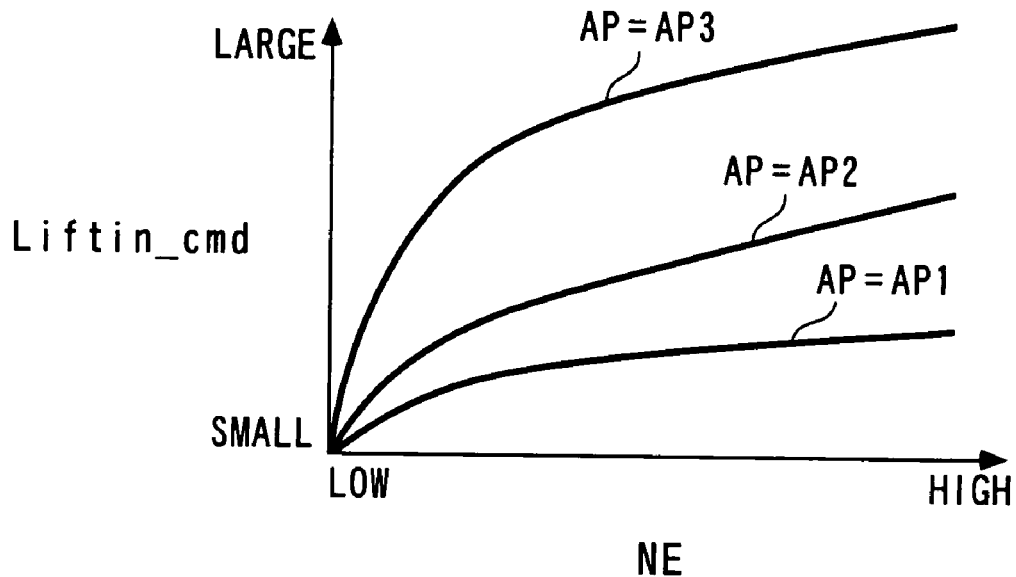
FIG. 33 is a diagram showing an example of a map for use in calculating the target valve lift during normal operation of the engine.

On the other hand, if the answer to the question of the step 86 or 87 is negative (NO), i.e. if the accelerator pedal is stepped on, or if Tast≧Tastlmt holds, the process proceeds to a step 90, wherein the target valve lift Liftin_cmd is calculated by searching a map shown in FIG. 33 according to the engine speed NE and the accelerator pedal opening AP. In FIG. 33, AP1 to AP3 indicate predetermined values of the accelerator pedal opening AP which satisfy the relationship of AP1<AP2<AP3. This also applies to the following description.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 34:
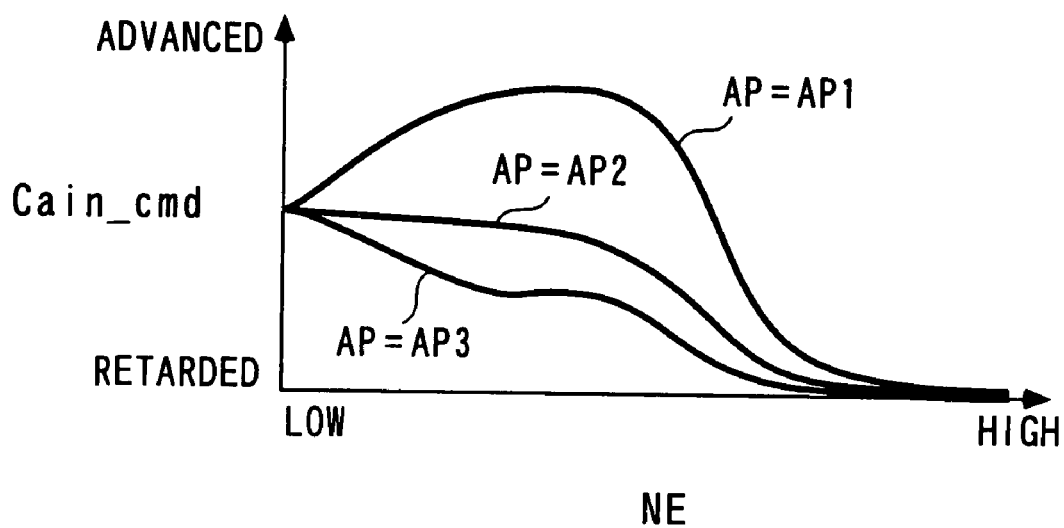
FIG. 34 is a diagram showing an example of a map for use in calculating the target cam phase during normal operation of the engine.

Then, in a step 91, the target cam phase Cain_cmd is calculated by searching a map shown in FIG. 34 according to the engine speed NE and the accelerator pedal opening AP. In this map, when the accelerator pedal opening AP is small and the engine speed NE is in the medium speed region, the target cam phase Cain_cmd is set to a more advanced value than otherwise. This is because under the above operating conditions of the engine 3, it is necessary to reduce the pumping loss.

Following the step 91, the steps 84 and 85 are carried out, as described hereinabove, followed by terminating the present process.

On the other hand, if the answer to the question of the step 80 is affirmative (YES), i.e. if at least one of the two variable mechanisms is faulty, the process proceeds to a step 92, wherein the lift control input U_Liftin is set to the predetermined failure time value U_Liftin_fs, and the phase control input U_Cain to the predetermined failure time value U_Cain_fs, followed by terminating the present process. As a result, as described above, the valve lift Liftin is held at the predetermined locked value, and the cam phase Cain at the predetermined locked value, whereby it is possible to suitably carry out idling or starting of the engine 3 during stoppage of the vehicle, and at the same time hold the vehicle in the state of low-speed traveling when the vehicle is traveling.

In the present process, the lift control input U_liftin and the phase control input U_Cain are calculated as described above. Then, by inputting these control inputs U_Liftin and U_Cain to the variable valve lift mechanism 50 and the variable cam phase mechanism 70, respectively, the intake air amount is controlled.

Figure 35:
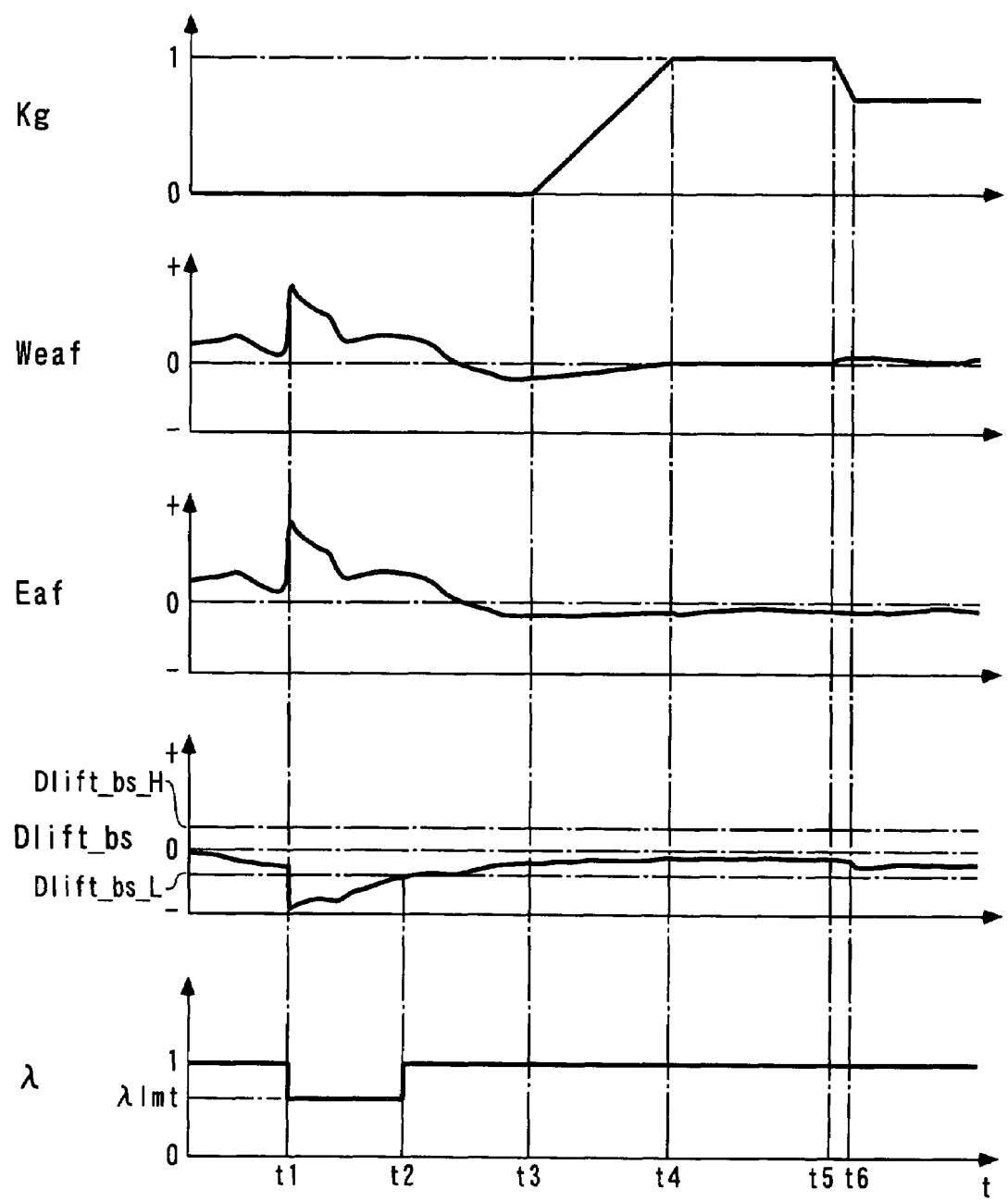
FIG. 35 is a timing diagram showing an example of a result of control executed by the control apparatus according to the first embodiment.

Next, a description will be given of the results of control by the control apparatus 1 according to the first embodiment configured as described above. FIG. 35 shows an example of the results of the air-fuel ratio control and the variable mechanism control process carried out by the control apparatus 1 according to the present embodiment.

As shown in FIG. 35, during execution of the air-fuel ratio control using the transition coefficient Kg set to 0, based on the first estimated intake air amount Gcyl_vt alone, if a sudden increase of the air-fuel ratio error estimated value Eaf in a positive direction is caused e.g. by the lift error at a time point t1, the modified error Weaf as well is suddenly increased simultaneously. As a result, the basic lift correction value Dlift_bs is changed in a negative direction with the control algorithm expressed by the aforementioned equations (17) to (24) such that the modified error Weaf is caused to converge to 0, suddenly increasing the absolute value of the basic lift correction value Dlift_bs. In short, the basic lift correction value Dlift_bs is calculated such that the lift error is eliminated.

In addition, the basic lift correction value Dlift_bs becomes not larger than the aforementioned predetermined lower limit value Dlift_bs_L at the time point t1, whereby the forgetting coefficient λ is switched from 1 to the predetermined value λlmt. Then, after the time point t1, the absolute value of the basic lift correction value Dlift_bs is reduced along with the lapse of time due to the forgetting effect provided by the forgetting coefficient λ, and when Dlift_bs>Dlift_bs_L comes to hold (time point t2), the forgetting coefficient λ is switched from the predetermined value λlmt to 1. As a result, the forgetting effect provided by the forgetting coefficient λ is cancelled, and the adaptive law input Uadp is calculated as an integral value of a switching function a by the aforementioned equations (20) and (21), whereby the basic lift correction value Dlift_bs is calculated as a value capable of eliminating the lift error quickly and properly, by the function of the adaptive law input Uadp.

Then, after a time point t3, when load on the engine 3 is changed to progressively increase the transition coefficient Kg from 0, the modified error Weaf is reduced along with the progressive increase in the transition coefficient Kg, and when the transition coefficient Kg=1 comes to hold (time point t4), the modified error Weaf becomes equal to 0, but by the function of the adaptive law input Uadp, the basic lift correction value Dlift_bs is held at the value capable of eliminating the lift error quickly and properly without converging to 0, even after the time point t4.

Thereafter, at a time point t5, when the transition coefficient Kg starts to decrease progressively from 1, the modified error Weaf increases in a positive direction along with the decrease in the transition coefficient Kg, and the basic lift correction value Dlift_bs changes on the negative side such that the absolute value thereof increases. Consequently, it is understood that the lift error is properly compensated for after the first estimated intake air amount Gcyl_vt has started to be reflected on the calculation of the fuel injection amount TOUT. Then, the basic lift correction value Dlift_bs is calculated such that after a time point t6, the transition coefficient Kg is held at a positive value smaller than 1, and the modified error Weaf converges to 0.

Figure 36:
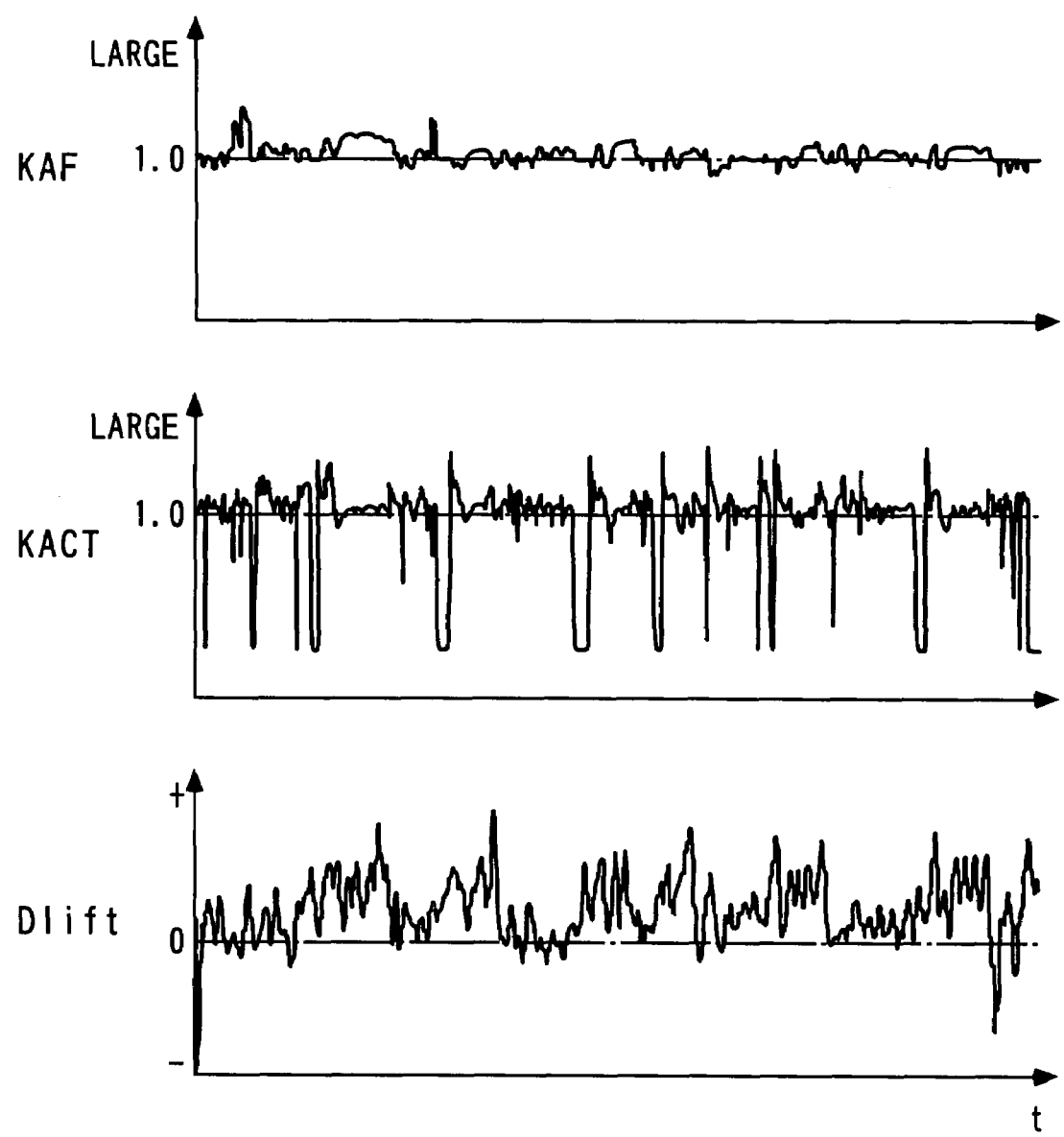
FIG. 36 is a timing diagram showing an example of a result of air-fuel ratio control executed by the control apparatus according to the first embodiment.
Figure 37:
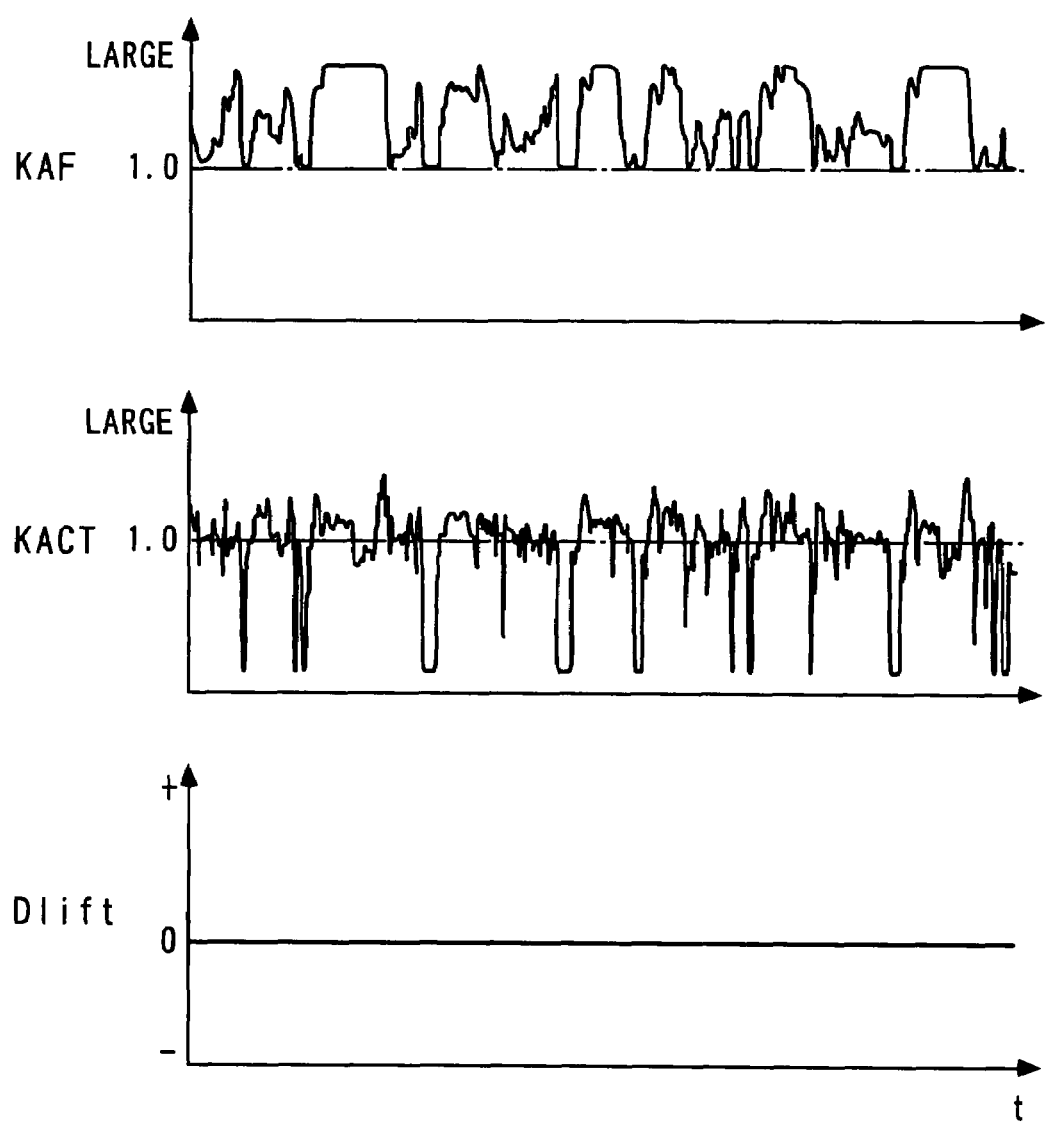
FIG. 37 is a timing diagram showing a comparative example of a result of air-fuel ratio control, obtained when a lift correction value is held at 0.

Further, FIG. 36 shows an example of the results of the air-fuel ratio control carried out by the control apparatus 1 according to the first embodiment. For comparison, FIG. 37 shows an example (hereinafter referred to as "the comparative example") of control results obtained when the lift correction value Dlift is held at 0, i.e. when Liftin_mod is set to be equal to Liftin. It should be noted that the above control results are obtained by setting the target air-fuel ratio KCMD to 1 for ease of understanding.

Referring to FIGS. 36 and 37, it is understood that in the FIG. 37 comparative example, there often occurs a state in which the air-fuel ratio correction coefficient KAF largely deviates from the target air-fuel ratio KCMD toward the richer side, and is held on the richer side. In contrast, it is understood that in the FIG. 36 example of the control results by the control apparatus 1 according to the present embodiment, the air-fuel ratio correction coefficient KAF is held in the vicinity of the target air-fuel ratio KCMD and that high-level control accuracy can be ensured.

Further, when the differences between the target air-fuel ratios KCMD and the actual air-fuel ratios KACT, that is, errors of the air-fuel ratios of the example and the comparative example are compared with each other by referring to FIGS. 36 and 37, it is understood that relatively large air-fuel ratio errors occur frequently in the comparative example. In contrast, it is understood that in the example of the control results according to the present embodiment, air-fuel ratio errors are controlled to smaller values than the values of the air-fuel ratio errors in the comparative example, whereby high-level control accuracy can be secured. As described above, it is understood that by using the lift correction value Dlift according to the present embodiment, it is possible to accurately compensate for the lift error, thereby making it possible to ensure high control accuracy in the air-fuel ratio control.

As described hereinabove, according to the control apparatus 1 of the first embodiment, the error weight W is calculated using a response surface model configured as shown in FIGS. 19 and 20, and the air-fuel ratio error estimated value Eaf is corrected (modified) by the error weight W, to thereby calculate the air-fuel ratio error estimated value Eaf. As described hereinabove, the error weight W is calculated as a value indicative of the probability of the air-fuel ratio error estimated value Eaf being caused by the lift error, in other words, the degree of influence of the valve lift Liftin on the air-fuel ratio error estimated value Eaf, and therefore the modified error Weaf is calculated as a value on which is reflected the degree of influence of the valve lift Liftin on the air-fuel ratio error estimated value Eaf.

Further, the basic lift correction value Dlift_bs is calculated such that the modified error Weaf calculated as above is caused to converge to 0, and the lift correction value Dlift is calculated by multiplying the basic lift correction value Dlift_bs by the correction sensitivity Rlift. The basic estimated intake air amount Gcyl_vt_base, i.e. the first estimated intake air amount Gcyl_vt is calculated by searching the FIG. 11 map, i.e. the correlation model, according to the corrected valve lift Liftin_mod obtained by correcting the valve lift Liftin by the lift correction value Dlift. Therefore, not only when the air-fuel ratio error is temporarily increased by a disturbance but also when the air-fuel ratio error estimated value Eaf, i.e. the air-fuel ratio error is liable to temporarily increase due to occurrence of the lift error caused e.g. by the degradation of reliability of the detection results of the valve lift Liftin and a change in the characteristics of the variable valve lift mechanism 50, the air-fuel ratio error can be properly compensated for just enough by the first estimated intake air amount Gcyl_vt.

If the first estimated intake air amount Gcyl_vt is calculated assuming that the error weight=1 and Eaf=Weaf hold, when the air-fuel ratio error estimated value Eaf is caused mainly by the lift error, i.e. when the degree of influence of the valve lift Liftin on the air-fuel ratio error estimated value Eaf is large, the air-fuel ratio error estimated value Eaf, i.e. the air-fuel ratio error can be properly compensated for by the thus calculated first estimated intake air amount Gcyl_vt. However, when the degree of influence of the valve lift Liftin on the air-fuel ratio error estimated value Eaf is small, i.e. when the air-fuel ratio error is caused mainly by a disturbance or the like other than the lift error, it is impossible to properly compensate for the air-fuel ratio error using the first estimated intake air amount Gcyl_vt, which results in overcompensation or undercompensation for the air-fuel ratio error. Therefore, by using the above-described error weight W, the air-fuel ratio error can be properly compensated for just enough by the first estimated intake air amount Gcyl_vt.

In addition, since the first estimated intake air amount Gcyl_vt is calculated using the FIG. 11 map which represents the correlation between the corrected valve lift Liftin_mod and the first estimated intake air amount Gcyl_vt, the air-fuel ratio error can be compensated for more quickly than when the air-fuel ratio error is compensated for by the air-fuel ratio correction coefficient KAF calculated with a feedback control algorithm. As described above, even under a condition where the air-fuel ratio error is temporarily increased by the lift error, it is possible to compensate for the air-fuel ratio error properly and quickly, thereby making it possible to ensure high-level accuracy of control even when the engine 3 is in a transient operating state.

Furthermore, although the sensitivity of the air-fuel ratio error estimated value Eaf to the lift error varies with the influence of the cam phase Cain and the engine speed NE thereon, the error weight W is calculated based not only on the valve lift Liftin but also on the cam phase Cain and the engine speed NE, as described above, and hence the error weight W is calculated such that the degree of influence of the cam phase Cain and the engine speed NE on the air-fuel ratio error estimated value Eaf is reflected. Accordingly, by using the error weight W calculated as above, it is possible to calculate the first estimated intake air amount Gcyl_vt such that the air-fuel ratio error estimated value Eaf, i.e. the air-fuel ratio error can be compensated for, while causing the influence of the cam phase Cain and the engine speed NE on the lift error to be reflected thereon. This makes it possible to further enhance the accuracy of control.

Further, the correction sensitivity Rlift is calculated as a value which represents the sensitivity of the air-fuel ratio error estimated value Eaf to the lift error, and the lift correction value Dlift is calculated by multiplying the basic lift correction value Dlift_bs by the correction sensitivity Rlift, so that it is possible to prevent the basic lift correction value Dlift_bs from effecting overcompensation responsive to the air-fuel ratio error estimated value Eaf under the condition, described above, where the sensitivity of the air-fuel ratio error estimated value Eaf to the lift error is low. In addition, the value of the sensitivity correction coefficient K_r, which is used for calculating the correction sensitivity Rlift, on the advanced side thereof is set to a value closer to 1 than that of the error weight correction coefficient K_w, which is used for calculating the error weight W, whereby it is possible to prevent the air-fuel mixture from being leaned by the fuel injection amount TOUT erroneously calculated as a small value, as described above. This makes it possible to ensure the stability of combustion.

It should be noted that although in the first embodiment, the control algorithm expressed by the aforementioned equations (17) to (24) is used for the algorithm for calculating the basic lift correction value Dlift_bs, by way of example, this is not limitative, but the basic lift correction value Dlift_bs may be calculated with a control algorithm expressed by the following equations (36) to (44), to which are applied a combination of an adaptive disturbance observer and a sliding mode control algorithm.

$$\sigma(k) = Weaf(k) + S \cdot Weaf(k-1) \tag{36}$$

$$Urch(k) = -Krch \cdot \sigma(k) \tag{37}$$

$$Unl(k) = -Knl \cdot \text{sgn}(\sigma(k)) \tag{38}$$

$$\sigma\_hat(k) = Urch(k-1) + Unl(k-1) + Uls(k-1) \tag{39}$$

$$\begin{aligned} E\_sig(k) &= \sigma(k) - \sigma\_hat \\ &= \sigma(k) - Urch(k-1) - Unl(k-1) - Uls(k-1) \end{aligned} \tag{40}$$

$$Uls(k) = \lambda \cdot Uls(k-1) + \frac{P}{1+P} E\_sig(k) \tag{41}$$

*When $Dlift\_bs\_L < Dlift\_bs(k-1) < Dlift\_bs\_H$ (42)
$\lambda = 1$

*When $Dlift\_bs(k-1) \leq Dlift\_bs\_L$ or $Dlift\_bs\_H \leq Dlift\_bs(k-1)$ (43)
$\lambda = \lambda lmt$ $$Dlift\_bs(k) = Urch(k) + Unl(k) + Uls(k) \tag{44}$$

In the above equation (39), σ_hat represents an estimated value of a switching function, and Uls represents a disturbance estimated value. The disturbance estimated value Uls is calculated with a fixed gain identification algorithm expressed by the equations (40) and (41). In the equation (40), E_sig represents an estimation error. In the equation (41), P represents a fixed identification gain. It should be noted that the above equations (39) to (43) express an algorithm for calculating the disturbance estimated value Uls of the adaptive disturbance observer.

In the above control algorithm expressed by the equations (36) to (44) for calculation of the basic lift correction value Dlift_bs, the disturbance estimated value Uls corresponds to an integral term. In the equation (41), the immediately preceding value Uls(k-1) of the disturbance estimated value is multiplied by the forgetting coefficient λ, and if the absolute value of the basic lift correction value Dlift_bs is large, the forgetting coefficient λ is set to a value within the range of $0 \leq \lambda \leq 1$. With this configuration, the aforementioned forgetting effect provided by the forgetting coefficient λ makes it possible to prevent the integral terms Uadp' and Uls in the respective control algorithms for calculating the air-fuel ratio correction coefficient KAF and the basic lift correction value Dlift_bs from interfering with each other to thereby prevent the integral terms from exhibiting oscillating behaviors, and the absolute value of the disturbance estimated value Uls, i.e. the basic lift correction value Dlift_bs from increasing. This makes it possible to prevent the first estimated intake air amount Gcyl_vt from oscillating and temporarily taking an improper value, thereby making it possible to improve controllability in a transient state. Further, if the absolute value of the immediately preceding value Dlift_bs(k-1) of the basic lift correction value is small, the forgetting coefficient λ is set to 1, and hence even when the modified error Weaf become close to 0, the basic lift correction value Dlift_bs can be held at a proper value. This makes it possible to enhance the responsiveness of the air-fuel ratio control when the modified error Weaf start to increase, thereby making it possible to enhance the control accuracy.

In addition, since the disturbance estimated value Uls is calculated with the fixed gain identification algorithm of the adaptive disturbance observer, compared with the control algorithm according to the first embodiment using the adaptive law input Uadp, it is possible to further enhance the capability of suppressing the integral fluctuation behavior and the overshooting behavior of the basic lift correction value Dlift_bs.

Further, although in the first embodiment, the basic lift correction value Dlift_bs is calculated using the control algorithm to which is applied the sliding mode control algorithm expressed by the equations (17) to (24) as the response-specifying control algorithm, by way of example, a control algorithm to which is applied a back-stepping control algorithm may be used as the response-specifying control algorithm. Also when the control algorithm to which is applied the back-stepping control algorithm is used for the algorithm for calculating the basic lift correction value Dlift_bs, as described above, it is possible to obtain the same advantageous effects as provided by the control algorithm expressed by the equations (17) to (24) in the first embodiment.

Further, although in the first embodiment, the control algorithm expressed by the aforementioned equations (17) to (24) is used for the algorithm for calculating the basic lift correction value Dlift_bs, by way of example, the algorithm for calculating the basic lift correction value Dlift_bs is not limited to this, but any suitable algorithm may be used insofar as it is capable of calculating the basic lift correction value Dlift_bs such that the modified error Weaf is caused to converge to 0. For example, a PID control algorithm, an optimum control algorithm, an $H^\infty$ control algorithm, or the like may be used for the algorithm for calculating the basic lift correction value Dlift_bs. When the basic lift correction value Dlift_bs is thus calculated with the PID control algorithm, the optimum control algorithm, the $H^\infty$ control algorithm, or the like, compared with the use of the control algorithm expressed by the equations (17) to (24), there is a fear that the effect of suppressing the modified error Weaf from overshooting 0, or the robustness of the control apparatus from being degraded, and hence in this respect, the control algorithm according to the first embodiment is superior to the PID control algorithm, the optimum control algorithm, the $H^\infty$ control algorithm, and so forth.

Further, although in the first embodiment, the control algorithm expressed by the aforementioned equations (6) to (10) is used for a predetermined feedback control algorithm for calculating the air-fuel ratio correction coefficient KAF as the second input value, by way of example, the predetermined feedback control algorithm for calculating the second input value in the present invention is not limited to this, but any suitable feedback control algorithm may be used insofar as it is capable of calculating the second input value such that the second input value is caused to converge to the target value. For example, the air-fuel ratio correction coefficient KAF as the second input value may be calculated with an algorithm using a self tuning regulator, which is disclosed e.g. in Japanese Laid-Open Patent Publication (Kokai) No. 2006-2591. Further, as the algorithm for calculating the air-fuel ratio correction coefficient KAF as the second input value, there may be used the control algorithm expressed by the aforementioned equations (36) to (44), or may be used the back-stepping control algorithm, the PID control algorithm, the optimum control algorithm, the H∞ control algorithm, or the like.

Furthermore, although in the first embodiment, the correction sensitivity Rlift is calculated using the response surface model formed by the maps shown in FIGS. 21 and 22, by way of example, the correction sensitivity Rlift may be calculated using the response surface model formed by the maps shown in FIGS. 19 and 20 in place of the response surface model formed by the maps shown in FIGS. 21 and 22. In short, the correction sensitivity Rlift may be calculated as a value equal to the error weight W. Furthermore, if there is no need to avoid the overcompensation for the air-fuel ratio error estimated value Eaf by the lift correction value Dlift under the condition where the sensitivity of the air-fuel ratio error estimated value Eaf to the lift error is low, the equation (25) may be omitted to set Rlift to 1 in the equation (26) to thereby to cause Dlift=Dlift_bs to hold. That is, the basic lift correction value Dlift_bs may be used as the lift correction value Dlift.

Further, although in the first embodiment, the valve lift Liftin is used as an operating state parameter, by way of example, the operating state parameter in the control apparatus according to the present invention is not limited to this. For example, to control the air-fuel ratio of the engine 3 having the variable cam phase mechanism 70, the cam phase Cain may be used as an operating state parameter. Further, to control the air-fuel ratio of the engine 3, which is not provided with the variable valve lift mechanism 50 or the variable cam phase mechanism 70 but with a throttle valve mechanism alone, the degree of opening of the throttle valve mechanism may be used as an operating state parameter. In addition, in the case of the so-called speed-density engine, which is provided with an intake pipe pressure sensor and a crank angle sensor, for controlling the air-fuel ratio based on parameters from the sensors, the intake pipe pressure and the engine speed NE may be used as operating state parameters.

Furthermore, although in the first embodiment, to modify the correlation model, the valve lift Liftin as the second reference parameter is corrected (modified) by the lift correction value Dlift as the corrected modification value, by way of example, the method for modifying the correlation model according to the present invention is not limited to this, but any suitable method may be used insofar as it is a method capable of modifying the correlation model. For example, a method may be employed in which the first input value is modified using the corrected modification value.

Next, a control apparatus 1A (see FIG. 38) according to a second embodiment of the present invention will be described. It should be noted that in the following description, component elements of the control apparatus 1A, identical to those of the control apparatus 1 according to the first embodiment, are designated by identical reference numerals, and detailed description thereof is omitted. The control apparatus 1A is applied to a vehicle of a so-called FR system, not shown, which has the engine 3 with the aforementioned automatic transmission installed on a front side thereof, and includes rear wheels and front wheels, neither of which is shown, as drive wheels and non-drive wheels, respectively. More specifically, the control apparatus 1A is provided for carrying out traction control of the vehicle.

It should be noted that the term "traction control" is intended to mean a control method of reducing engine torque, when the engine torque becomes too large during acceleration of the vehicle, thereby causing a state in which the drive wheels rotate without load or idle with respect to the non-drive wheels, so as to avoid the idling state to thereby ensure the stability of the vehicle to enhance the acceleration performance of the engine 3.

Figure 38:
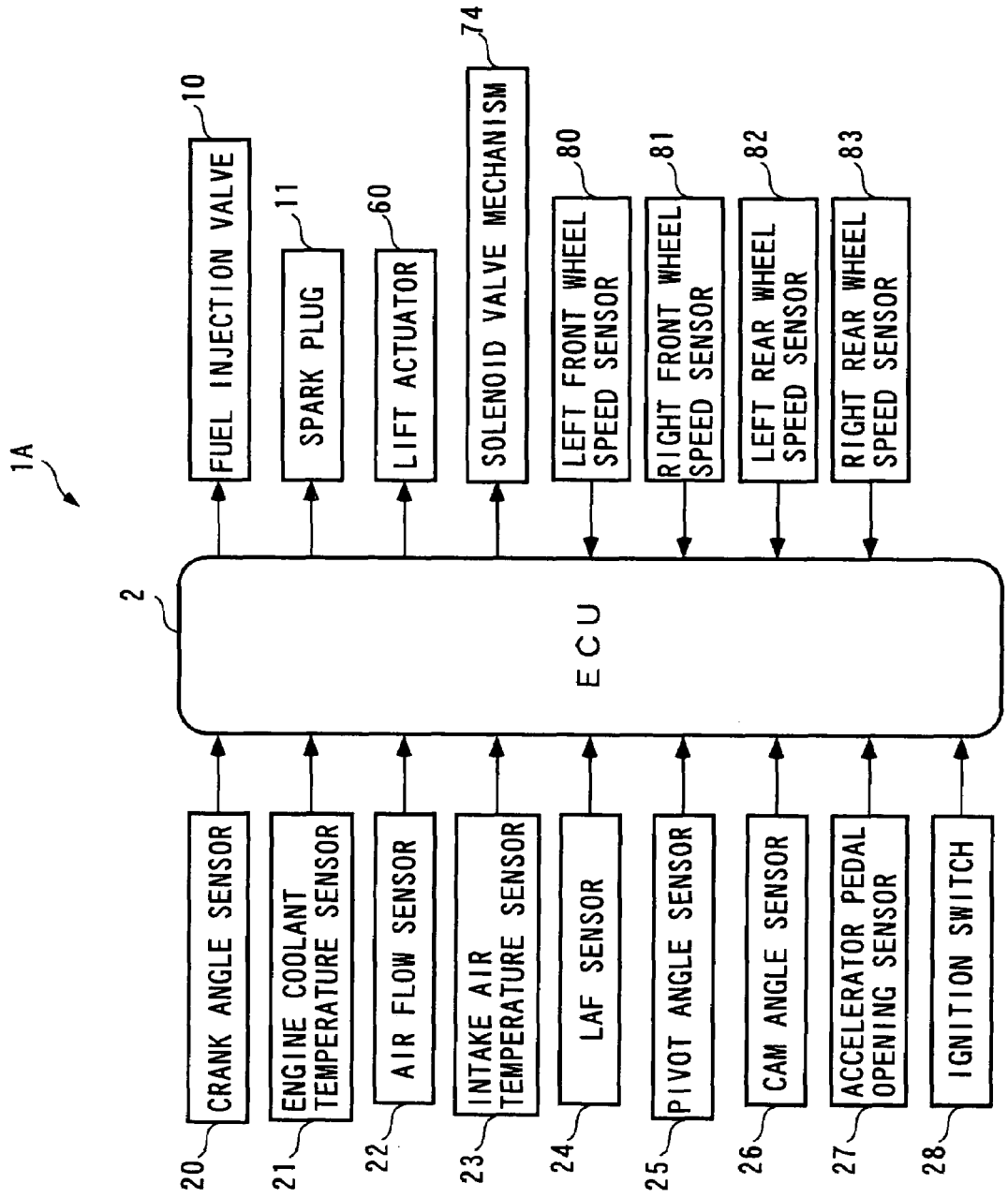
FIG. 38 is a schematic block diagram of a control apparatus according to a second embodiment of the present invention.

Referring to FIG. 38, the control apparatus 1A includes the ECU 2. To the ECU 2 are connected not only the aforementioned sensors 20 to 27 but also left and right front wheel speed sensors 80 and 81, and left and right rear wheel speed sensors 82 and 83. It should be noted that in the present embodiment, the crank angle sensor 20 corresponds to the reference parameter-detecting means, and the second reference parameter-detecting means.

The left and right front wheel speed sensors 80 and 81 detect the speeds of the left and right front wheels, to deliver signals indicative of the respective sensed left and light front wheel speeds to the ECU 2. The ECU 2 calculates the left and right front wheel speeds based on the signals from the left and right front wheel speed sensors 80 and 81, and calculates the arithmetic mean thereof as a non-drive wheel speed Ws_ref. Further, the ECU 2 calculates the left and right rear wheel speeds based on the signals from the left and right rear wheel speed sensors 82 and 83, and calculates the arithmetic mean thereof as a drive wheel speed Ws_act.

It should be noted that in the present embodiment, the left and right front wheel speed sensors 80 and 81 correspond to the first reference parameter-detecting means, the non-drive wheel speed Ws_ref to the first reference parameter, the left and right rear wheel speed sensors 82 and 83 to the controlled variable-detecting means, and the drive wheel speed Ws_act to the controlled variable and the wheel speed of the vehicle.

Figure 39:
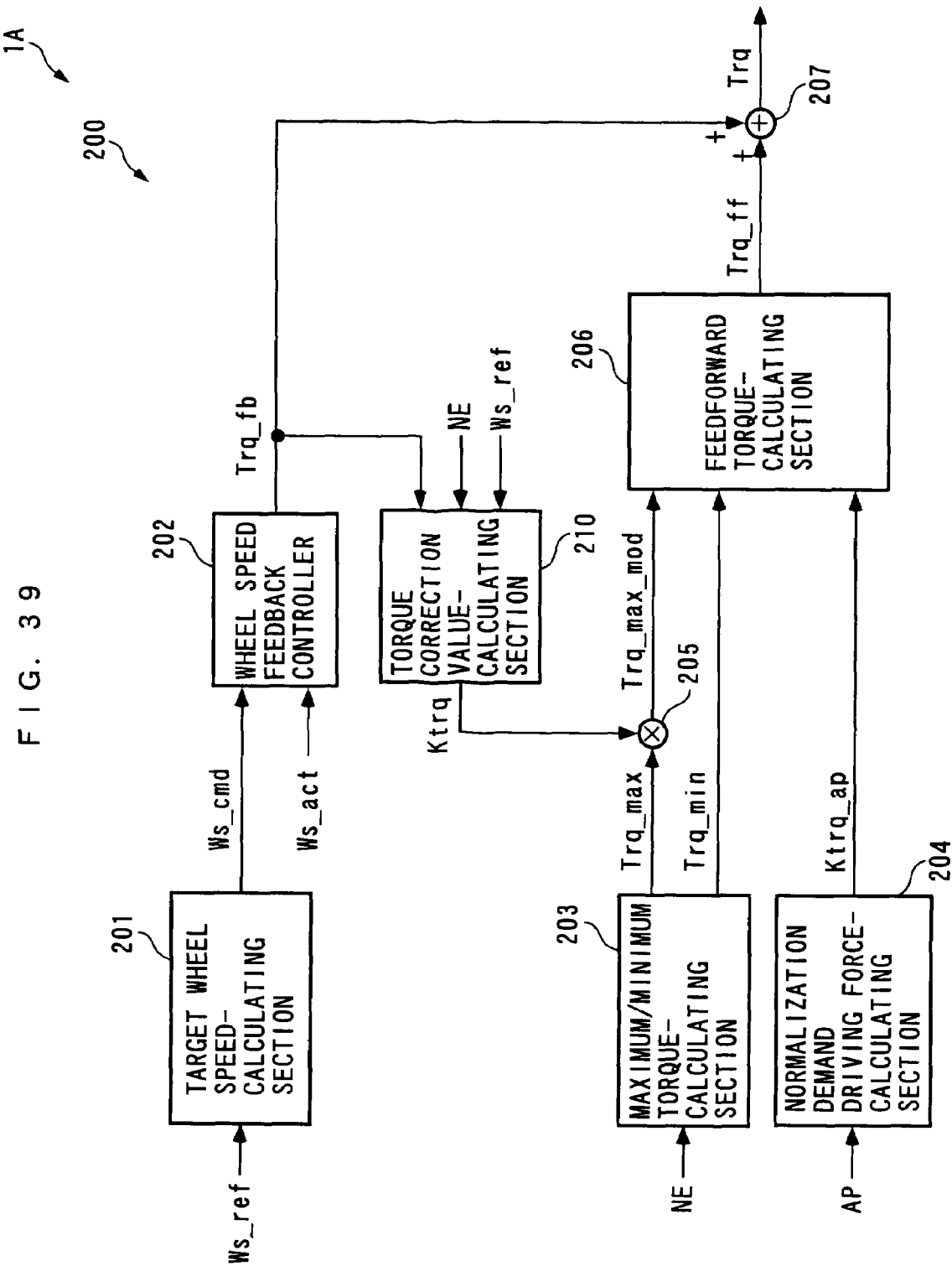
FIG. 39 is a schematic block diagram of a traction controller.

Further, as shown in FIG. 39, the control apparatus 1A includes a traction controller 200. As described hereinafter, the traction controller 200 is provided for calculating the engine torque Trq as torque of the engine 3 which makes it possible to avoid the idling state of the drive wheels, to thereby ensure the stability of the vehicle and enhance the acceleration performance of the engine 3 in a compatible manner. The traction controller 200 is implemented by the ECU 2. It should be noted that in the present embodiment, the traction controller 200 corresponds to the control input-calculating means, and the engine torque Trq corresponds to the control input and the output of the engine 3.

As shown in FIG. 39, the traction controller 200 is comprised of a target wheel speed-calculating section 201, a wheel speed feedback controller 202, a maximum/minimum torque-calculating section 203, a normalization demand driving force-calculating section 204, a multiplication element 205, a feedforward torque-calculating section 206, an addition element 207, and a torque correction value-calculating section 210.

First, the target wheel speed-calculating section 201 calculates a target wheel speed Ws_cmd by the following equation (45). It should be noted that in the present embodiment, the target wheel speed-calculating section 201 corresponds to target value-setting means, and the target wheel speed Ws_cmd corresponds to the target value.

$$Ws\_cmd(k)=Ws\_ref(k)+OptSlip \quad (45)$$

In the above equation (45), OptSlip represents a predetermined slip offset value which corresponds to a slip amount allowable between the drive wheels and the non-drive wheels, and in the present embodiment, it is set to a fixed value (e.g. 10 km/h). It should be noted that the slip offset value OptSlip may be determined by searching a map or a predetermined equation, according to a predetermined parameter (e.g. the non-drive wheel speed Ws_ref, an estimated value of the frictional resistance coefficient of a road surface, a detection signal from a yaw rate sensor, a detection signal from a slip angle sensor mounted on the body of the vehicle, etc.).

Further, the wheel speed feedback controller 202 calculates a torque feedback value Trq_fb by a method, described hereinafter, based on the target wheel speed Ws_cmd and the drive wheel speed Ws_act. It should be noted that in the present embodiment, the torque feedback value Trq_fb corresponds to the second input value.

Furthermore, the torque correction value-calculating section 210 calculates a torque correction value Ktrq by a method, described hereinafter, based on the torque feedback value Trq_fb, the engine speed NE, and the non-drive wheel speed Ws_ref. It should be noted that in the present embodiment, the torque correction value-calculating section 210 corresponds to the model-modifying means and the corrected modification value-calculating means, and the torque correction value Ktrq corresponds to the corrected modification value.

Figure 40:
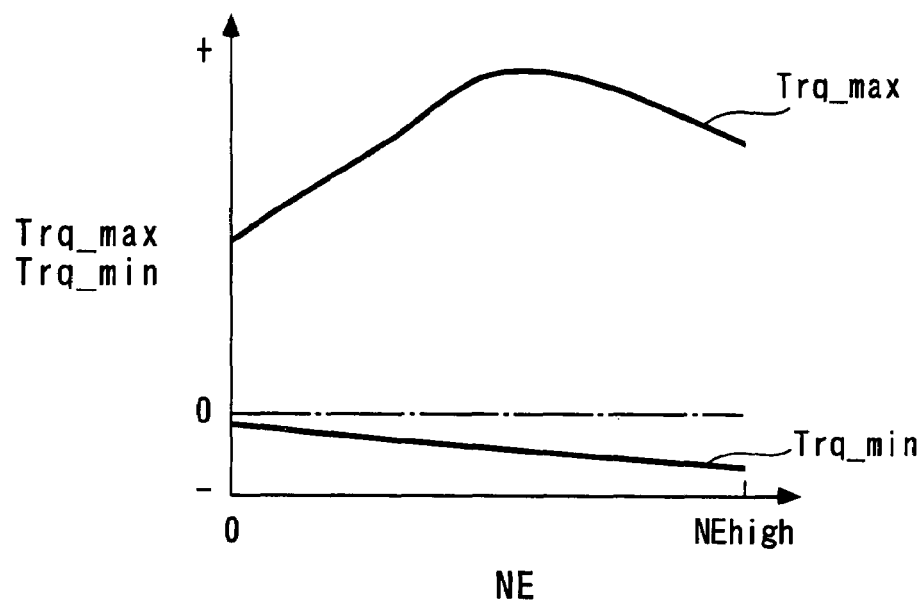
FIG. 40 is a diagram showing an example of a map for use in calculating a maximum torque and a minimum torque.

On the other hand, the maximum/minimum torque-calculating section 203 calculates a maximum torque Trq_max and a minimum torque Trq_min by searching a map shown in FIG. 40 according to the engine speed NE. In FIG. 40, NEhigh represents a predetermined maximum allowable engine speed (e.g. 7000 rpm). These values Trq_max and Trq_min represent the maximum value and the minimum value of the engine torque which can be achieved when the engine speed NE is equal to the associated engine speed. Further, in this map, the minimum torque Trq_min is set to a negative value. This is because the minimum torque Trq_min corresponds to engine torque obtained in a state in which the accelerator pedal is not stepped on, i.e. in an engine brake state during a deceleration fuel cut-off operation. It should be noted that in the present embodiment, the maximum torque Trq_max corresponds to the reference parameter, a limit value of the output of the engine 3, and the second reference parameter.

Figure 41:
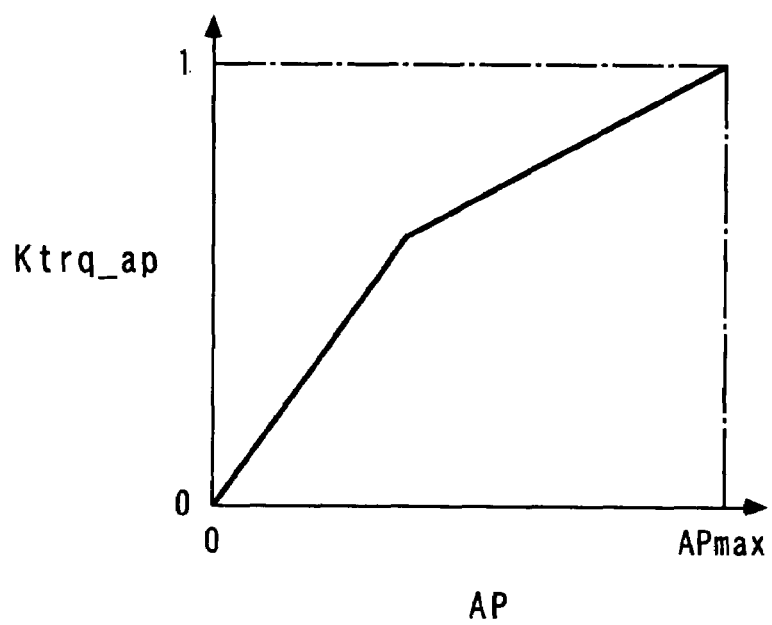
FIG. 41 is a diagram showing an example of a map for use in calculating a normalization demand driving force.

Further, the normalization demand driving force-calculating section 204 calculates a normalization demand driving force Ktrq_ap by searching a map shown in FIG. 41 according to the accelerator pedal opening AP. In FIG. 41, APmax represents the maximum value (100%) of the accelerator pedal opening. Further, the normalization demand driving force Ktrq_ap represents a value obtained by normalizing the normalization demand driving force Ktrq_ap determined based on the accelerator pedal opening AP, with reference to a demand driving force Trq_apmax obtained when AP=APmax holds, that is, a value which satisfies the equation, Ktrq_ap=Trq_ap÷Ktrq_apmax.

The multiplication element 205 calculates a corrected maximum torque Trq_max_mod by the following equation (46). More specifically, the corrected maximum torque Trq_max_mod is calculated by correcting the maximum torque Trq_max by the torque correction value Ktrq.

$$Trq\_max\_mod(k) = Ktrq(k) \cdot Trq\_max(k) \quad (46)$$

Further, the feedforward torque-calculating section 206 calculates a feedforward torque Trq_ff by the following equation (47).

$$Trq\_ff(k) = Ktrq\_ap(k)\{Trq\_max\_mod(k) - Ttrq\_min(k)\} + Ttrq\_min(k) \quad (47)$$

It should be noted that in the present embodiment, the feedforward torque-calculating section 206 corresponds to the first input value-calculating means, and the feedforward torque Trq_ff corresponds to the first input value. Further, calculating the feedforward torque Trq_ff using the equations (46) and (47) corresponds to calculating the first input value using a modified correlation model.

Then, finally, the addition element 207 calculates the engine torque Trq by the following equation (48). More specifically, the engine torque Trq is calculated as the sum of the torque feedback value Trq_fb and the feedforward torque Trq_ff.

$$Trq(k) = Trq\_fb(k) + Trq\_ff(k) \quad (48)$$

Next, a description will be given of the aforementioned wheel speed feedback controller 202. The wheel speed feedback controller 202 calculates the torque feedback value Trq_fb with a control algorithm expressed by the following equations (49) to (59), to which are applied a combination of a target value filter-type two-degree-of-freedom sliding mode control algorithm, and an adaptive disturbance observer.

$$Ws\_cmd\_f(k) = -Rt \cdot Ws\_cmd\_f(k-1) + (1+Rt)Ws\_cmd(k) \quad (49)$$

$$Et(k) = Ws\_act(k) - Ws\_cmd\_f(k) \quad (50)$$

$$\sigma t(k) = Et(k) + St \cdot Et(k-1) \quad (51)$$

$$Urch\_t(k) = -Krch\_t \cdot \sigma t(k) \quad (52)$$

$$Unl\_t(k) = -Knl\_t \cdot sgn(\sigma t(k)) \quad (53)$$

$$\sigma t\_hat(k) = Urch\_t(k-1) + Unl\_t(k-1) + Uls\_t(k-1) \quad (54)$$

$$\begin{aligned}Et\_sig(k) &= \sigma t(k) - \sigma t\_hat(k) \\ &= \sigma t(k) - Urch\_t(k-1) - Un\_t(k-1) - Uls\_t(k-1)\end{aligned} \quad (55)$$

$$Uls\_t(k) = \lambda t \cdot Uls\_t(k-1) + \frac{Pt}{1+Pt} Et\_sig(k) \quad (56)$$

$$*\text{When } Uls\_t\_L < Uls\_t\_H \quad (57)$$
$$\lambda t = 1$$

$$*\text{When } Uls\_t(k-1) \leq Uls\_t\_L \text{ or } Uls\_t\_H \leq Uls\_t(k-1) \quad (58)$$
$$\lambda t = \lambda t lmt$$

$$Trq\_fb(k) = Urch\_t(k) + Unl\_t(k) + Uls\_t(k) \quad (59)$$

In the above control algorithm, first, a filtered value Ws_cmd_f of the target wheel speed is calculated with a first order lag type low pass filter algorithm expressed by the equation (49). In the equation (49), Rt represents a target value filter-setting parameter, and is set to a value which satisfies the relationship of $-1 < Rt < 0$. In this case, the follow-up speed of the filtered value Ws_cmd_f to the target wheel speed Ws_cmd is determined by a value set to the target value filter-setting parameter Rt.

Then, a reaching law input Urch_t and a non-linear input Unl_t are calculated with a control algorithm to which is applied a sliding mode control algorithm expressed by the following equations (50) to (53). In the equation (50), Et represents a follow-up error, and in the equation (51), σt represents a switching function. Further, in the equation (51), St represents a switching function-setting parameter, and is set to a value which satisfies the relationship $pf-1 < St < 0$. In this case, the convergence rate of the follow-up error Et to 0 is designated by a value set to the switching function-setting parameter St. Further, in the equation (52), Krch_t represents a predetermined reaching law gain, and in the equation (53), Knl_t represents a predetermined non-linear input gain. Furthermore, in the equation (53), sgn(σt(k)) represents a sign function, and the value thereof is set such that sgn(σt(k))=1 holds when σt(k)≧0, and when σt(k)<0, sgn(σt(k))=−1 holds (it should be noted that the value thereof may be set such that sgn(σt(k))=0 holds when σt(k)=0).

Then, a disturbance estimated value Uls_t is calculated with a control algorithm to which is applied an adaptive disturbance observer expressed by the equations (54) to (58). In the equation (54), σt_hat represents an estimated value of a switching function, and Uls_t represents a disturbance estimated value. The disturbance estimated value Uls_t is calculated with a fixed gain identification algorithm expressed by the equations (55) and (56). In the equation (55), Et_sig represents an estimation error, and in the equation (56), Pt represents a fixed identification gain.

Further, in the equation (56), λt represents a forgetting coefficient, and as shown in the equations (57) and (58), the value thereof is set to 1 or a predetermined value λtlmt, according to the results of comparisons between the immediately preceding value Uls_t(k−1) of the disturbance estimated value and predetermined upper and lower limit values Uls_t_H and Uls_t_L. The upper limit value Uls_t_H is set to a predetermined positive value, and the lower limit value Uls_t_L is set to a predetermined negative value, while the predetermined value λtlmt is set to a value which satisfies the relationship of 0<λtlmt<1.

Then, as shown in the equation (59), the torque feedback value Trq_fb is finally calculated as the sum of the reaching law input Urch_t, the non-linear input Unl_t, and the disturbance estimated value Uls_t.

As described above, the wheel speed feedback controller 202 calculates the torque feedback value Trq_fb with the control algorithm expressed by the equations (49) to (59), and therefore the torque feedback value Trq_fb is calculated as a value for causing the drive wheel speed Ws_act to converge to the filtered value Ws_cmd_f of the target wheel speed, in other words, as a value for causing the drive wheel speed Ws_act to converge to the target wheel speed Ws_cmd. In this case, as described hereinabove, the target wheel speed Ws_cmd is calculated by adding the slip offset value OptSlip to the non-drive wheel speed Ws_ref, so that in a state of Ws_act≈Ws_cmd, Ws_ref−Ws_act≈OptSlip holds.

Further, the torque feedback value Trq_fb is calculated using the forgetting coefficient λt, and hence if the absolute value of the immediately preceding value Uls_t(k−1) of the disturbance estimated value is large, the above-described forgetting effect provided by the forgetting coefficient λ makes it possible to prevent the disturbance estimated value Uls_t as an integral term, i.e. the torque feedback value Trq_fb from being increased. As a result, as described hereinafter, the torque correction value Ktrq calculated based on the torque feedback value Trq_fb temporarily becomes improper, thereby making it possible to prevent the feedforward torque Trq_ff from temporarily taking an improper value. In addition, the disturbance estimated value Uls_t as the integral term in the algorithm for calculating the torque feedback value Trq_fb can be prevented from interfering with an integral value (disturbance estimated value Uls_v) in an algorithm, described hereinafter, for calculating the torque correction value Ktrq, to thereby prevent the integral terms from exhibiting oscillating behaviors. This makes it possible to enhance controllability in a transient state. Further, if the absolute value of the immediately preceding value Uls_t(k−1) of the disturbance estimated value is small, the forgetting coefficient λt is set to 1, and hence even when the follow-up error Et has converged to 0, the torque feedback value Trq_fb can be held at a value appropriate enough to compensate for the follow-up error Et quickly, whereby it is possible to enhance the responsiveness when the follow-up error Et starts to increase.

Figure 42:
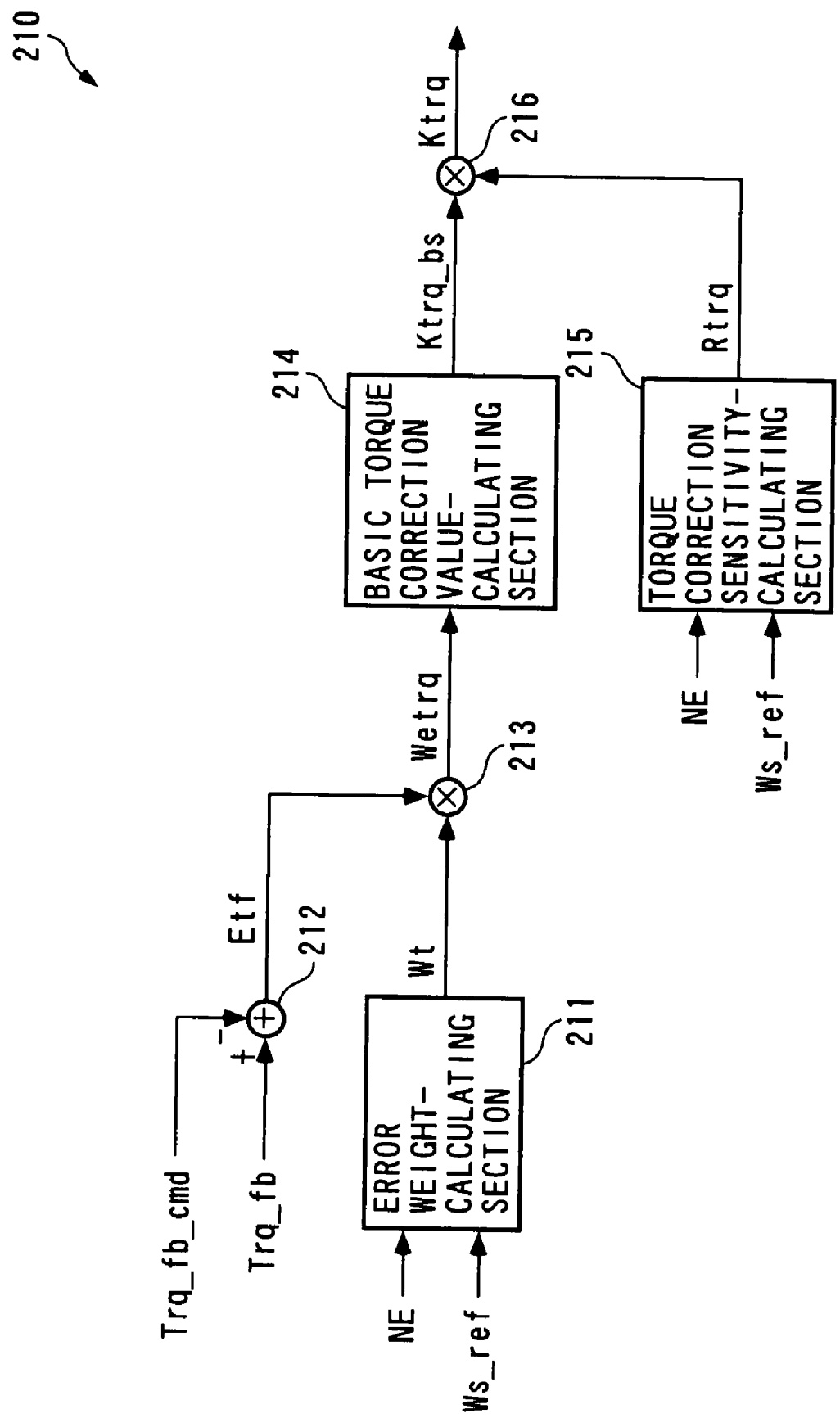
FIG. 42 is a schematic block diagram of a torque correction value-calculating section.

Next, the aforementioned torque correction value-calculating section 210 will be described with reference to FIG. 42. The torque correction value-calculating section 210 is provided for calculating the torque correction value Ktrq for use in correcting the maximum torque Trq_max. As shown in FIG. 42, the torque correction value-calculating section 210 is comprised of an error weight-calculating section 211, a torque error-calculating section 212, a modified torque error-calculating section 213, a basic torque correction value-calculating section 214, a torque correction sensitivity-calculating section 215, and a multiplication element 216.

Figure 43:
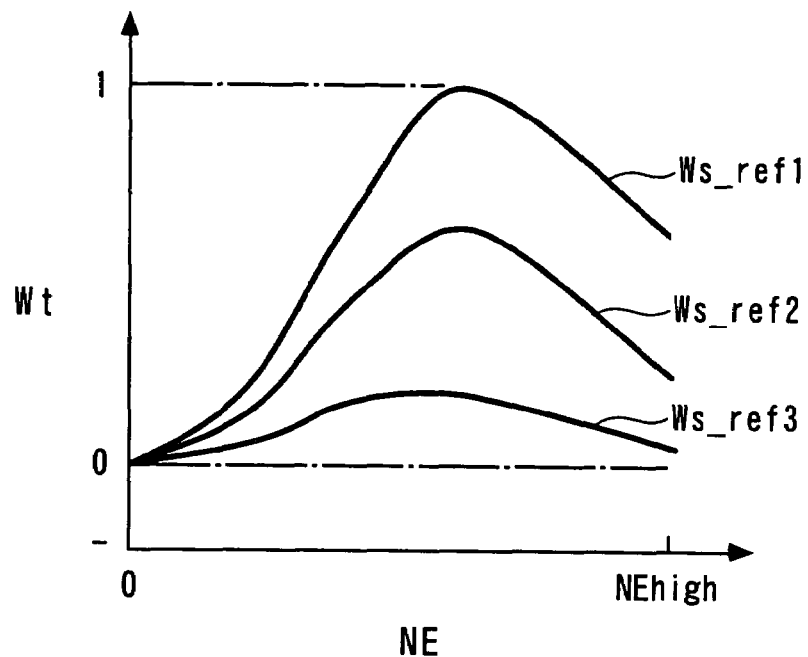
FIG. 43 is a diagram showing an example of a map for use in calculating an error weight.

First, the error weight-calculating section 211 calculates an error weight Wt by searching a map shown in FIG. 43 according to the engine speed NE and the non-drive wheel speed Ws_ref. The error weight Wt takes a value obtained by normalizing a ratio ΔWs_act/ΔTrq between the amount ΔWs_act of change in the drive wheel speed Ws_act and the amount ΔTrq of change in the engine torque, with reference to the absolute value |ΔWs_act_ref/ΔTrq_ref| of a ratio ΔWs_act_ref/ΔTrq_ref obtained at a predetermined drive wheel speed and a predetermined engine torque, that is, a value which satisfies the equation, Wt=(ΔWs_act/ΔTrq)÷(|ΔWs_act_ref/ΔTrq_ref|).

The error weight Wt represents a probability of the torque error Etf being caused by a too large amount of the engine torque Trq, when it is assumed that the correlation between the engine speed NE and the feedforward torque Trq_ff, that is, the correlation between the maximum torque Trq_max and the feedforward torque Trq_ff is changed by a sudden increase in the accelerator pedal opening AP, whereby the torque error Etf, i.e. the slippage of a drive wheel is caused. More specifically, the error weight Wt is set to a larger value as the probability of the torque error Etf being caused by a too large amount of the engine torque Trq is higher. In other words, the error weight Wt is calculated as a value which represents the degree of influence of the maximum torque Trq_max on the torque error Etf. Further, since the degree of the influence of the maximum torque Trq_max on the torque error Etf also varies with the gear ratio of the transmission, in FIG. 51, the error weight Wt is set according to the engine speed NE and the non-drive wheel speed Ws_ref.

In FIG. 43, Ws_ref 1 to Ws_ref 3 represent predetermined values of the non-drive wheel speed, which satisfy the relationship of Ws_ref 1<Ws_ref 2<Ws_ref 3. In this map, the error weight Wt is set to a smaller value as the non-drive wheel speed Ws_ref is higher. This is because when the non-drive wheel speed Ws_ref is high, the slippage of a drive wheel is more difficult to occur as the gear ratio of the transmission is higher, and hence the error weight Wt is set to a smaller value to thereby make smaller the amount of correction of the maximum torque Trq_max by the torque correction value Ktrq in the decreasing direction. Further, the error weight Wt is set such that it has the same tendency with respect to the engine speed NE as a torque curve in engine performance curves has. This is because the error weight Wt is a value indicative of the degree of influence of the maximum torque Trq_max on the torque error Etf.

It should be noted that in the present embodiment, the error weight-calculating section 211 corresponds to the influence degree parameter-calculating means and the second influence degree parameter-calculating means, and the error weight Wt corresponds to the influence degree parameter and the second influence degree parameter. Further, although the FIG. 43 map is provided for calculating the error weight Wt according to the engine speed NE and the non-drive wheel speed Ws_ref, the FIG. 43 map can be regarded to represent the correlation between the maximum torque Trq_max, the non-drive wheel speed Ws_ref, and the error weight Wt, since the maximum torque Trq_max is determined based on the engine speed NE, as described hereinbefore. Therefore, FIG. 43 corresponds to the influence degree model and the second influence degree model.

Further, the torque error-calculating section 212 calculates the torque error Etf by the following equation (60). It should be noted that in the present embodiment, the torque error-calculating section 212 corresponds to the error parameter-calculating means, and the torque error Etf corresponds to the error parameter.

$$Etf(k)=Trq\_fb(k)-Trq\_fb\_cmd(k) \quad (60)$$

In the above equation (60), Trq_fb_cmd represents a target torque feedback value serving as a target of a torque feedback value Trq_fb, and is set to a fixed value (e.g. 0).

Further, the modified torque error-calculating section 213 calculates a modified torque error Wetrq by the following equation (61). It should be noted that in the present embodiment, the modified torque error-calculating section 213 correspond to the corrected error parameter-calculating means, and the modified torque error Wetrq correspond to the corrected error parameter.

$$Wetrq(k)=Wt(k) \cdot Etf(k) \quad (61)$$

Next, the basic torque correction value-calculating section 214 calculates a basic torque correction value Ktrq_bs with a control algorithm to which is applied a sliding mode control algorithm expressed by the following equations (62) to (69). It should be noted that in the present embodiment, the basic torque correction value-calculating section 214 corresponds to the modification value-calculating means, and the basic torque correction value Ktrq_bs corresponds to the modification value.

$$\sigma v(k)=Wetrq(k)+Sv \cdot Wetrq(k-1) \quad (62)$$

$$Urch\_v(k)=-Krch\_v \cdot \sigma v(k) \quad (63)$$

$$Unl\_v(k)=-Knl\_v \cdot sgn(\sigma v(k)) \quad (64)$$

$$Uadp\_v(k)=-Kadp\_v \cdot \delta v(k)+Uadp\_v\_ini \quad (65)$$

$$\delta v(k)=\lambda v \cdot \delta v(k-1)+\sigma v(k) \quad (66)$$

When $Ktrq\_bs\_L<Ktrq\_bs(k-1)<Ktrq\_bs\_H$ $\lambda v=1$ (67)

When $Ktrq\_bs(k-1) \leq Ktrq\_bs\_L$ or $Ktrq\_bs\_H \leq Ktrq\_bs(k-1)$ $\lambda v=\lambda v lmt$ (68)

$$Ktrq\_bs(k)=Urch\_v(k)+Unl\_v(k)+Uadp\_v(k) \quad (69)$$

In the above equation (62), σv represents a switching function, and Sv a switching function-setting parameter which is set to a value satisfying the relationship of −1<Sv<St<0. The reason for thus setting the two switching function-setting parameters St and Sv will be described hereinafter. In this case, the convergence rate of the modified torque errors Wetrq$_i$ to 0 is designated by a value set to the switching function-setting parameter Sv. Further, in the equation (63), Urch_v represents a reaching law input, and Krch_v represents a predetermined reaching law gain. Furthermore, in the equation (64), Unl_v represents a non-linear input, and Knl_v represents a predetermined non-linear input gain. Further, in the equation (64), sgn(σv(k)) represents a sign function, and the value thereof is set such that sgn(σv(k))=1 holds when σv(k)≧0, and when σv(k)<0, sgn(σv(k))=−1 holds (it should be noted that the value thereof may be set such that sgn(σv(k))=0 holds when σv(k)=0).

In the equation (65), Uadp_v represents an adaptive law input, and Kadp_v represents a predetermined adaptive law gain. Further, in the equation (65), Uadp_v_ini represents the initial value of the adaptive law input, and is set to a fixed value (e.g. 1) such that the torque correction value Ktrq, which is the multiplication value, does not become a negative value. Furthermore, in the equation (65), δv represents the integral value of a switching function calculated by the equation (66). In the equation (66), λv represents a forgetting coefficient, and as shown in the equations (67) and (68), the value thereof is set to 1 or a predetermined value λvlmt, according to the results of comparisons between the immediately preceding value Ktrq_bs(k−1) of the basic torque correction value and predetermined upper and lower limit values Ktrq_bs_H and Ktrq_bs_L. The upper limit value Ktrq_bs_H is set to a predetermined positive value, and the lower limit value Ktrq_bs_L is set to a predetermined negative value, while the predetermined value λvlmt is set to a value which satisfies the relationship of 0<λvlmt<1, as described above.

Further, as shown in the equation (69), the basic torque correction value Ktrq_bs is calculated as the sum of the reaching law input Urch_v, the non-linear input Unl_v, and the adaptive law input Uadp_v.

As described above, the basic torque correction value-calculating section 214 calculates the basic torque correction value Ktrq_bs with the control algorithm expressed by the equations (62) to (69), and therefore the basic torque correction value Ktrq_bs is calculated as a value for causing the modified torque error Wetrq to converge to 0, in other words, as a value for causing the torque feedback value Trq_fb to converge to the target torque feedback value Trq_fb_cmd.

Further, the basic torque correction value Ktrq_bs is calculated using the forgetting coefficient λv, and hence when the absolute value of the immediately preceding value Ktrq_bs(k−1) of the basic torque correction value is large, the above-described forgetting effect provided by the forgetting coefficient λ makes it possible to prevent the disturbance estimated value Uls_v as the integral term, i.e. the basic torque correction value Ktrq_bs from being increased, thereby making it possible to prevent the feedforward torque Trq_ff from temporarily taking an improper value. In addition, the basic torque correction value Ktrq_bs, that is, the disturbance estimated value Uls_v as the integral term in the algorithm for calculating the torque correction value Ktrq can be prevented from interfering with the integral value Uls_t in the algorithm for calculating the above-described torque feedback value Trq_fb, to thereby prevent the integral terms from exhibiting oscillating behaviors. This makes it possible to enhance controllability in a transient state. Further, if the absolute value of the immediately preceding value Ktrq_bs (k−1) of the basic torque correction value is small, the forgetting coefficient λv is set to 1, and hence even when the torque error Etf has converged to 0, the torque feedback value Trq_fb can be held at a proper value which is capable of compensating for the follow-up error Et quickly. This makes it possible to enhance the responsiveness when the modified torque errors Wetrq start to increase.

Figure 44:
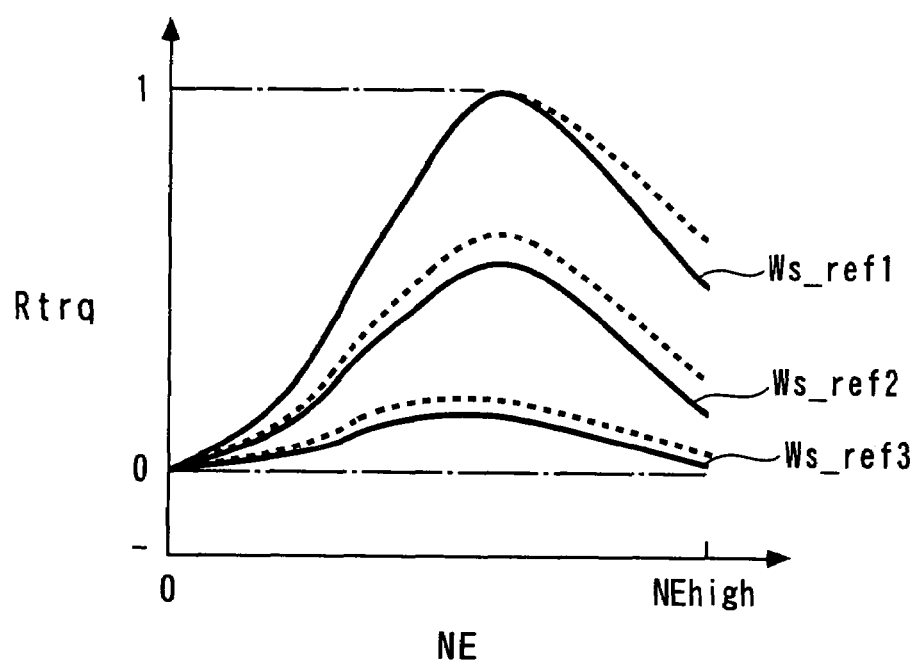
FIG. 44 is a diagram showing an example of a map for use in calculating a torque correction sensitivity.

On the other hand, the torque correction sensitivity-calculating section 215 calculates a torque correction sensitivity Rtrq by searching a map shown in FIG. 44 according to the engine speed NE and the non-drive wheel speed Ws_ref. Similarly to the above-described error weight Wt, the torque correction sensitivity Rtrq takes a value obtained by normalizing a ratio ΔWs_act/ΔTrq between the amount ΔWs_act of change in the drive wheel speed Ws_act and the amount ΔTrq of change in the engine torque, with reference to the absolute value |ΔWs_act_ref/ΔTrq_ref| of the ratio ΔWs_act_ref/ΔTrq_ref obtained at the predetermined drive wheel speed and the predetermined engine torque.

In FIG. 44, curves indicated by solid lines represent the values of the torque correction sensitivity Rtrq, and curves indicated by broken lines represent the values of the above-described error weight Wt, for comparison. As is clear from the comparison between the two curves, in this map, the torque correction sensitivity Rtrq is set to have approximately the same tendency as that of the error weight Wt. The reason for this is the same as given in the description of the FIG. 43 map.

As described above, since the torque correction sensitivity Rtrq is calculated by the same method as employed for the calculation of the error weight Wt, the torque correction sensitivity Rtrq is calculated as a value indicative of the degree of the influence of the maximum torque Trq_max on the torque error Etf. Further, as described hereinabove, the degree of the influence of the maximum torque Trq_max on the torque error Etf also varies with the gear ratio of the transmission, and hence in FIG. 44, the torque correction sensitivity Rtrq is set according to the engine speed NE and the non-drive wheel speed Ws_ref.

Further, in FIG. 44, the torque correction sensitivity Rtrq is set to a value equal to the value of the error weight Wt in a low non-drive wheel speed region and at the same time in a low-to-medium engine speed region, that is, in a region where the traction control is easy to operate, and in the other regions, the torque correction sensitivity Rtrq is set to a smaller value than the value of the error weight Wt. This is because when the amount of correction of the maximum torque Trq_max by the torque correction value Ktrq in the decreasing direction is too small, there can occur slippage of the drive wheels. To avoid this problem, the values of the torque correction sensitivity Rtrq are set as above.

It should be noted that in the present embodiment, the torque correction sensitivity-calculating section 215 corresponds to the first influence degree parameter-calculating means, and the torque correction sensitivity Rtrq corresponds to the first influence degree parameter. Further, although the FIG. 44 map is provided for calculating the torque correction sensitivity Rtrq according to the engine speed NE and the non-drive wheel speed Ws_ref, it can be regarded to represent the correlation between the maximum torque Trq_max, the non-drive wheel speed Ws_ref, and the torque correction sensitivity Rtrq since the maximum torque Trq_max is determined according to the engine speed NE, as described hereinbefore. Therefore, the FIG. 44 map corresponds to the first influence degree model.

On the other hand, the multiplication element 216 calculates the torque correction value Ktrq by the following equation (70). More specifically, the torque correction value Ktrq is calculated by correcting the basic torque correction value Ktrq_bs by the torque correction sensitivity Rtrq.

$$Ktrq(k)=Rtrq(k)\cdot Ktrq\_bs(k) \quad (70)$$

As described hereinabove, the control apparatus 1A according to the present embodiment calculates the engine torque Trq by the traction controller 200, and although not shown, carries out the variable mechanism control process, the air-fuel ratio control process, and the ignition timing control process so as to obtain the engine torque Trq.

Figure 45:
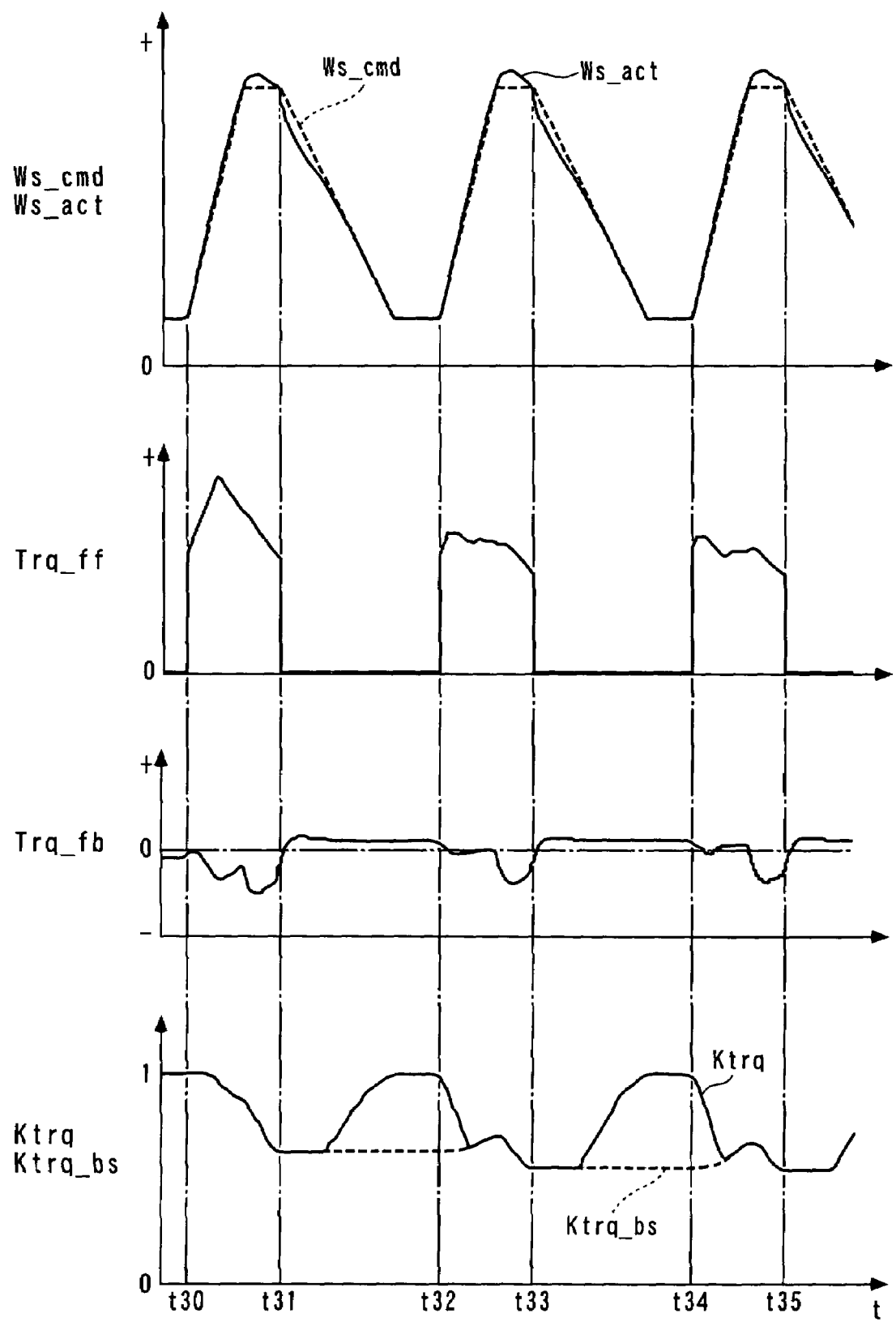
FIG. 45 is a timing diagram showing an example of results of traction control executed by the control apparatus according to the second embodiment.
Figure 46:
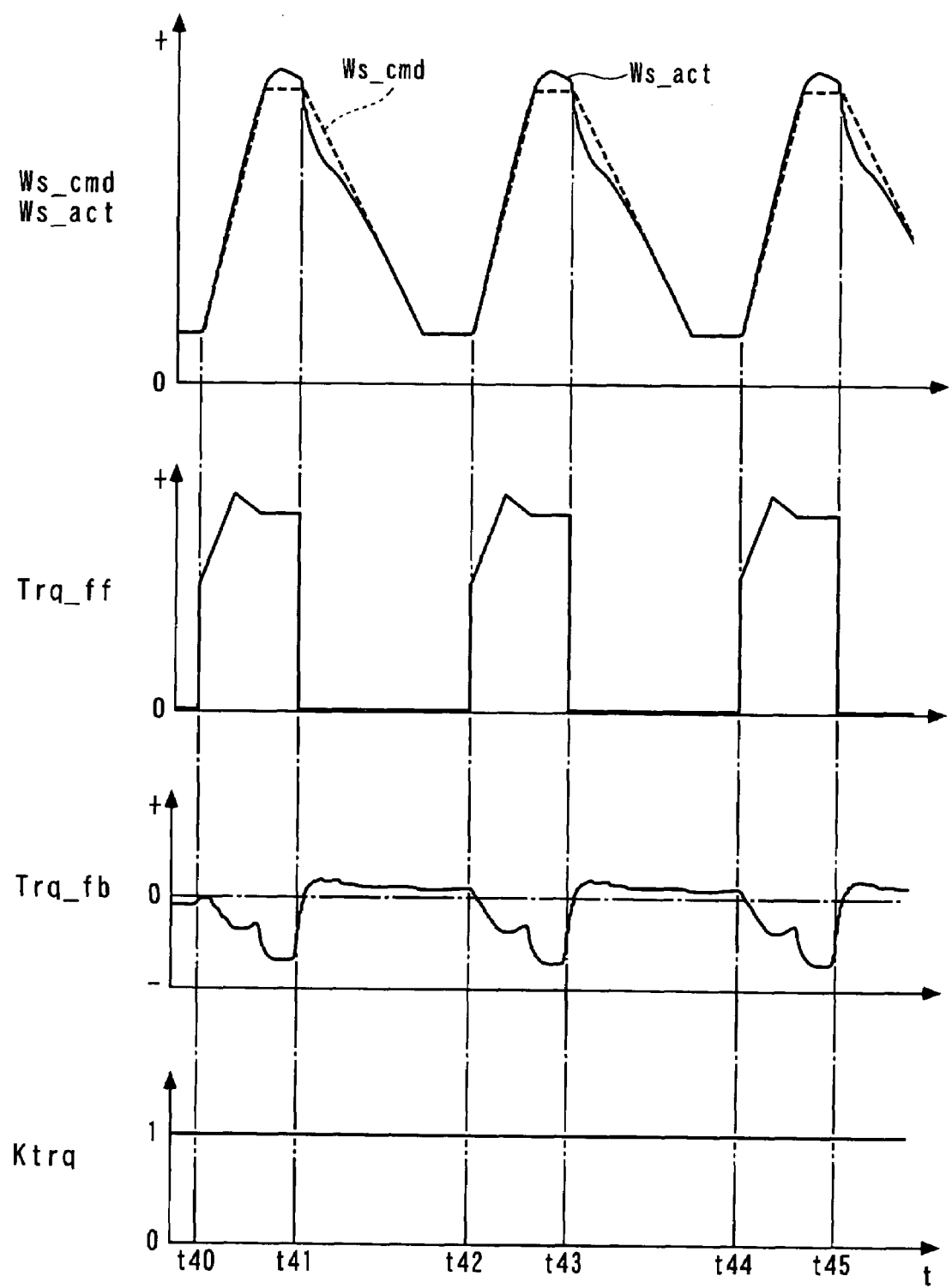
FIG. 46 is a timing diagram showing an example of results of the traction control, obtained when a torque correction value=1 holds for comparison with the FIG. 45 example.

Next, a description will be given of control results obtained when the traction control is performed by the control apparatus 1A according to the second embodiment configured as described above. FIG. 45 shows an example of control results obtained by the control apparatus 1A when the acceleration/deceleration of the vehicle is repeatedly performed on a road surface having a small frictional resistance. FIG. 46 shows, for comparison with the FIG. 45 example, an example (hereinafter referred to as "the comparative example") of control results obtained when the torque correction value Ktrq is held at 1, i.e. when the maximum torque Trq_max is directly used as the corrected maximum torque Trq_max_mod.

Referring to FIGS. 45 and 46, when a comparison is made between the example and the comparative example as to changes in the feedforward torque Trq_ff and the torque feedback value Trq_fb within a time period from the start of acceleration through the start of deceleration (from t30 to t31, from t32 to t33, and from t34 to t35, and form t40 to t41, from t42 to t43, and from t44 to t45), it is understood that the two values Trq_ff and Trq_fb are both made smaller in the example according to the present embodiment than in the comparative example, whereby the present embodiment is enhanced in controllability.

Further, when another comparison is made between the example and the comparative example as to changes in the drive wheel speed Ws_act with respect to those in the target wheel speed Ws_cmd after the start of the deceleration, it is understood that the degree of deviation of the drive wheel speed Ws_act from the target wheel speed Ws_cmd, i.e. the control error is suppressed to a smaller value in the example of the control results according to the present embodiment than in the comparative example, whereby the present embodiment is enhanced in the control accuracy.

As described hereinabove, according to the control apparatus 1A of the second embodiment, the error weight Wt is calculated using the map shown in FIG. 43, i.e. the response surface model, and the modified torque error Wetrq is calculated by correcting (modifying) the torque error Etf by the error weight Wt. As described hereinabove, the error weight Wt is calculated as a value indicative of the probability of the torque error Etf being caused by the too large amount of the engine torque Trq, in other words, the degree of influence of the maximum torque Trq_max on the torque error Etf, and therefore the modified torque error Wetrq is calculated as a value on which is reflected the degree of influence of the maximum torque Trq_max on the torque error Etf.

Further, the basic torque correction value Ktrq_bs is calculated such that the modified torque error Wetrq calculated as above is caused to converge to 0, and the torque correction value Ktrq is calculated by multiplying the basic torque correction value Ktrq_bs by the torque correction sensitivity Rtrq. The feedforward torque Trq_ff is calculated by the equation (47), using the corrected maximum torque Trq_max_mod obtained by correcting the maximum torque Trq_max by the torque correction value Ktrq. Therefore, the torque error Etf can be properly and quickly compensated for just enough by the feedforward torque Trq_ff calculated using the corrected maximum torque Trq_max_mod and the equation (47), even under a condition where the correlation between the maximum torque Trq_max and the feedforward torque Trq_ff is changed by unpredictable changes of conditions other than disturbance, such as aged degradation of output characteristics of the engine 3, variations between individual engines, changes in the degrees of wear of tires, and changes in the frictional resistance of road surfaces, causing the torque error Etf, i.e. the slippage of the drive wheels to be liable to temporarily increase. This makes it possible to ensure higher-level control accuracy of the wheel speed than a gain schedule correction (or modification) method. In short, a high-level traction control can be realized.

If the feedforward torque Trq_ff is calculated assuming that the error weight=1 and Etf=Wetrq hold, when the torque error Etf is caused mainly by the change in the above-described correlation between the maximum torque Trq_max and the feedforward torque Trq_ff, i.e. when the degree of influence of the maximum torque Trq_max on the torque error Etf is large, the torque error Etf, i.e. the slippage of the drive wheels can be properly compensated for by the thus calculated the feedforward torque Trq_ff. However, when the degree of influence of the maximum torque Trq_max on the torque error Etf is small, i.e. when the torque error Etf, i.e. the slippage of the drive wheels is caused mainly by a disturbance or the like other than the above-described correlation, it is impossible to properly compensate for the torque error Etf, i.e. the slippage of the drive wheels, which results in overcompensation or undercompensation for the same. Therefore, by using the above-described error weight Wt, the torque error Etf, i.e. the slippage of the drive wheels can be properly compensated for just enough by the feedforward torque Trq_ff.

In addition, since the feedforward torque Trq_ff is calculated using the equation (47) indicative of the correlation between the corrected maximum torque Trq_max_mod and the feedforward torque Trq_ff, the slippage of the drive wheels can be compensated for more quickly than when the slippage of the drive wheels is compensated for by the torque feedback value Trq_fb calculated with the feedback control algorithm. As described above, even under a condition where the torque error Etf, i.e. the slippage of the drive wheels is temporarily increased by a change in the correlation between the corrected maximum torque Trq_max_mod and the feedforward torque Trq_ff, it is possible to compensate for the slippage of the drive wheels properly and quickly, thereby making it possible to ensure high-level accuracy of control.

Furthermore, although the degree of the influence of the maximum torque Trq_max on the torque error Etf also varies with the gear ratio of the transmission, as described above, the error weight Wt is calculated according to the engine speed NE and the non-drive wheel speed Ws_ref. Therefore, the feedforward torque Trq_ff can be calculated so as to compensate for the slippage of the drive wheels while reflecting influence of the engine speed NE and the non-drive wheel speed Ws_ref on the torque error Etf. This makes it possible to further enhance the accuracy of control.

Further, the torque correction sensitivity Rtrq is calculated as a value which represents the degree of the influence of the maximum torque Trq_max on the torque error Etf, and the torque correction value Ktrq is calculated by multiplying the basic torque correction value Ktrq_bs by the torque correction sensitivity Rtrq, so that as described above, it is possible to prevent the basic torque correction value Ktrq_bs from overcompensating for the torque error Etf under the condition where the degree of the influence of the maximum torque Trq_max on the torque error Etf is small. In addition, the torque correction sensitivity Rtrq is set to a value equal to the value of the error weight Wt in the region where the traction control is easy to operate, and in the other regions, the torque correction sensitivity Rtrq is set to a smaller value than the value of the error weight Wt, whereby it is possible to prevent the slippage of the drive wheels from being caused due to the amount of correction of the maximum torque Trq_max by the torque correction value Ktrq in the decreasing direction being too small.

Further, in the algorithm [equations (49) to (59)] for calculating the torque feedback value Trq_fb, and the algorithm [equations (62) to (69)] for calculating the basic lift correction value Ktrq_bs, the switching function-setting parameters St and Sv are set to values which satisfy the relationship of −1<Sv<St<0. Therefore, the convergence rate of the modified torque error Wetrq to 0 is lower than the convergence rate of the follow-up error Et to 0, which prevents the two response-specifying control algorithms from interfering with each other. Particularly, the torque correction value Ktrq is calculated based on the torque feedback value Trq_fb, and hence it is necessary to modify the correlation model by the torque correction value Ktrq at a rate lower than the convergence rate of the follow-up error Et to 0. However, by setting the switching function-setting parameters St and Sv as described above, it is possible to realize the modification at the required rate. This makes it possible to prevent the control system from exhibiting an oscillating behavior due to the interference between the response-specifying control algorithms, thereby making it possible to ensure the stability of the control system.

It should be noted that although in the second embodiment, the feedforward torque-calculating section 206 calculates the feedforward torque Trq_ff by the aforementioned equation (47), by way of example, the feedforward torque-calculating section 206 may be configured to calculate the feedforward torque Trq_ff by the following equations (71) to (73) in place of the equation (47).

$$Trq\_ff\_temp(k)=Ktrq\_ap(k)\{Trq\_max(k)-Ttrq\_min(k)\}+Ttrq\_min(k) \quad (71)$$

$$\text{When } Trq\_ff\_temp(k) \leq Trq\_max\_mod(k) \; Trq\_ff(k)=Trq\_ff\_temp(k) \quad (72)$$

$$\text{When } Trq\_ff\_temp(k) > Trq\_max\_mod(k) \; Trq\_ff(k)=Trq\_max\_mod(k) \quad (73)$$

In the above equation (71), Trq_ff_temp represents the provisional value of the feedforward torque. As shown in the equations (72) and (73), a limiting process is performed on the provisional value Trq_ff_temp using the corrected maximum torque Trq_max_mod as an upper limit value, whereby the feedforward torque Trq_ff is calculated. Also when the above equations (71) to (73) are used as the algorithm for calculating the feedforward torque Trq_ff, it is possible to obtain the same advantageous effects as provided by the use of the aforementioned equation (47).

Further, although in the second embodiment, the control algorithm expressed by the aforementioned equations (62) to (69) is used as the algorithm for calculating the basic torque correction value Ktrq_bs, the basic torque correction value Ktrq_bs may be calculated, in place of the above control algorithm, with a control algorithm expressed by the following equations (74) to (83), to which are applied a combination of an adaptive disturbance observer and a sliding mode control algorithm.

$$\sigma v(k) = Wetrq(k) + Sv \cdot Wetrq(k-1) \quad (74)$$

$$Urch\_v(k) = -Krch\_v \cdot \sigma v(k) \quad (75)$$

$$Unl\_v(k) = -Knl\_v \cdot sgn(\sigma v(k)) \quad (76)$$

$$\sigma v\_hat(k) = Urch\_v(k-1) + Unl\_v(k-1) + Uls\_v(k-1) \quad (77)$$

$$Ev\_sig(k) = \sigma v(k) - \sigma v\_hat(k) \quad (78)$$
$$\phantom{Ev\_sig(k)} = \sigma v(k) - Urch\_v(k-1) - Unl\_v(k-1) - Uls\_v(k-1)$$

$$Uls\_v(k) = dUls\_v(k-1) + Uls\_v\_ini \quad (79)$$

$$dUls\_v(k) = \lambda v \cdot dUls\_v(k-1) + \frac{Pv}{1+Pv} Ev\_sig(k) \quad (80)$$

-continued

*When $Ktrq\_bs\_L < Ktrq\_bs(k-1) < Ktrq\_bs\_H$ (81)
$\lambda v = 1$

*When $Ktrq\_bs(k-1) \leq Ktrq\_bs\_L$ or $Ktrq\_bs\_H \leq Ktrq\_bs(k-1)$ (82)
$\lambda v = \lambda vlmt$ $Ktrq\_bs(k) = Urch\_v(k) + Unl\_v(k) + Uls\_v(k)$ (83)

In the above equation (77), σv_hat represents an estimated value of a switching function, and Uls_v represents a disturbance estimated value. The disturbance estimated value Uls_v is calculated with a fixed gain identification algorithm to which is applied a δ correcting method expressed by the equations (77) to (82). In the equation (78), Ev_sig represents an estimation error, and in the equation (79), Uls_v_ini represents the initial value of the disturbance estimated value Uls_v. Further, in the equation (79), dUls_v represents a modification term, and is calculated by the equations (80) to (82). In the equation (80), Pv represents a fixed identification gain.

Further, as shown in the equation (83), the basic torque correction value Ktrq_bs is calculated as the sum of the reaching law input Urch_v, the non-linear input Unl_v, and the disturbance estimated value Uls_v. It should be noted that the equations (77) to (82) express an algorithm with which the disturbance estimated value Uls_v of the adaptive disturbance observer is calculated.

According to the control algorithm configured as above, it is possible to obtain the same advantageous effects as provided by the control algorithm expressed by the aforementioned equations (62) to (69). More specifically, in the equation (80), the immediately preceding value dUls_v (k−1) of the modification term is multiplied by the forgetting coefficient λv, and if the absolute value of the basic torque correction value Ktrq_bs is large, the forgetting coefficient λv is set to a value within the range of 0<λ<1. Therefore, the aforementioned forgetting effect provided by the forgetting coefficient λ makes it possible to prevent the disturbance estimated value Uls_v as the integral term, i.e. the basic torque correction value Ktrq_bs from being increased, thereby making it possible to prevent the feedforward torque Trq_ff from temporarily taking an improper value. In addition, the basic torque correction value Ktrq_bs, that is, the disturbance estimated value Uls_v as the integral term in the algorithm for calculating the torque correction value Ktrq can be prevented from interfering with the integral value Uls_t in the algorithm for calculating the above-described torque feedback value Trq_fb, to thereby prevent the integral terms from exhibiting oscillating behaviors. This makes it possible to enhance controllability in a transient state. Further, if the absolute value of the immediately preceding value Ktrq_bs(k−1) of the basic torque correction value is small, the forgetting coefficient λv is set to 1, and hence even when the modified torque error Wetrq becomes close to 0, the basic torque correction value Ktrq_bs can be held at a proper value. This makes it possible to enhance the responsiveness when the modified torque error Wetrq start to increase, thereby making it possible to enhance the control accuracy.

In addition, the disturbance estimated value Uls_v is calculated with the fixed gain identification algorithm of the adaptive disturbance observer, to which is applied the δ correcting method, and hence compared with the control algorithm according to the second embodiment which employs the adaptive law input Uadp_v, it is possible to further enhance the capability of suppressing the integral fluctuation behavior and the overshooting behavior of the basic torque correction value Ktrq_bs.

On the other hand, although in the second embodiment, the maximum torque Trq_maxis is regarded as the reference parameter and the second reference parameter, by way of example, the engine speed NE may be regarded as the reference parameter and the second reference parameter in the second embodiment. In this case, calculating the feedforward torque Trq_ff using the FIG. 40 map and the equations (46) and (47) corresponds to calculating the first input using a modified correlation model, and the FIG. 43 map corresponds to the influence degree model and the second and influence degree model, while the FIG. 44 map corresponds to the first influence degree model.

Further, although in the second embodiment, the feedforward torque Trq_ff is calculated using the equations (46) and (47) as the correlation model, by way of example, the correlation model for use in calculation of the feedforward torque Trq_ff is not limited to this, but any other suitable calculating equations and maps may be used. For example, the feedforward torque Trq_ff may be calculated using an equation in which the corrected maximum torque Trq_max_mod and the normalization demand driving force Ktrq_ap in the equation (47) are replaced by the maximum torque Trq_max and a value Ktrq·Ktrq_ap, respectively. Further, the feedforward torque Trq_ff may be calculated using a calculating equation in which the corrected maximum torque Trq_max_mod and the normalization demand driving force Ktrq_ap in the equation (47) are replaced by the maximum torque Trq_max and a value which is obtained by performing a limiting process using the torque correction value Ktrq as an upper limit value on the normalization demand driving force Ktrq_ap, respectively.

Furthermore, although in the second embodiment, the equations (49) to (59) are used as the control algorithm to which is applied a first response-specifying control algorithm, by way of example, the first response-specifying control algorithm of the present invention is not limited to this, but any other suitable response-specifying control algorithm may be used insofar as it specifies the convergence rate of the difference between the controlled variable and the target value to 0. For example, a control algorithm to which is applied a back-stepping control algorithm may be used. In this case as well, it is possible to obtain the same advantageous effects as provided by the control algorithm expressed by the equations (49) to (59) in the second embodiment.

On the other hand, although in the second embodiment, the equations (62) to (69) are used as the control algorithm to which is applied a second response-specifying control algorithm, by way of example, the second response-specifying control algorithm of the present invention is not limited to this, but any other suitable response-specifying control algorithm may be used insofar as it specifies the convergence rate of the corrected error parameter to 0. For example, a control algorithm to which is applied a back-stepping control algorithm may be used. In this case as well, it is possible to obtain the same advantageous effects as provided by the control algorithm expressed by the equations (62) to (69) in the second embodiment.

Further, although in the second embodiment, the error weight Wt is calculated by searching the FIG. 43 map according to the engine speed NE and the non-drive wheel speed Ws_ref, by way of example, the method of calculating the error weight Wt is not limited to this. For example, in place of the map shown in FIG. 43, there may be used a map in which the value of the error weight Wt is set in advance with respect to the average value of the drive wheel speed Ws_act and the non-drive wheel speed Ws_ref, and the engine speed NE. Further, a map may be used in which each of values of the error weight Wt is set in advance with respect to a larger (or smaller) one of the drive wheel speed Ws_act and the non-drive wheel speed Ws_ref, and the engine speed NE. Furthermore, a map may be used in which each value of the error weight Wt is set in advance with respect to the target wheel speed Ws_cmd and the engine speed NE.

Furthermore, although in the second embodiment, the maps shown in FIGS. 43 and 44 are used when the error weight Wt and the torque correction sensitivity Rtrq are calculated during the traction control of the engine 3 with the automatic transmission, by way of example, this is not limitative, but when traction control is carried out for an engine with a manual transmission, or for an engine with a so-called automatic MT in which an actuator instead of a manual operating force performs the speed varying operation, in place of the maps shown in FIGS. 43 and 44, there may be used a plurality of two-dimensional maps (i.e. tables) in which the values of the error weight Wt and the torque correction sensitivity Rtrq are set in advance with respect to the engine speed NE on a gear ratio-by-gear ratio basis, respectively.

Further, although in the second embodiment, the torque correction sensitivity Rtrq is calculated using the FIG. 44 map as a correlation model, by way of example, this is not limitative, but the torque correction sensitivity Rtrq may be calculated using the FIG. 43 map in place of the FIG. 44 map. That is, the torque correction sensitivity Rtrq may be calculated as a value equal to the weight error Wt. In addition, in the equation (70), the torque correction sensitivity Rtrq may be set to 1 such that Ktrq=Ktrq_bs holds. That is, the basic torque correction value Ktrq_bs may be used as the torque correction value Ktrq.

Further, although in the second embodiment, the correlation model is modified by the method of correcting (modifying) the maximum torque Trq_max as the second reference parameter by the torque correction value as the corrected modification value, by way of example, the method of modifying the correlation model, according to the present invention, is not limited to this, but any other suitable method may be used insofar as it is capable of modifying the correlation model. For example, there may be used a method of modifying the first input value by the corrected modification value.

Furthermore, although in the second embodiment, the wheel speed (more specifically the drive wheel speed Ws_act) is used as the controlled variable, by way of example, this is not limitative, but the control apparatus according to the present invention may be configured such that the engine speed NE is used as the controlled variable to control the controlled variable to a target value while taking the gear ratio of the transmission and the sliding amount of the clutch into account. In this case as well, it is possible to obtain the same advantageous effects as provided by the control apparatus 1A according to the second embodiment.

Further, although in the first embodiment, the control apparatus according to the present invention is applied to a control apparatus which carries out air-fuel ratio control, and in the second embodiment, the control apparatus according to the present invention is applied to a control apparatus which carries out traction control, by way of example, this is not limitative, but it may be applied to any suitable control apparatuses for various industrial apparatuses, which calculate a first input value for feedforward control of a controlled variable, according to reference parameters, by using a correlation model representative of the correlation between the reference parameters and the first input value, calculates a second input value for use in performing feedback control of the controlled variable such that the controlled variable is caused to converge to a target controlled variable, with a predetermined feedback control algorithm, and calculates a control input based on the first input value and the second input value.

Furthermore, although in the first and second embodiments, the modification values (correction values) for modifying the reference parameters are calculated so as to modify the correlation model, by way of example, modification values for modifying the first input value may be calculated with the control algorithms according to the first and second embodiments.

It is further understood by those skilled in the art that the foregoing are preferred embodiments of the invention, and that various changes and modifications may be made without departing from the spirit and scope thereof.

What is claimed is:

1. A control apparatus for controlling a controlled variable of a controlled object by a control input, comprising:
  controlled variable-detecting means for detecting the controlled variable;
  reference parameter-detecting means for detecting a reference parameter of the controlled object other than the controlled variable of the controlled object;
  target value-setting means for setting a target value serving as a target to which the controlled variable is controlled; and
  control input-calculating means for calculating a first input value for feedforward control of the controlled variable, according to the reference parameter, using a correlation model representative of a correlation between the reference parameter and the first input value, calculating a second input value for performing feedback control of the controlled variable such that the controlled variable is caused to converge to the target value, with a predetermined feedback control algorithm, and calculating the control input based on the first input value and the second input value,
  wherein said control input-calculating means comprises:
  error parameter-calculating means for calculating an error parameter indicative of a control error to be compensated for by the first input value, based on the controlled variable and the target value;
  influence degree parameter-calculating means for calculating an influence degree parameter indicative of a degree of influence of the reference parameter on the error parameter by using an influence degree model representative of a correlation between the influence degree parameter and the reference parameter;
  corrected error parameter-calculating means for calculating a corrected error parameter by correcting the error parameter by the influence degree parameter;
  model-modifying means for modifying the correlation model according to the corrected error parameter; and
  first input value-calculating means for calculating the first input value using the modified correlation model.

2. A control apparatus as claimed in claim 1, wherein the predetermined feedback control algorithm is an algorithm to which is applied a predetermined first response-specifying control algorithm that specifies a convergence rate of a difference between the controlled variable and the target value to 0,
  wherein said model-modifying means calculates a modification value with an algorithm to which is applied a predetermined second response-specifying control algorithm that specifies a convergence rate of the corrected error parameter to 0, and modifies the correlation model by the modification value, and wherein in the predetermined second response-specifying control algorithm, the convergence rate of the corrected error parameter to 0 is set such that it becomes lower than the convergence rate of the difference to 0 in the predetermined first response-specifying control algorithm.

3. A control apparatus as claimed in claim 1, wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

4. A control apparatus as claimed in claim 1, wherein the controlled object is a vehicle using the engine as a drive source thereof, the controlled variable being a wheel speed of the vehicle, the control input being an output of the engine, the reference parameter being one of a limit value of the output of the engine and a rotational speed of the engine.

5. A control apparatus for controlling a controlled variable of a controlled object by a control input, comprising:
   controlled variable-detecting means for detecting the controlled variable;
   first reference parameter-detecting means for detecting a first reference parameter of the controlled object other than the controlled variable of the controlled object;
   second reference parameter-detecting means for detecting a second reference parameter of the controlled object other than the controlled variable and the first reference parameter of the controlled object;
   target value-setting means for setting a target value serving as a target to which the controlled variable is controlled; and
   control input-calculating means for calculating a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value,
   wherein said control input-calculating means comprises:
   error parameter-calculating means for calculating an error parameter indicative of a control error to be compensated for by the first input value, based on the controlled variable and the target value;
   modification value-calculating means for calculating a modification value for modifying the correlation model according to the error parameter;
   first influence degree parameter-calculating means for calculating a first influence degree parameter indicative of a degree of influence of the first reference parameter on the error parameter, using a first influence degree model representative of a correlation between the first influence degree parameter and the first reference parameter;
   corrected modification value-calculating means for calculating a corrected modification value by correcting the modification value by the first influence degree parameter;

model-modifying means for modifying the correlation model according to the corrected modification value; and first input value-calculating means for calculating the first input value using the modified correlation model.

6. A control apparatus as claimed in claim 5, further comprising:
   second influence degree parameter-calculating means for calculating a second influence degree parameter indicative of a degree of influence of the second reference parameter on the error parameter, using a second influence degree model representative of a correlation between the second influence degree parameter and the second reference parameter; and
   corrected error parameter-calculating means for calculating a corrected error parameter by correcting the error parameter by the second influence degree parameter;
   wherein said modification value-calculating means calculates the modification value according to the corrected error parameter.

7. A control apparatus as claimed in claim 6, wherein the predetermined feedback control algorithm is an algorithm to which is applied a predetermined first response-specifying control algorithm for specifying a convergence rate of a difference between the controlled variable and the target value to 0,
   wherein said modification value-calculating means calculates the modification value with an algorithm to which is applied a predetermined second response-specifying control algorithm that specifies a convergence rate of the corrected error parameter to 0, and
   wherein in the predetermined second response-specifying control algorithm, the convergence rate of the corrected error parameter to 0 is set such that it becomes lower than the convergence rate of the difference to 0 in the predetermined first response-specifying control algorithm.

8. A control apparatus as claimed in claim 5,
   wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

9. A control apparatus as claimed in claim 5, wherein the controlled object is a vehicle using the engine as a drive source thereof, the controlled variable being a wheel speed of the vehicle, the control input being an output of the engine, the second reference parameter being one of a limit value of the output of the engine and a rotational speed of the engine.

10. A method of controlling a controlled variable of a controlled object by a control input, comprising:
    a controlled variable-detecting step of detecting the controlled variable;
    a reference parameter-detecting step of detecting a reference parameter of the controlled object other than the controlled variable of the controlled object;
    a target value-setting step of setting a target value serving as a target to which the controlled variable is controlled; and
    a control input-calculating step of calculating a first input value for feedforward control of the controlled variable, according to the reference parameter, using a correlation model representative of a correlation between the reference parameter and the first input value, calculating a second input value for performing feedback control of the controlled variable such that the controlled variable is caused to converge to the target value, with a predetermined feedback control algorithm, and calculating the control input based on the first input value and the second input value, wherein said control input-calculating step comprises:

an error parameter-calculating step of calculating an error parameter indicative of a control error to be compensated for by the first input value, based on the controlled variable and the target value;

an influence degree parameter-calculating step of calculating an influence degree parameter indicative of a degree of influence of the reference parameter on the error parameter by using an influence degree model representative of a correlation between the influence degree parameter and the reference parameter;

a corrected error parameter-calculating step of calculating a corrected error parameter by correcting the error parameter by the influence degree parameter;

a model-modifying step of modifying the correlation model according to the corrected error parameter; and a first input value-calculating step of calculating the first input value using the modified correlation model.

11. A method claimed in claim 10, wherein the predetermined feedback control algorithm is an algorithm to which is applied a predetermined first response-specifying control algorithm that specifies a convergence rate of a difference between the controlled variable and the target value to 0, wherein said model-modifying step includes calculating a modification value with an algorithm to which is applied a predetermined second response-specifying control algorithm that specifies a convergence rate of the corrected error parameter to 0, and modifying the correlation model by the modification value, and wherein in the predetermined second response-specifying control algorithm, the convergence rate of the corrected error parameter to 0 is set such that it becomes lower than the convergence rate of the difference to 0 in the predetermined first response-specifying control algorithm.

12. A method as claimed in claim 10, wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

13. A method as claimed in claim 10, wherein the controlled object is a vehicle using the engine as a drive source thereof, the controlled variable being a wheel speed of the vehicle, the control input being an output of the engine, the reference parameter being one of a limit value of the output of the engine and a rotational speed of the engine.

14. A method of controlling a controlled variable of a controlled object by a control input, comprising:

a controlled variable-detecting step of detecting the controlled variable;

a first reference parameter-detecting step of detecting a first reference parameter of the controlled object other than the controlled variable of the controlled object;

a second reference parameter-detecting step of detecting a second reference parameter of the controlled object other than the controlled variable and the first reference parameter of the controlled object;

a target value-setting step of setting a target value serving as a target to which the controlled variable is controlled; and a control input-calculating step of calculating a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value, wherein said control input-calculating step comprises:

an error parameter-calculating step of calculating an error parameter indicative of a control error to be compensated for by the first input value, based on the controlled variable and the target value;

a modification value-calculating step of calculating a modification value for modifying the correlation model according to the error parameter;

a first influence degree parameter-calculating step of calculating a first influence degree parameter indicative of a degree of influence of the first reference parameter on the error parameter, using a first influence degree model representative of a correlation between the first influence degree parameter and the first reference parameter;

a corrected modification value-calculating step of calculating a corrected modification value by correcting the modification value by the first influence degree parameter;

a model-modifying step of modifying the correlation model according to the corrected modification value; and a first input value-calculating step of calculating the first input value using the modified correlation model.

15. A method as claimed in claim 14, further comprising:

a second influence degree parameter-calculating step of calculating a second influence degree parameter indicative of a degree of influence of the second reference parameter on the error parameter, using a second influence degree model representative of a correlation between the second influence degree parameter and the second reference parameter; and a corrected error parameter-calculating step of calculating a corrected error parameter by correcting the error parameter by the second influence degree parameter;

wherein said modification value-calculating step includes calculating the modification value according to the corrected error parameter.

16. A method as claimed in claim 15, wherein the predetermined feedback control algorithm is an algorithm to which is applied a predetermined first response-specifying control algorithm for specifying a convergence rate of a difference between the controlled variable and the target value to 0, wherein said modification value-calculating step includes calculating the modification value with an algorithm to which is applied a predetermined second response-specifying control algorithm that specifies a convergence rate of the corrected error parameter to 0, and wherein in the predetermined second response-specifying control algorithm, the convergence rate of the corrected error parameter to 0 is set such that it becomes lower than the convergence rate of the difference to 0 in the predetermined first response-specifying control algorithm.

17. A method as claimed in claim 14, wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

18. A method as claimed in claim 14, wherein the controlled object is a vehicle using the engine as a drive source thereof, the controlled variable being a wheel speed of the vehicle, the control input being an output of the engine, the second reference parameter being one of a limit value of the output of the engine and a rotational speed of the engine.

19. An engine control unit including a control program for causing a computer to execute a method of controlling a controlled variable of a controlled object by a control input:
wherein the control program causes the computer to detect the controlled variable; detect a reference parameter of the controlled object other than the controlled variable of the controlled object; set a target value serving as a target to which the controlled variable is controlled; and calculate a first input value for feedforward control of the controlled variable, according to the reference parameter, using a correlation model representative of a correlation between the reference parameter and the first input value, calculate a second input value for performing feedback control of the controlled variable such that the controlled variable is caused to converge to the target value, with a predetermined feedback control algorithm, and calculate the control input based on the first input value and the second input value,
wherein when causing the computer to calculate the control input, the control program causes the computer to calculate an error parameter indicative of a control error to be compensated for by the first input value, based on the controlled variable and the target value; calculate an influence degree parameter indicative of a degree of influence of the reference parameter on the error parameter by using an influence degree model representative of a correlation between the influence degree parameter and the reference parameter; calculate a corrected error parameter by correcting the error parameter by the influence degree parameter; modify the correlation model according to the corrected error parameter; and calculate the first input value using the modified correlation model.

20. An engine control unit as claimed in claim 19, wherein the predetermined feedback control algorithm is an algorithm to which is applied a predetermined first response-specifying control algorithm that specifies a convergence rate of a difference between the controlled variable and the target value to 0,
wherein when causing the computer to modify the correlation model, the control program causes the computer to calculate a modification value with an algorithm to which is applied a predetermined second response-specifying control algorithm that specifies a convergence rate of the corrected error parameter to 0, and modify the correlation model by the modification value, and
wherein in the predetermined second response-specifying control algorithm, the convergence rate of the corrected error parameter to 0 is set such that it becomes lower than the convergence rate of the difference to 0 in the predetermined first response-specifying control algorithm.

21. An engine control unit as claimed in claim 19, wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the reference parameter being an operating condition parameter indicative of an operating condition of the variable intake mechanism.

22. An engine control unit as claimed in claim 19, wherein the controlled object is a vehicle using the engine as a drive source thereof, the controlled variable being a wheel speed of the vehicle, the control input being an output of the engine, the reference parameter being one of a limit value of the output of the engine and a rotational speed of the engine.

23. An engine control unit including a control program for causing a computer to execute a method of controlling a controlled variable of a controlled object by a control input:
wherein the control program causes the computer to detect the controlled variable; detect a first reference parameter of the controlled object other than the controlled variable of the controlled object; detect a second reference parameter of the controlled object other than the controlled variable and the first reference parameter of the controlled object; set a target value serving as a target to which the controlled variable is controlled; and calculate a first input value for feedforward control of the controlled variable, according to the first reference parameter and the second reference parameter, using a correlation model representative of a correlation between the first reference parameter, the second reference parameter, and the first input value, calculating a second input value for performing feedback control of the controlled variable such that the controlled variable is caused to converge to the target value, with a predetermined feedback control algorithm, and calculating the control input based on the first input value and the second input value,
wherein when causing the computer to calculate the control input, the control program causes the computer to calculate an error parameter indicative of a control error to be compensated for by the first input value, based on the controlled variable and the target value; calculate a modification value for modifying the correlation model according to the error parameter; calculate a first influence degree parameter indicative of a degree of influence of the first reference parameter on the error parameter, using a first influence degree model representative of a correlation between the first influence degree parameter and the first reference parameter; calculate a corrected modification value by correcting the modification value by the first influence degree parameter; modify the correlation model according to the corrected modification value; and calculate the first input value using the modified correlation model.

24. An engine control unit as claimed in claim 23, wherein the control program further causes the computer to calculate a second influence degree parameter indicative of a degree of influence of the second reference parameter on the error parameter, using a second influence degree model representative of a correlation between the second influence degree parameter and the second reference parameter; and calculate a corrected error parameter by correcting the error parameter by the second influence degree parameter;

wherein when causing the computer to calculate the modification value, the control program causes the computer to calculate the modification value according to the corrected error parameter.

25. An engine control unit as claimed in claim 24, wherein the predetermined feedback control algorithm is an algorithm to which is applied a predetermined first response-specifying control algorithm for specifying a convergence rate of a difference between the controlled variable and the target value to 0, wherein when causing the computer to calculate the modification value, the control program causes the computer to calculate the modification value with an algorithm to which is applied a predetermined second response-specifying control algorithm that specifies a convergence rate of the corrected error parameter to 0, and wherein in the predetermined second response-specifying control algorithm, the convergence rate of the corrected error parameter to 0 is set such that it becomes lower than the convergence rate of the difference to 0 in the predetermined first response-specifying control algorithm.

26. An engine control unit as claimed in claim 23, wherein the controlled object is an internal combustion engine in which an amount of intake air drawn into a cylinder of the engine is changed by a variable intake mechanism, as desired, the controlled variable being an air-fuel ratio of a mixture in the engine, the control input being an amount of fuel to be supplied to the engine, the second reference parameter being an operating condition parameter indicative of an operating condition of the variable intake mechanism.

27. An engine control unit as claimed in claim 23, wherein the controlled object is a vehicle using the engine as a drive source thereof, the controlled variable being a wheel speed of the vehicle, the control input being an output of the engine, the second reference parameter being one of a limit value of the output of the engine and a rotational speed of the engine.

* * * * *